(12) United States Patent
Beadles et al.

(10) Patent No.: US 11,475,419 B2
(45) Date of Patent: Oct. 18, 2022

(54) UNIVERSAL SUBSCRIPTION AND CRYPTOCURRENCY PAYMENT MANAGEMENT PLATFORMS AND METHODS OF USE

(71) Applicant: Robert Dale Beadles, Lodi, CA (US)

(72) Inventors: Robert Dale Beadles, Lodi, CA (US); Sneh Snehal Bhatt, Glendale, CA (US)

(73) Assignee: Robert Dale Beadles, Lodi, CA (US)

( * ) Notice: Subject to any disclaimer, the term of this patent is extended or adjusted under 35 U.S.C. 154(b) by 124 days.

(21) Appl. No.: 16/566,791

(22) Filed: Sep. 10, 2019

(65) Prior Publication Data

US 2020/0258061 A1 Aug. 13, 2020

Related U.S. Application Data

(63) Continuation-in-part of application No. 15/967,560, filed on Apr. 30, 2018, now abandoned.

(60) Provisional application No. 62/884,103, filed on Aug. 7, 2019.

(51) Int. Cl.
   *G06Q 20/10* (2012.01)
   *G06Q 20/36* (2012.01)
   *G06Q 30/04* (2012.01)

(52) U.S. Cl.
   CPC ....... *G06Q 20/102* (2013.01); *G06Q 20/3678* (2013.01); *G06Q 30/04* (2013.01)

(58) Field of Classification Search
   CPC ........................... G06Q 20/012; G06Q 30/04
   See application file for complete search history.

(56) References Cited

U.S. PATENT DOCUMENTS

| | | | |
|---|---|---|---|
| 2018/0189755 A1* | 7/2018 | Kilpatrick | G06F 21/64 |
| 2018/0203992 A1* | 7/2018 | Kilpatrick | G06F 21/54 |
| 2018/0268382 A1* | 9/2018 | Wasserman | G06Q 20/0655 |
| 2018/0341932 A1* | 11/2018 | Wildes | G06Q 20/102 |
| 2018/0374094 A1* | 12/2018 | Kohli | G06F 16/2379 |
| 2019/0164157 A1* | 5/2019 | Balaraman | H04L 9/3239 |
| 2019/0205870 A1* | 7/2019 | Kamalsky | G06Q 40/08 |
| 2020/0005259 A1* | 1/2020 | Berger | G06Q 20/405 |
| 2021/0035096 A1* | 2/2021 | Kamalsky | H04L 9/3297 |

\* cited by examiner

*Primary Examiner* — Jay Huang
(74) *Attorney, Agent, or Firm* — Franklin & Associates International Inc

(57) ABSTRACT

Universal blockchain and other management platforms and methods of use are provided herein. A blockchain subscription pay manager app is configured determine which users are associated with which merchants and which subscription plans by way of a blockchain subscription plan invoicing and payment processing capability which enables collection of user and merchant information, subscription plan set up and payment information and gives the user and merchant a "look and feel" of a universal centralized payment system despite interactions with the subscription smart contracts/wallets over the blockchain decentralized network.

21 Claims, 30 Drawing Sheets

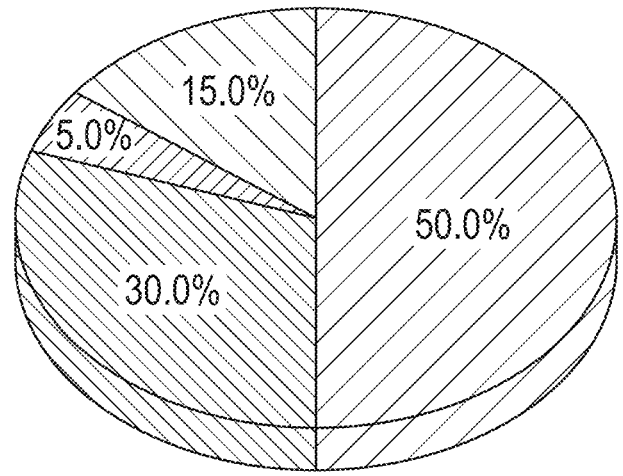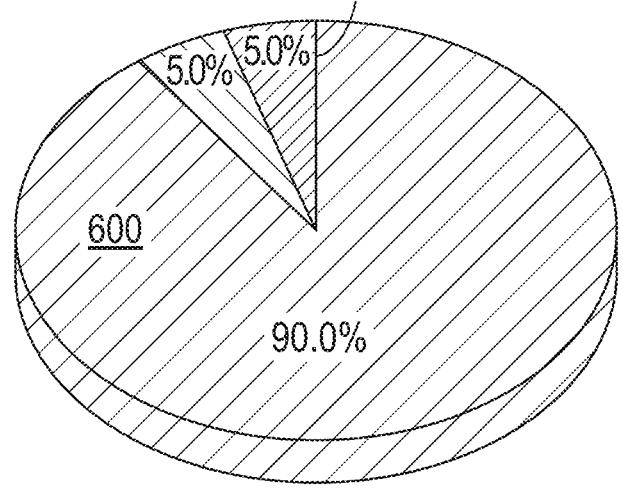
FIG. 10

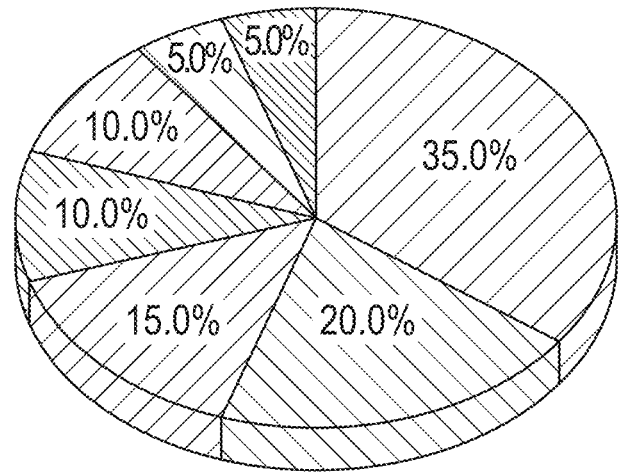
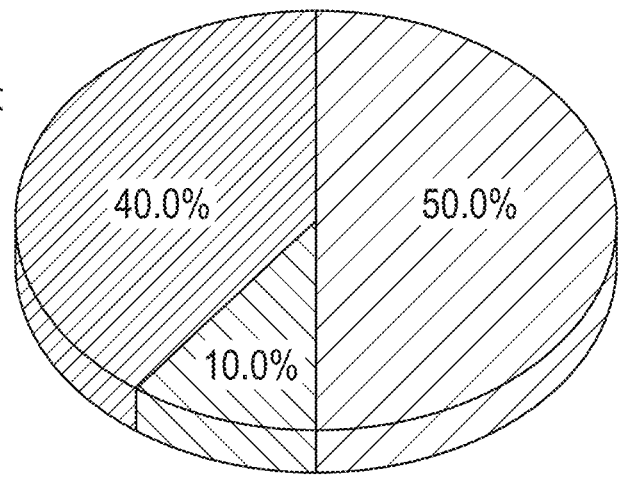
FIG. 11

User Dashboard

Subscription ERC20 Address: 0xwtfomglolrofl

Current Subscriptions — 1601

- Company A $15 per Month — [UnSubscribe] — 1605
- Company B $60 per Month — [UnSubscribe] — 1606

Recent Payments — 1603

| Date | Company | Subscription Type | Price |
|---|---|---|---|
| June 1st | Company A | Month to Month - Plan A | $15 |
| June 1st | Company B | 3 Month | $60 |
| May 1st | Company A | Month to Month - Plan A | $15 |
| April 1st | Company A | Month to Month - Plan A | $15 |

Next Payment Due — 1604

| Company Price | Price | Due |
|---|---|---|
| Company A | $15 | July 1st |
| Company B | $60 | September 1st |

Balances On Subscriptions Wallet — 1602

| | | 1607 | 1608 |
|---|---|---|---|
| ETH | 1.28 | [Withdraw] | [Deposit] |
| MT | 14000 | [Withdraw] — 1609 | [Deposit] — 1610 |
| DAI | 200 | [Withdraw] — 1611 | [Deposit] — 1612 |

FIG. 16

Merchant Dashboard
(Monarch Pay)

Plan A - $15 Dollar Every Month — 1701

| No. | User Name | Email | Ethereum Addres | Payment Status |
|---|---|---|---|---|
| 1 | Alice | af@yahoo.com | 0xoadifaoij | Paid |
| 2 | Bob | bobster@gmail.com | 0xoaidfjaoij | Paid |
| 3 | Charlie | c@aol.com | 0xaodidoij | Overdue |
| 4 | David | Dong@msn.com | 0xididyr | Paid |
| 5 | Edgar | Edster@aol.com | 0xriepq | Overdue |
| 6 | Franklin | Fob@gmail.com | 0xuroouw | Paid |

Sortable

Click → 1702

User: Alice    Email: af@yahoo.com

| Date | Payment Price | Product Type |
|---|---|---|
| June 1st | $15 | Plan A |
| May 1st | $15 | Plan A |

Plan A - $30 Dollar Every Month — 1710

| No. | User Name | Email | Ethereum Addres | Payment Status | Address | Phone Number |
|---|---|---|---|---|---|---|
| 1 | Alice | af@yahoo.com | 0xoadifaoij | Paid | | |
| 2 | Bob | bobster@gmail.com | 0xoaidfjaoij | Paid | | |
| 3 | Charlie | c@aol.com | 0xaodidoij | Overdue | | |
| 4 | David | Dong@msn.com | 0xididyr | Paid | | |
| 5 | Edgar | Edster@aol.com | 0xriepq | Overdue | | |
| 6 | Franklin | Fob@gmail.com | 0xuroouw | Paid | | | export as .csv

ERC20 Address: Withdrawal Address — 1720

Create New Payment Template — 1730

FIG. 17

NEW SUBSCRIPTION PLAN

Creating a new Subscription for your business, project or charity is quick and easy. Within minutes, you can start accepting cryptocurrency from your subscribers. Just provide us with the following information to get started:

SUBSCRIPTION NAME
Enter 2 name that describes the purpose for your subscription.

DESCRIPTION
Describe your product/service and how subscribers will benefit from the subscription.

USD AMOUNT
$ 0.00

PROCESSING FEES
0.5%                    1%
*if paid in Monarch Tokens*    *if paid in Other currency*

By default subscribers will be prompted to PAY NOW (at the time/day they subscribe). Future payments will be based off this start date. If you toggle this option OFF, then subscribers will not be charged until the next "billing cycle" (as determined by the Frequency listed above).

2201 — Always Pay Now

FREQUENCY
Select Schedule ▼

PAYMENT DAY
Select Day ▼

OF PAYMENTS
Enter 0 for unlimited

*Enter 0 for unlimited.*

REQUEST USER INFO
Username/Email
Phone           } 2202
Physical Address

PAYMENTS TYPES
Monarch Token (MT)
TrueUSD (TUSD)    } 2203
Dai(DAI)
Ethereum(ETH)

PAYMENT DESTINATION
0x1cf003415158982bcd77f77f7208805odda26df17ca

2204 — CANCEL | CREATE PLAN

FIG. 22

INVOICE 2003
Test Sneh

Sneh Test

| AMOUNT | CURRENCY | SCHEDULE | PAYMENTS |
|---|---|---|---|
| $ 5.00 | ETH | DAILY | 5 |

USERNAME/EMAIL
Enter you username or email.

PHONE  }2004
Enter your phone number.

ADDRESS  }2004
Enter your physical address.

NOTE: Plan and User data may take up to 24 hours to display on your Dashboard.

☐ I understand that I am solely responsible for the ownership, market value, and magement of all cryptocurrency that I transfer, deposit, or withdraw using this platform. This is a descentralized system, and Monarch Blockchain Corporation will not be responsible for any loss of funds.

☐ I agree to the Monarch TERMS + CONDITIONS.

2005

SUBSCRIBE

FIG. 23

UNIVERSAL SUBSCRIPTION AND CRYPTOCURRENCY PAYMENT MANAGEMENT PLATFORMS AND METHODS OF USE

CROSS REFERENCE TO RELATED APPLICATION(S)

This application claims the benefit of U.S. provisional application No. 62/884,103, filed on Aug. 7, 2019, and is a continuation in part of U.S. Non-Provisional patent application Ser. No. 15/967,560, filed on Apr. 30, 2018, the entire contents of each of which is incorporated by reference herein as if fully set forth.

FIELD OF THE PRESENT DISCLOSURE

Embodiments relate to systems and methods for universal management of services and/or transactions and, in particular but not exclusively, to platforms that provide seamless integration with digital subscription services and/or cryptocurrency transaction services. Additionally or alternatively, embodiments of the present disclosure are directed to blockchain technologies, and more specifically, but not by limitation, to platforms that provide cohesive and universal interface for transactions requiring access to data stored in a vault or repository such as blockchain data. These systems and methods implement unique security features allowing for real-time activation and deactivation of vault or repository access in some embodiments.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

According to some aspects; a method of managing a plurality of cryptocurrency transactions is provided. The method can comprise: a) rendering on a graphical user interface of a cryptocurrency management application of a computing system, cryptocurrency transaction management tools for transacting between a first user account registered with said cryptocurrency management application and a plurality of services/users accounts; b) storing in said computing system a plurality of password/keys for allowing said cryptocurrency management application to automatically interact and transact between said first user account and each one of said plurality of services/user accounts; c) receiving, in an interface of the cryptocurrency management application, instructions to perform a cryptocurrency transaction between the first user account and a selected one of said plurality of services/user accounts; d) performing, by the computing system, the transaction between the first user account and the selected service/user account using particular passwords/keys of said plurality of passwords/keys for transacting between said first user account and the selected one of said plurality of services/user accounts without said passwords/keys being provided by said user via said graphical user interface for the purpose of executing the transaction; and e) repeating steps c) to d) for at least one other selected one of said plurality of services/users. Other embodiments of this aspect include corresponding computer systems, apparatus, and computer programs recorded on one or more computer storage devices, each configured to perform the actions of the methods.

In some embodiments, the password/keys referred to herein can comprise any one or combination of cryptographic seed(s), cryptographic private key(s) including multi-signature private keys, cryptographic public key(s), cryptocurrency account spending password(s), password(s)/key(s), and background information for allowing said first user account and at least one of said plurality of services/user accounts to automatically interact and transact with one another.

According to one aspect, a method of managing a plurality of subscription services is provided, the method can comprise a) receiving, in an interface of a subscription management application of a computing device, instructions to set up recurring or scheduled transactions between a subscription service and user account registered with said subscription management application; b) providing in the computing system a password/key to the subscription service management application and the subscription management application for allowing said subscription service and said subscription management application to automatically interact and transact with one another; c) automatically performing, by the computing system, the recurring or scheduled transactions between the subscription service and the user account; and d) repeating steps a) to c) for each one of a plurality of subscription services. Other embodiments of this aspect include corresponding computer systems, apparatus, and computer programs recorded on one or more computer storage systems, each configured to perform the actions of the methods.

In some embodiments, the method further comprises rendering on the same user interface of subscription service management application, subscription payment and management tools for each one of the plurality of subscription services. In some embodiments, the step (b) further comprises: automatically retrieving, by the computing system, said password/key stored in an password vault. Step (b) can further comprise automatically generating, by the computing machine, the password/key using a password generator of the subscription management application, based on receiving instructions about the subscription service the user of the user account is registering with or interested in.

The passwords/keys can stored be in the password vault cryptographically on a block chain. In some embodiments, the user account is a cryptocurrency account. Step c) can comprise: automatically using, by the computing system, a private key and public key associated with the user cryptocurrency account, to perform the transaction between the user cryptocurrency account and the subscription service. The method can further comprise, before step c), automatically generating, by the computing machine, the private key and public key using a password generator of the subscription management application, based on receiving instructions about the cryptocurrency account the user is registered with or interested in.

In some embodiments, wherein automatically using, by the computing system, the private key and public key associated with the user cryptocurrency account, to perform the transactions between the user cryptocurrency account and the subscription service comprises automatically managing, by the computing system, a seed and/or password(s) associated with the user cryptocurrency account, to perform the transactions between the user cryptocurrency account and the subscription service. In some embodiments, automatically managing, by the computing system, a seed and/or password(s) associated with the user cryptocurrency account, to perform the transactions between the user cryptocurrency account and the subscription service includes: automatically generating, by the computing machine, the seed and/or password using the password generator of the subscription management application, based on receiving instructions about the cryptocurrency account the user is registered with or interested in. The seed and/or password(s) associated with the user cryptocurrency account can be stored in the password vault cryptographically on a block chain.

In some embodiments, automatically using, by the computing system, the private key and public key associated with the user cryptocurrency account, to perform the transactions between the user cryptocurrency account and the subscription service includes automatically retrieving, by the computing system, said private key and public key stored in an password vault. The private key and said public key can be stored in the password vault cryptographically on a block chain. In some embodiments, automatically performing, by the computing system, the recurring or scheduled transactions between the subscription service and the user account includes managing, by the computing system, a payment in a first currency from the user crypto currency account, exchanging, by the computing system, with a cryptocurrency exchange the payment in the first currency to payment in a second currency different from the first currency; and paying, by the computing system, the subscription service in the second currency. The first currency is FIAT and the second currency is cryptocurrency or vice versa. The crypto currency can be coins, tokens or altcoins. Tokens can be created and distributed by the subscription management application. The tokens or other cryptocurrency can be at least partially backed by a commodity or physical asset. The commodity can be physical silver or other precious metal. In some embodiments, exchanging, by the computing system, with a cryptocurrency exchange the payment in the first currency to payment in a second currency different from the first currency comprises: monitoring a plurality of cryptocurrency exchanges to determine best prices for buying said first currency and selling in said second currency; and based on best prices, exchanging with one of the plurality of cryptocurrency exchanges the payment in the first currency to payment in the first currency.

In some embodiments, managing, by the computing system, a payment in a first currency from the user crypto currency account comprises: using, by the computing system, the private key and public key associated with the user cryptocurrency account, to exchange the payment in the first currency from the user cryptocurrency account to payment in the second currency.

In some embodiments, exchanging, by the computing system, with a cryptocurrency exchange the payment in the first currency to payment in a second currency comprises using, by the computing machine, the private key and public key associated with the user crypto currency account to convert in the user crypto currency account the payment in the first currency to the payment in the second currency via the cryptocurrency exchange.

In some embodiments, wherein exchanging, by the computing system, with a cryptocurrency exchange the payment in the first currency to payment in a second currency comprises using, by the computing machine, the private key and public key associated with the user crypto currency account to send the payment in the first currency to an account of the subscription management application; the subscription management application account being controlled independently from the user account; and using, by the computing machine, the private key and public key associated with the subscription management application account to convert in the subscription management application account the payment in the first currency to the payment the second currency via the cryptocurrency exchange.

One general aspect includes a system providing access to a data vault, the system including: a registrar configured to register each of a plurality of second peers and generate a secret application programming interface (api) key for each registered second peer, the secret api key being unique for each of the registered second peers and linked to a first peer; a data vault configured to store the secret api keys for the registered second peers and data in a blockchain; and a communications interface configured to. The system also includes receive a request for access to the data in the blockchain in the data vault. The system also includes admit or deny the request based on the secret api key received. Other embodiments of this aspect include corresponding computer systems, apparatus, and computer programs recorded on one or more computer storage devices, each configured to perform the actions of the methods.

Implementations may include one or more of the following features. The system further including a user interface module configured to generate a user interface that includes a selectable mechanism associated with the secret api key that is used to selectively enable or disable the secret api key using a single action. The system further including a password manager configured to generate unique passwords used by the first peer for each merchant. The system where the password manager is further configured to provide a unique seed value for the first peer, generate a random password for the first peer using the unique seed value, and store the random password for the first peer in the blockchain. The system where the password manager is further configured to recover the random password for the first peer using the unique seed value and an at least two-factor authentication process. The system where the two-factor authentication process includes at least one biometric verification factor stored as half of a two-factor authentication key. Implementations of the described techniques may include hardware, a method or process, or computer software on a computer-accessible medium.

One general aspect includes a cryptocurrency exchange system, including: a registrar configured to register transacting parties and generate a secret application programming interface (api) key for each registered transacting party, the secret api key being unique for each of the registered transacting parties and linked to a single user; a data vault configured to store the secret api keys for the registered transacting parties; a currency exchanger configured to prepare a payment into a currency format requested by one of the registered transacting parties; and a communications interface configured to receive a payment request using the secret api key for the one of the registered transacting parties and transmit payment to the one of the registered transacting parties in the requested currency format. Other embodiments of this aspect include corresponding computer systems, apparatus, and computer programs recorded on one or more computer storage devices, each configured to perform the actions of the methods.

Implementations may include one or more of the following features. An embodiment of a cryptocurrency exchange system further including a user interface module configured to generate a user interface that includes a selectable mechanism associated with the secret api key that is used to selectively enable or disable the secret api key using a single action. An embodiment of a cryptocurrency exchange system where the payment request includes a subscription and disabling the secret api key prevents the one of the registered transacting parties from accessing the payment or the payment from being transferred to the one of the registered transacting parties. An embodiment of a cryptocurrency exchange system including a password manager configured to store unique passwords used by the single user, where the single user is assigned a unique password for each of the registered transacting parties by the password manager. An embodiment of a cryptocurrency exchange system where the password manager is configured to: provides a unique seed value for the single user; generates a random password for the single user using the unique seed value; stores the random password for the single user in a blockchain in a cryptographic format in the data vault. An embodiment of a cryptocurrency exchange system where the password manager recovers the random password for the single user using the unique seed value and an at least two-factor authentication process.

An embodiment of a cryptocurrency exchange system where the two-factor authentication process includes at least one biometric verification factor stored as half of a two-factor authentication key. An embodiment of a cryptocurrency exchange system where the data vault includes: a cold storage wallet configured to store at least the one or more cryptocurrencies for the single user and the secret api key for the user in a blockchain; and a hot storage wallet including at least one currency that is available for immediate payment, the at least one currency being based on the one or more cryptocurrencies stored in the cold storage vault. Implementations of the described techniques may include hardware, a method or process, or computer software on a computer-accessible medium.

One general aspect includes a subscription management method, including: generating a unique and secret application programming interface (api) key for each of a plurality of second peers, the unique and secret api linking a second party of plurality of second peers with a first peer, where the first peer has a subscription with each of the plurality of second peers; providing a user interface that includes a selectable object for each subscription between the first peer and each of the plurality of second peers, where the selectable object includes a position that is either an activated position or a deactivated position; and activating or deactivating a subscription based on a position of the selectable object as selected by the first peer. Other embodiments of this aspect include corresponding computer systems, apparatus, and computer programs recorded on one or more computer storage devices, each configured to perform the actions of the methods.

Implementations may include one or more of the following features. An embodiment of a subscription management method further including storing each of the unique and secret api keys in a blockchain of the first peer. An embodiment of a subscription management method where when the selectable object has the activated setting the second peer can receive a subscription payment from the first peer using the unique and secret api key and the first peer can move the selectable object to the deactivated setting to deactivate the subscription. An embodiment of a subscription management method where a cryptocurrency of the first peer are stored in the blockchain, further where the subscription payment includes the cryptocurrency stored in the blockchain. An embodiment of a subscription management method where the cryptocurrency is converted to any of a different cryptocurrency format or a fiat currency prior to transmitting the subscription payment. Implementations of the described techniques may include hardware, a method or process, or computer software on a computer-accessible medium.

According to one aspect, a method of managing a blockchain subscription payment is provided. The method may comprise: receiving authorization that a blockchain subscription pay manager application is allowed to access at least one merchant blockchain account of a merchant; rendering on a graphical user interface of the blockchain subscription pay manager application of a computing system, a new subscription payment plan set up tool for facilitating set up of new subscription payment plan by the merchant; receiving via said graphical user interface of the blockchain subscription pay manager application new subscription payment set up instructions entered using said new subscription payment plan set up tool for setting up said new subscription payment plan; the new subscription payment plan being implemented in the form of a subscription blockchain smart contract for automatically making recurring payments from a user subscription wallet associated with the user blockchain account of a user to a merchant subscription wallet associated with the merchant blockchain account; generating a subscription payment plan invoice in said computing system for payment from the subscription wallet according to said new said subscription plan; the subscription payment plan invoice including details of the new subscription payment plan and a request for the user to set up a payment for the subscription payment plan; and generating a link or code for a user device to access said subscription payment plan invoice via a graphical user interface of a blockchain subscription pay manager application of the computing system.

According to another aspect, a non-transitory, computer-readable medium comprising program code that, when executed by one or more processors of a computer system, causes the one or more processors to perform a method that may comprise: receiving authorization that a blockchain subscription manager application is allowed to access a merchant blockchain account of a merchant; rendering on a graphical user interface of the blockchain subscription pay manager application of a computing system, a new subscription payment plan set up tool for facilitating set up of new subscription payment plan by the merchant; receiving via said graphical user interface of the blockchain subscription pay manager application new subscription payment set up instructions entered using said new subscription payment plan set up tool for setting up said new subscription payment plan; the new subscription payment plan being implemented in the form of a subscription blockchain smart contract for automatically making recurring payments from a user subscription wallet associated with the user blockchain account of a user to the merchant subscription wallet associated with the merchant blockchain account; generating a subscription payment plan invoice in said computing system for payment from the user subscription wallet according to said new said subscription plan; the subscription payment plan invoice including details of the new subscription payment plan and a request for the user to provide confirmation information for subscribing to the subscription payment plan; generating a link or code for a user device to access said subscription payment plan invoice via a graphical user interface of a blockchain subscription pay manager application of the computing system. The method may further comprise: receiving in the computer system authorization that a blockchain subscription pay manager application is allowed to access said user blockchain account of said user; in response to receiving a request via said link or code to access said subscription payment plan invoice, providing access to said new subscription plan invoice via a graphical user interface of said blockchain subscription pay manager application; receiving user entered instructions into said graphical user interface confirming user information in subscription payment plan invoice for subscribing to said new subscription payment plan; receiving user instructions entered via said graphical interface of said blockchain subscription pay manger application to set up payment according to said subscription payment plan invoice; and sending over said computer system said information about said new subscription plan payment plan for processing by said blockchain subscription smart contract to perform said recurring payments from said user subscription wallet to said merchant subscription wallet.

According to another aspect a non-transitory, computer-readable medium comprising program code that, when executed by one or more processors of a computer system, causes the one or more processors to perform a method of managing a blockchain subscription payment using a decentralized application, the decentralized application comprising a blockchain subscription pay manager application and a blockchain subscription smart contract; the blockchain subscription pay manager application being configurable for sending and/or receive instructions between the blockchain subscription pay manager application and the blockchain subscription smart contract on the blockchain via a proxy/bridge. The method may comprise interfacing said blockchain subscription pay manager application with a blockchain account of a merchant via said bridge/proxy; receiving authorization that the blockchain subscription manager application is allowed to access said merchant blockchain account of a merchant; rendering on a graphical user interface of the blockchain subscription pay manager application of a computing system, a new subscription payment plan set up tool for facilitating set up of new subscription payment plan by the merchant; receiving via said graphical user interface of the blockchain subscription pay manager application new subscription payment set up instructions entered using said new subscription payment plan set up tool for setting up said new subscription payment plan; the new subscription payment plan being implemented in the form of a subscription blockchain smart contract for automatically making recurring payments from the user subscription wallet associated with the user blockchain account of a user to the merchant subscription wallet associated with the merchant blockchain account; generating a subscription payment plan invoice in said computing system for payment from the user subscription wallet according to said new said subscription plan; the subscription payment plan invoice including details of the new subscription payment plan and a request for the user to provide confirmation information for subscribing to the subscription payment plan; and generating a link or code for a user device to access said subscription payment plan invoice via a graphical user interface of a blockchain subscription pay manager application of the computing system. The method may further comprise interfacing said blockchain subscription pay manager application with the blockchain account of a user via said bridge/proxy; receiving in the computer system authorization that a blockchain subscription pay manager application is allowed to access said user blockchain account of said user; in response to receiving a request via said link or code to access said subscription payment plan invoice, providing access to said new subscription plan invoice via a graphical user interface of said blockchain subscription pay manager application; receiving user entered instructions into said graphical user interface corresponding to or confirming user information in subscription payment plan invoice for subscribing to said new subscription payment plan; receiving user instructions entered via said graphical interface of said blockchain subscription pay manger application to set up payment according to said subscription payment plan invoice; and interfacing said blockchain subscription pay manger app with said bridge/proxy for configuring said blockchain subscription payment smart contract to implement recurring payments according to said new subscription payment plan. The method may further comprise repeating the aforementioned steps for each one of plurality of different users for the same and/or different subscription payment plan and/or for each one of plurality of different merchant user accounts. The method may further comprise: triggering by the blockchain subscription pay management application a link or graphical user interface for accessing the user personal smart contract wallet via said bridge/proxy to confirm fund transfer(s) between said user personal smart contract wallet and said user subscription wallet. The new subscription payment plan set up tool on said graphical user interface may comprise a new subscription payment plan set up fillable form including an activatable button for a merchant to activate the new subscription payment plan set up process. The new subscription payment plan set up fillable form may include a field for receiving a payment destination address associated with the merchant personal smart contract wallet. The method of generating said blockchain subscription payment plan invoice may further comprise: rendering an invoice including fields for entering user information and rendering on the invoice an activation button or link for activation by the user to confirm subscription to the new subscription payment plan.

According to another aspect, a system comprises a processor; and a memory for storing executable instructions, the processor executing the instructions to: receive authorization that a blockchain subscription manager application is allowed to access a merchant blockchain account of a merchant; render on a graphical user interface of the blockchain subscription pay manager application of a computing system, a new subscription payment plan set up tool for facilitating set up of new subscription payment plan by the merchant; receive via said graphical user interface of the blockchain subscription pay manager application new subscription payment set up instructions entered using said new subscription payment plan set up tool for setting up said new subscription payment plan; the new subscription payment plan being implemented in the form of a subscription blockchain smart contract for automatically making recurring payments from a user subscription wallet associated with the user blockchain account of a user to a merchant subscription wallet associated with the merchant blockchain account; generate a subscription payment plan invoice in said computing system for payment from the user subscription wallet according to said new said subscription plan; the subscription payment plan invoice including details of the new subscription payment plan and a request for the user to provide confirmation information for subscribing to the subscription payment plan; generate a link or code for a user device to access said subscription payment plan invoice via a graphical user interface of a blockchain subscription pay manager application of the computing system.

According to another aspect, a non-transitory, computer-readable medium may comprise program code that, when executed by one or more processors of a computer system including a blockchain network of nodes, causes the one or more processors to perform a method of recurring blockchain subscription payments according to a blockchain subscription smart contract, the method may comprise receiving instructions to set up a recurring payment between a merchant subscription wallet and a user subscription wallet according to a subscription payment plan; and automatically implementing recurring payments between said user subscription wallet and said merchant subscription wallet according to said new subscription payment plan. The method may further comprise receiving in a blockchain subscription payment client application payment data associated with the user subscription wallet; rendering on a user dashboard said user subscription wallet payment data. The method may further comprise retrieving private user information associated with the user account holder of the user subscription wallet from a centralized platform/server database; and rendering on said user dashboard said private user information in conjunction with said user subscription wallet payment data. The method may further comprise receiving in a blockchain subscription payment client application payment data associated with the merchant subscription wallet; rendering on a merchant dashboard said merchant subscription wallet payment data. The method may further comprise retrieving private merchant information associated with the merchant account holder of the user subscription wallet from a centralized platform/server database; and rendering on said merchant dashboard said private merchant information in conjunction.

Any of the aforementioned methods or system claims also being recited as means-for or step-for element claims and being provided their full statutory equivalents.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIGS. 10-11 collectively illustrate graphical representation of an example platform and deployment method.

FIG. 16 illustrates a user dashboard graphical user interface provided by a blockchain subscription pay manager application according to an embodiment.

FIG. 17 illustrates a merchant dashboard graphical user interface provided by a blockchain subscription pay manager application according to an embodiment.

FIG. 22 is an exemplary New Subscription Plan GUI configured to receive set up instructions that may be entered into the merchant device by a merchant setting up a new subscription plan according an embodiment;

FIG. 23 is an invoice GUI configured to receive user contact information instructions that may be entered into the user device by the user subscribing to the new subscription according to an embodiment;

DETAILED DESCRIPTION OF PREFERRED EMBODIMENTS

Figure 1A:
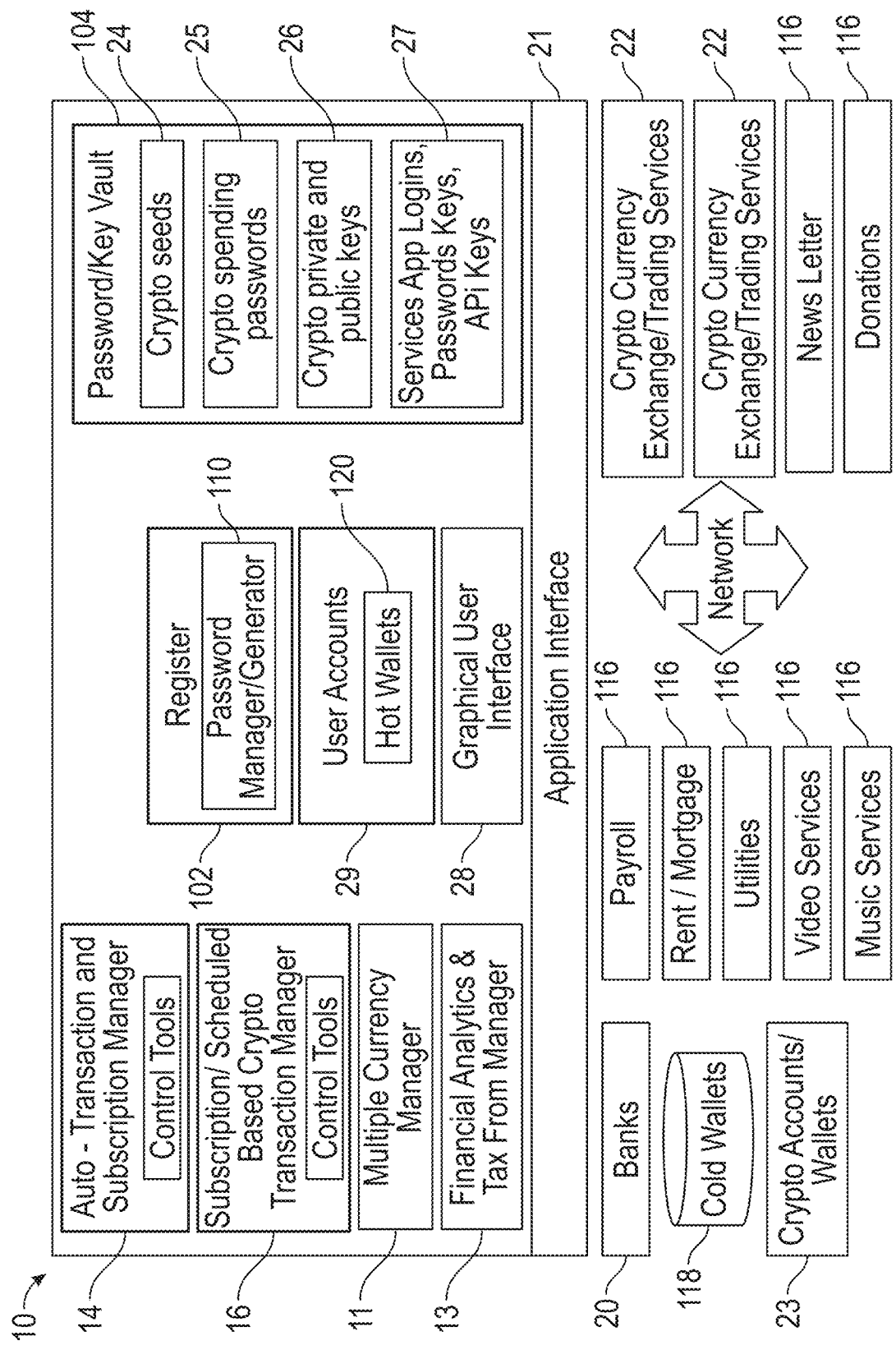
FIG. 1A is a schematic diagram of a system that can be used to practice aspects of the present disclosure according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Technical features described in this application can be used to construct various embodiments of systems and methods for management of a plurality of subscription services via a user account registered with a computing device application.

Technical features described in this application can be used to construct various embodiments of systems and methods for management of cryptographic transactions between a user account registered with a computing device application and a plurality of digital services and merchants.

In one approach, systems and methods are provided that employ aspects of password/key and subscription management to provide seamless integration and interaction with a plurality of different subscription services. In some embodiments, the computing device application is configured to allow a user to add their bank account information to the system to allow the purchase of various crypto assets solely from the application platform. The application platform is configured to allow a user to be able to buy or sell crypto assets and then transfer the fiat back into their bank account. In addition, a password generation tool is configured to provide electronic storage of the users private keys and passwords to all their crypto and non-crypto sites and services.

In some embodiments, a subscription and recurring payments tool is integrated in the computing device application, such as a mobile app, that will allow users registered with the system to monitor, start and stop all subscription services to places like Netflix, mortgage companies, utility bills, car payments, Amazon etc. from the swipe of the mobile application.

In some embodiments, Tokens, known as Monarch Tokens, are created and distributed by the computing device application or provider thereof. The system is configured to use 10%, or other percentage of all Token sale proceeds to back Tokens, with physical, verifiable silver assets. Additionally or alternatively, in some embodiments, the system is configured to use 10% or other percentage of transaction fees to purchase silver assets thus ensuring one day, with proper adoption, a fully backed silver asset coin to help fend off volatility or a worthless coin or token.

In some embodiments, the computing device application is configured to allow cold storage of BTC, ETC and all ERC-20 Tokens. In addition, in some embodiments, the application includes a portfolio tracker and a news and events section both configured to keep users up to date on the news and the portfolios status.

Using an easy to understand graphical user interface of the computing device application, the user is able to control their every day bills, services, subscriptions, passwords and of course buy and sell crypto assets from a few swipes of their screen.

Despite the surge of research and interest in blockchain technology, interfaces are still not simple and intuitive, the barrier to entry is still difficult for non-technical users/audience, and usability of most cryptocurrencies is still severely limited.

The computing device application payment platform of at least some embodiments enables users to "Be Their Own King," providing a simple and easy to use bridge to all consumers and merchants. An all-encompassing tool to bring functionality to cryptocurrencies to be usable in the real world.

The computing device application of embodiments lets you be the king of all your portfolio and payment necessities. Cryptocurrency complexities are a thing of the past with the system management application of embodiments being configured to store password and 2 FA codes and a cold storage wallet to securely handle all your Cryptocurrencies where you own your own private keys, and traditional fiat payment all from one simple application. The application platform of some embodiments is configured to connect to 3rd party exchanges (Binance, Bittrex, Coinbase etc) so that users can trade from one easy application. Furthermore, the application platform provider in some embodiments partners with exchanges and/or the application platform is configured to monitor the exchanges in order to find the best possible buy and sell price among the seemingly countless exchanges.

Another deterrence from mass adoption of cryptocurrencies as a payment method is the constant volatility of cryptocurrencies. In some embodiments, the system is configured such that 10% or other percentage of Monarch Security Token or other cryptocurrrency is backed by silver, or other precious metal or commodity, paid for by the proceeds generated from the Token Sale. In some embodiments, the system is configured to continuously buy physical silver, or other precious metal, using 10%, or other of the transaction fees in the ecosystem. In some embodiments, the system has a Hot Wallet ecosystem which is configured to continuously fund the Monarch Security Token or other cryptocurrrency with silver from 10%, or the other percentage, of the proceeds of the transactions fees. In some embodiments, the system is configured to distribute an additional 50% or other percentage of Hot Wallet transaction fees proportionally to the Monarch Security Token Holders. In some embodiments, the system is configured to utilize a two token structure, the Monarch Security Token and the Monarch Utility Token. The Monarch Security Token is configured to allow holders to benefit from the token backing in physical silver and the distribution of dividends. The Monarch Utility Token is configured to be utilized as a transactional medium to optimize fee structure and payment remediation.

In some embodiments, the computing device application is configured to enable users to see what subscriptions they are enrolled in and have access to manage (start, stop, continue) all subscriptions (examples ranging from Netflix, to Spotify, to your cell phone bill) from one platform, the mobile app. The computing device application of some embodiments gives you access to easily manage all your subscriptions via "1 Touch" from one location allowing the user to:

In some embodiments, the system of some of the embodiments is configured to allow the user to do any one or any combination of the following:

use only one password for all services,
generate a new password for each service yet the user will only need to remember one password to access the computing device application platform.
user will yet be able to interact with all services that they are subscribed to for example Amazon, their mortgage company, Netfix etc. All passwords used through the application platform of some embodiments will be retrievable both on and off chain if needed by the user.
Pay for subscription based services in multiple currencies including fiat, and cryptocurrency.
Set recurring payments between two peers or peer to business or business to business (e.g. setup a recurring payment channel to pay your mother $40 each month for your cell phone bill, car payments, mortgages, Netflix etc)
Store their funds in our cold storage wallets where they would still own their private keys. In addition a hot wallet to manage and pay for subscriptions and transact instantly
receiving of funds in fiat or cryptocurrency.
Create or use an exchange that will allow users to purchase, sell and hold various cryptocurrencies at best possible prices through arbitrage.
Create or use an additional (Swipe left/right etc) UI platform that allows the user to pay and track all recurring bills and settle their accounts similar to a condensed QuickBooks style experience/platform.
Swipe left/right etc to add a new service provider (Monarch will partner with various service providers for the users benefit)
Swipe left/right to cancel a service provider.
Create or use a mobile platform to utilize all the above services with just a few clicks or swipes from their phone.

Currently there is no easy method to use a plug and play option for Merchants to accept cryptocurrency in their marketplace or utilization of subscription cryptocurrency payment. On top of lack of functionality of cryptocurrency payments, user experience and interface for cryptocurrency and subscription payment, there are no suitable payment gateways available for merchants.

Consumers and merchants both struggle with the common core problem of the "Push technology" and service usability of a variety of cryptocurrencies. Currently, there is no easy way to use plug and play option for merchants to accept cryptocurrency as a form of payment. In some embodiments, the system includes a "Monarch Platform Plugin" configured to allow merchants to have a seamless functioning payment solution to accept a variety of the most common cryptocurrencies available. The Monarch platform plugin is configured to be an all-encompassing solution to accept fiat and cryptocurrencies with a specialized focus in customer management, subscription tier, and inventory management. Consumers will have the luxury of their preferences being saved, multiple payment options, and a seamless checkout experience; and merchants will have the customer logistics in place to manage their business.

In some aspects, the present disclosure provides systems and methods for implementing unique access schemes for data stored in a blockchain. Some embodiments can be extended for use in allowing blockchain and cryptocurrency acceptance in many industries.

For context, despite widespread basic knowledge regarding blockchain technology and cryptocurrencies, cryptocurrencies seem to be far from mass adoption. Despite the surge of research and interest in blockchain technology, architectures and interfaces are still not simple and intuitive enough for users and the barrier to entry is still difficult for non-technical users/audience.

There is large barrier to entry by the masses into cryptocurrencies for many reasons. Several of these reasons are due simply to the complexities of just buying and selling crypto assets then trying to cash them out into fiat currency. Then there is hassle and potential loss of all their assets by simply misplacing or forgetting their private key or seed. Then there is the countless KYC processes and account setups required to use the various exchanges to buy and sell their crypto asset of choice. In addition their crypto asset could simply fall to a value of zero.

Moreover, the usability of most cryptocurrencies is still severely limited. The landscape of blockchain for conducting transactions, monetary or otherwise, are replete with technical problems due to a lack of consistency in how various blockchain technologies work and, how or if, legacy non-blockchain systems can function alongside blockchain technologies.

In at least some aspects, the present disclosure provides for an access and/or payment platform design that enables users to "be their own king," providing a simple and easy to use bridge or interface to all consumers and merchants. To this end, the present disclosure describes embodiments of all-encompassing tools that bring functionality to cryptocurrencies enabling usability of blockchain and specifically cryptocurrencies in the real world. In sum, the solutions provided herein allow a user to store cryptocurrencies, send cryptocurrencies, manage passwords, private API keys, manage subscriptions, and provide a fiat on-ramp, exchanges of cryptocurrencies, and other similar features that allow the user to be in complete control of their blockchain data.

Cryptocurrency complexities are reduced using the systems and methods of the present disclosure which provide specific technical improvements such as centralized management and storage of a plurality of passwords for users, enhanced and protected using two-factor authentication codes, along with a data vault component that can be implemented in part as a cold storage wallet to securely handle all or many of a user's cryptocurrencies. Advantageously, these systems allow users to own their own private/unique/secret application programming interface (API) keys, and also enable traditional fiat payment all from one simple application. The platforms disclosed herein can connection to third party exchanges such as Binance™, Bittrex™, and Coinbase™—just to name a few.

According to some aspects, the present disclosure provides systems and methods that allow users to manage payment relationships with transacting parties. For example, a user can see (using interactive graphical user interfaces) what subscriptions they are enrolled in and have access to manage (e.g., start, stop, continue) all subscriptions (examples ranging from Netflix™, to Spotify™, to a cellular phone bill) from one platform. In some embodiments, the platform is enabled and accessible through an application or program. In various embodiments the application is embodied as a mobile device application. Users can use the application to access and easily manage all their subscriptions via "1 Touch" from one location. This configuration allows users to pay for subscription based services in multiple currencies including fiat, and cryptocurrency. Users can also use the platform to set recurring payments between two peers (e.g. set up a recurring payment channel to pay another party $40 each month for a particular bill). In another example, a user can store funds in a cold storage wallet and own private API keys and unique passwords that define relationships between a user and various transacting parties such as merchants or other individuals. The user can also use a hot wallet to manage and pay for subscriptions and conduct transactions instantly. Users can receive funds in fiat or cryptocurrency through the platforms.

The platforms disclosed herein can facilitate an exchange that will allow users to purchase, sell, and hold various cryptocurrencies at best possible prices through arbitrage, as well as create an additional UI platform and user actuations (such as left and/or right swiping on a subscription, invoice, bill, or other payment request) that allows the user to pay and track all recurring bills and settle their accounts using a condensed style experience/platform.

It will be understood that consumers and merchants both struggle with the common core problem of "push technology" communications/transactions and service usability of a variety of cryptocurrencies. Currently, there are no easy to use plug-and-play options for merchants to accept cryptocurrency as a form of payment. The merchant platform APIs/plug-ins of the present disclosure allow merchants to have a seamless functioning payment solution to accept a variety of the most common cryptocurrencies available. These platform plugins are an all-encompassing solution to accept fiat and cryptocurrencies with a specialized focus in customer management, subscription tier, and inventory management.

Consumers can have the luxury of their preferences being saved, multiple payment options, and a seamless checkout experience; and merchants have access to customer logistics to manage their business. Currently, merchants also have no easy way to leverage subscriptions via cryptocurrencies with consumers. As noted above, the platform remedies these technical drawbacks.

It will be understood that various intricacies of generating cryptocurrency transactions contribute as barriers to entry for widespread adoption of cryptocurrencies. The security, privacy, and speed of transactions of cryptocurrencies surmount its traditional fiat counterpart. However, the complexities of blockchain technology and non-intuitive user interfaces keep novices from accepting cryptocurrencies as a form of payment. Existing payment platforms options for both consumers and merchants are lacking critical features and functionality when compared to traditional fiat payment platforms.

The platforms of the present disclosure bridge the gap between the cryptocurrency space and traditional marketplace payment platforms. An all-inclusive application/platforms are disclosed that include, for example, a data vault that includes a cold wallet for proper storage of cryptocurrencies and a hot wallet for instant remunerations, as well as unique payment operability for subscription payment and installment plans. A user can, through the application/platforms disclosed herein, store their cryptocurrency in their cold wallet, such as Bitcoin, Ethereum, and All ERC20 Tokens—just to name a few. The applications also display news, track assets, and allow users to send and received payments in any desired cryptocurrency format and/or fiat currency.

These platforms also provide tangible value to the cryptocurrency community by distributing fees charged per transaction and by the purchasing of an underlying commodity, such as silver assets via transactions fees. These advantages improve blockchain adoption with an all-in-one user experience for all payment and portfolio management needs.

The present disclosure of some embodiments also contemplates that the application can integrate price alerts (e.g., such as cryptocurrency prices) using PUSH notification or other communications methods where appropriate. These and other advantages of the present disclosure are provided in greater detail infra.

Reference will not be made to the accompany drawings further to illustrate some embodiments of the present technology. Those skilled in the art would understand that the figures showing system embodiments of the present technology are for illustrative purposes only to provide an overview of the system components and functionality. One or more of the individual modules or components shown or described herein with respective to different embodiments of the system, can, be combined, integrated with one another and/or omitted as would be understood by a person of ordinary skill in the art. The components of the systems of the embodiments described herein can be implemented as a distributed computing architecture in some embodiments. In other embodiments, the components can be embodied in other types of computer architecture including but not limited to a centralized network or a decentralized network. Crypto currencies include currencies that possess their own independent blockchain. The crypto currencies can be derived from Bitcoin's open-source protocol or crypto currencies that have created their own Blockchain and protocol that supports their native currency. Non-limiting examples of these coins include Ethereum, Ripple, Omni, Nxt, Waves and Counterparty.

FIG. 1A illustrates an example system (e.g., platform) of the present disclosure according to one aspect. The system 10 has all encompassing tools/components that are configured to perform system functionality as described herein to provide an application user with seamless integration and interaction with digital subscription services and/or cryptocurrency transaction services. In some embodiments, system 10 enables the use of a client-side application to access the system, which can be for example a mobile device application. In other embodiments, users can access the system 10 directly through the use of web forms or a website rather than a client-side application. The GUIs generated for the client-side application would in some embodiments be configured for Smartphone or mobile device usage. Thus, the client-side application can be adapted for iOS™ or Android™ deployment. The client-side application can comprise both an end-user facing version for end users (e.g., payors) and a merchant-facing application for merchants or other entities (e.g., payees).

System 10 generally is operably configured to interact over a network with a plurality of different services and merchants. As shown in FIG. 1A, the system is configured to interact with a plurality of different subscription services 116 and a plurality of different crypto currency exchange/trading services 22. The plurality of subscription services 116 comprises payroll, rent/mortgage, utility bill, video, music, newsletter and donation subscription services 116 but in other embodiments any other type or any combination of subscription services are envisaged. The system is also operably connected to banks 20 for accessing bank accounts of user accounts registered with the application client, as well as crypto accounts/wallets 23 of third party individual users not registered with the application client and regular merchant services.

The system has an auto-transactions and subscription manager 14 which is operably connected with other components such as the registrar 102 and password generator manager 110, multi-currency manager 11, and subscription/scheduled based crypto transaction manger 16. It is envisaged that in practice some or all of these components are integrated together in the system including the application program but also that some of these components can be separate or omitted.

Password manager/generator 110 is configured to operate as a password generation tool and to handle electronic storage of crypto seeds 24, crypto spending passwords 25, crypto private and public keys 26, including one or more private keys of a multisignature crypto key, passwords, logins, keys and private and public Api keys to all the crypto and non-crypto sites and services with which the user of the user account is registered or which have been accepted or authorized to use by the user account. The vault, or some other storage, is accessible by the subscription manager, crypto transaction manager 16 so that the application can use the appropriate keys and/or passwords 24 to 27 stored therein for the purpose of automatically interacting with the plurality of services 116, 22 and any other entities 20, 23, 118 and performing scheduled or recurring cryptocurrency transactions, subscription transactions and/or other subscription operations.

System 10 further includes one or more communications/application interfaces configured to allow communication between the plurality of different third party/external computing devices and platforms and systems that provide the services 116, exchanges 22, bank services etc.

System 10 enables any one or combination of 1) auto-payment and subscription management, 2) Password Management, 3) Subscription Based Crypto Payments, 4) Multi-Currency Support, 5) Registration and 4) Financial Analytics & Tax Form Management.

(1) Auto-Payment and Subscription Management

Subscription services can be difficult to manage and/or modify. Consumers get billed for renewals due to conditions buried in fine print that can be extremely difficult to identify for the average user/consumer. Consequently, consumers may spend money for years on a service before realizing that it is no longer utilized. In some instances, customers who are incapacitated can continue to be billed for subscription services which can lead to a huge financial detriment upon release. If a consumer wants to discontinue a service, they have to follow a cumbersome process when they have forgotten their login credentials especially since each service is managed separately.

With the system 10, management of subscription based services 116 will be able to be done from one platform, via the client side application on the mobile or other computing device. Registrar 102 is configured to allow users to register for services 116, generate by means of password manager/generator 110 a Secret API Key 27 that allows subscription based merchants 116 to call on for payment. The auto-payment and subscription manager 14 has control tools for interaction by a human via graphical user interface 28 or automatically via the system interfaces to control auto-payments and subscription sets for each one of the plurality of subscription services 116. By way of example, in some embodiments the system is configure to render on graphical user interface 28, an easy on/off switch management interactive tool for managing each one of the plurality of subscription services onto graphical user interface 29. In some embodiments, the interactive tool is a toggle or other switch (see for example FIG. 3 of one embodiment) configured to immediately end payments to any service by sliding a switch left or right. This deactivates the API Key 27 linked to user account 29 and removes the ability for that specific company to call on the wallet 120 associated with the user account 39 for payment.

In some embodiments, the auto-payment and subscription manager 14 can be combined with at least some of the other components of the system 10 to provide a subscription management application capable of rendering on the graphical user interface 29 management control tools for controlling subscription settings and receiving instructions, either via the network and/or and or graphical user interface, for controlling scheduled or recurring transactions with the subscription services in accordance with methods disclosed herein.

(2) Password Management

Password management is difficult when the average adult has on average about 27 discreet online logins. While 27 discreet logins is average, the amount of unique passwords a user has is almost always lower than the amount of discreet logins they have. This is due to people using the same password multiple times, or a variation of a commonly used password. This helps explain why 37% of people forget a password at least once a week. Furthermore, the number of online accounts people have to manage is only going to continue to increase In some embodiments, system 10 is configured such that upon initial download of the application to the mobile or other computing device, the system 10 requires you to write down or store a 12 word seed which will allow the user to recover his/her password vault on a new device. In some embodiments, the need to write down the seed is not necessary, and the system is configured to provide backup recovery using the system's private blockchain. When registering for new services 116, 22 or other services requiring logins or passwords, keys to perform actions, password/manager generator 110 is configured to automatically generate a random password or other password/key. In some embodiments, system 10 is configured to use the maximum number of available characters specific to the service you are registering for. This process occurs when a user signs up for a new service 116, 22 through the system client-side application. Additionally, the password manager 110 is configured to store this password(s) and/or key(s) 24-27 in the Password Vault 104. In some embodiments, the password manager 110 is configured to store the password(s) and/or key(s) in the password vault 104 or other storage (local or remote) cryptographically on the blockchain. In some embodiments, the passwords/keys 24 to 27 are always editable and recoverable through users 12 word seed.

Secure storage of both passwords and 2 factor authenticator keys are vital to every cryptocurrency investor. The password vault 104 is configured to facilitate the secure local storage of sensitive information of each user having a user account 29 with the system.

3) Subscription Based Crypto Payments

Subscription based crypto payments are currently not available. Some merchants provide the ability to pay for goods and/or services in cryptocurrency, however, it is usually a one-time payment transaction. The goods or services are typically priced in a pegged fiat amount and the appropriate amount of cryptocurrency is sent from the buyer to the merchant at the time of transaction. The merchant's Bitcoin or other cryptocurrency is then susceptible to volatility as it was based on the current market value at the time of payment. For example, a merchant can receive $20 for a good or service today and tomorrow it can be worth $10 if the market value of the currency used declines by 50%.

Figure 1B:
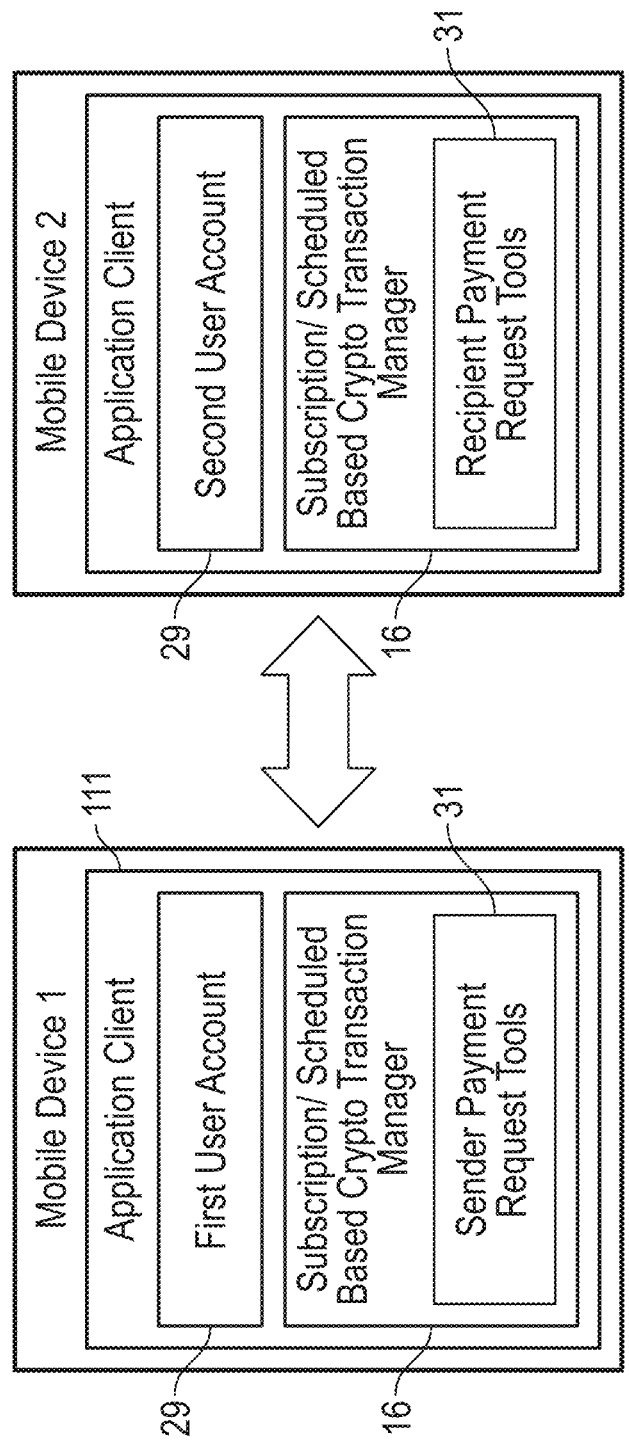
FIG. 1B is a schematic diagram of computing devices running client-side applications that access the system of FIG. 1A according to some embodiments.

System 10 and some other embodiments of the system alleviate some of this issue. First, system 10 is configured to send and request payments over the network on a scheduled basis using cryptocurrency. System 10 is configured to allow a user to initiate a new "stream" to another user in the system using just their username, or e-mail they associated with the user account 29 upon registration with the system or thereafter. By way of example, reference is made to FIG. 1B which illustrates a client side application 111 running on a first mobile phone device of a first user and a client side application 111 running on a second mobile phone device of a second user. Both first and second users are registered with the cryptocurreny transacting application of system 10 and both are configured to be operably connectable to one another over networks and have access to system 10. System 10 is configured to allow a the first user to initiate a new "stream" to another second user account 29 in system 10 using sender payment request tools 31.

The first user can send a payment request to the second user account 29 using the sender payment request tools 31. The first user enters into sender payment request tool 31 the username, or e-mail the second user has associated with their second user account 29. Alternatively, this information can be entered automatically by the system. A simple username allows the first user to easily search for the second user account and add each other to a friends list. Using this information, the system 10 is configured to then select the frequency for which they will be sending and/or requesting payment (e.g. daily, weekly, monthly). In some embodiments, this frequency and other control information can be manually adjusted by the first user using the sender payment request tools 31 or in other embodiment set automatically according to second user account details or other information. System 10 then sends the payment request in response to receiving user interface instructions from the first user. After system 10 sends the request to the second user account 29, the request is rendered on the graphical user interface of the system client-side application of the receiving user computing device (mobile device 2 in FIG. 1B). The receiving second user will find the request in their second user account 29 by access via their own client-side application 111 of the system 10. The second user can then authorize, view and or modify the payment request using the recipient payment request tools 31. System 10 is configured to authorize the scheduled or recurring payments in response to receiving user instructions from the receiving user account 29 (second user account 29 in FIG. 1B) to authorize the payment or transaction. In some embodiments, the receiving user must authorize the scheduled payment by pressing "authorize" or some other user interface control on the graphical user interface 29 of the receiving user client-side application of system 10. Until funds are exhausted from the users hot wallet 120, payments will be sent until the selected service is shut off in the list of services menu.

In some embodiments, the crypto currency manager 14 can be combined with at least some of the other components of system 10 to provide a crypto currency management application capable of rendering on the graphical user interface 28 management control tools for controlling cryptocurrency transaction settings and receiving instructions, either via the network and/or and or graphical user interface, for controlling and performing the cryptocurrency transactions in according with embodiments of methods described herein.

4) Multi Currency Support

Multiple currencies for both merchants and customers is rising in popularity as several Fortune 500 companies have decided to support the adoption of cryptocurrencies. The advent of cryptocurrencies has required many enthusiasts in the space to constantly shift between different currencies (fiat & cryptocurrencies included) in order to pay for services. Additionally, merchants have limited themselves in not giving customers the flexibility to pay in other currencies. The volatility of cryptocurrencies has held merchants back from accepting these alternative forms of payment as well.

System 10 and some other embodiments combat some of the volatility of cryptocurrency by allowing merchants to accept multiple currencies while receiving payments in whichever currency they desire (fiat included). In some embodiments, simultaneously, a user through their user account 29 is able to pay for their favorite services using any currency the system platform supports. System 10 is configured to do this by exchanging a cryptocurrency payment in a first currency from the user account 29 in to payment in a second currency (such as FIAT or different crypto currency) which the recipient accepts. System exchanges the first currency payment into a second currency payment using any one of a plurality of the cryptocurrency exchanges 22 and then paying the selected subscription service or other merchant or user in the second currency. In some embodiments, the system automatically processes the exchange by accessing from the password vault 104, or other storage, any of the seed/password/private/public keys/logins 24 to 27 associated with the user and any of the other systems being accessed and then uses them to perform the exchange from the first currency to the second currency and then pay the recipient in the second currency. In some other embodiments, system 10 receives the payment in the first currency in a system account that is associated with the system 10 and independent from the user account and then exchanges and makes the payment to the recipient using its own seed/password/private/public keys/logins. In some embodiments, the private and public keys of the user are automatically retrieved and used by the system.

In some embodiments, the system is configured based on leveraging external exchanges to provide the liquidity in the system ecosystem initially.

In some embodiments, system 10 has its own exchange to better manage liquidity and remove the need for 3rd party providers. For example: A customer wants to pay for Netflix using Bitcoin but Netflix does not accept Bitcoin. Using system 10, Netflix could choose to accept this customer's payment, and receive it in fiat (Or USD) instead of Bitcoin. Netflix could also choose to keep the payment in BTC but would be susceptible to the volatility of cryptocurrency and would have to make this decision internally.

5) Registration

Registration of multiple services is repetitive and time consuming. Additionally, centrally storing this information poses a huge security threat. During 2017, one of the largest security breaches in history exposed over 140 million Americans, compromising their social security numbers, birth dates, addresses, and credit card information. Many service providers ask for the same basic information that can be used to register for future accounts. Additionally, the cost of data acquisition for some accounts such as financial institutions is quite high. In 2017, firms deployed an average of 307 employees to process KYC information.

In some embodiments, system 10 is configured as centralized solutions to create easy registration processes. Similar to logging in with Facebook, system 10 is configured to create a process that allows a user to easily sign up for new services, permitting only the data points the requesting company requires. In other embodiments system 10 is configured to use identity verification blockchain solutions such as Ink Protocol, Bloom, Verime, Civic and/or SelfKey which decentralize sensitive information related to identity and credit worthiness. Registration processes such as these will save time for the consumer, money for the service providers, and security advantages for all involved parties.

6) Financial Analytics & Tax Forms

Financial and tax information can be difficult to reconcile, especially for cryptocurrency. With the adoption of cryptocurrencies rising, more and more people are making payments in alternatives to FIAT currencies. Blockchain technology has allowed better transparency by making all transactions public on a shared ledger. One would think it would be easier than ever to provide users with the best analytics engines and tax reconciliation products. However, with payments being processed from so many different places and no possibility of managing subscriptions via cryptocurrency, there remains very few options are available.

System 10 and some other system embodiments allows users to effortlessly manage user finances and taxes in one place. Users will be able to easily create budgets, analyze spending habits, as well as track and pay bills like never before. You can also choose to receive alerts when payments are due, avoiding late fees. Simple categorization will also allow users to track their investments strategically from one platform.

In addition to providing advanced financial analytics to better understand your spending habits, systems of embodiments are configured to make accounting an easier process. In some embodiments, blockchain technology is integrated in the system to allows for such processes to happen automatically and in real time. Additionally, immutability of the public ledger also creates the ability to conduct easier audits. During registration of a new service, a user will permit certain pieces of data to be obtained by the merchant. For example, email, password, first name, last name, and address.

In some embodiments, the computing device application is configured to define its own KYC, background check rating and/or credit or other financial rating according to the system's own rules and standards. In some embodiments, the application is configured to automatically obtain from the merchant digital service or transaction provider, which the registrar 102 accesses to register a user to the merchant, the format or type of KYC/Background Check/Credit Score or other background/verification information that is required to register the user and to then obtain that information for a particular user and/or generate its own customized KYC, background check rating and/or credit or other rating according to the system's own rules and standards. In some embodiments, the registrar is configured to automatically use this information during registration.

Furthermore, in some embodiments, additional user background and/or verification information, such as identity, criminal, financial, social media history, credit worthiness or other information, for the particular user can accompany derived by the system and held in the vault, or other storage, for registering with the subscription or other services via the application and for use in automatically interacting between the user account 29 and the plurality of subscription or other services when performing automatic scheduled or recurring transactions between the user account and the service(s). In some embodiments, this form of background and/or verification information can serve as a password in itself.

In some embodiments, application is configured to obtain this background or other information from the appropriate databases using blockchain or other cryptographic technology. In some embodiments, the password manager is configured to cryptographically store background or other information generated or determined by the system, for a particular user account 29, in the vault 104, or other storage, for subsequent retrieval by the particular user and/or for use in registering the particular user with the merchant service.

In some embodiments, the application is configured to receive instructions via a user interface of the application and generate and/or distribute Tokens to users over the network. In some embodiments, new tokens are created and distributed to the public through an Initial Coin Offering (ICO), which is a means of for example crowdfunding. Tokens are a representation of a particular asset or utility that usually resides on top of another blockchain. Tokens can represent basically any assets that are fungible and tradeable, from commodities to loyalty points to even other cryptocurrencies.

In some embodiments, the application is configured to use a percentage of token sale proceeds to back the Tokens or other crypto currency by a physical commodity, such as but not limited to a verifiable precious metal asset. For example, in some embodiments, 10% or other percentage of the transaction fees will also be used to purchase silver assets, or other physical commodity, thus ensuring one day, with proper adoption, a fully backed silver asset coin to help fend off volatility or a worthless coin or token. In some embodiments, system 10 is configured to include an auditing system based on block chain technology for monitoring the backing by the system of the Tokens or other cryptocurrency with silver or other physical commodity. The system is configured to provide account users with access through the application client 111 to the audit system data or to auditing data provided by a third party to enable them to verify the backing of the tokens or other cryptocurrency is being performed properly.

In some embodiments, application is configured to and generate and/or distribute tokens on top of a block chain to users over the network.

Figure 2:
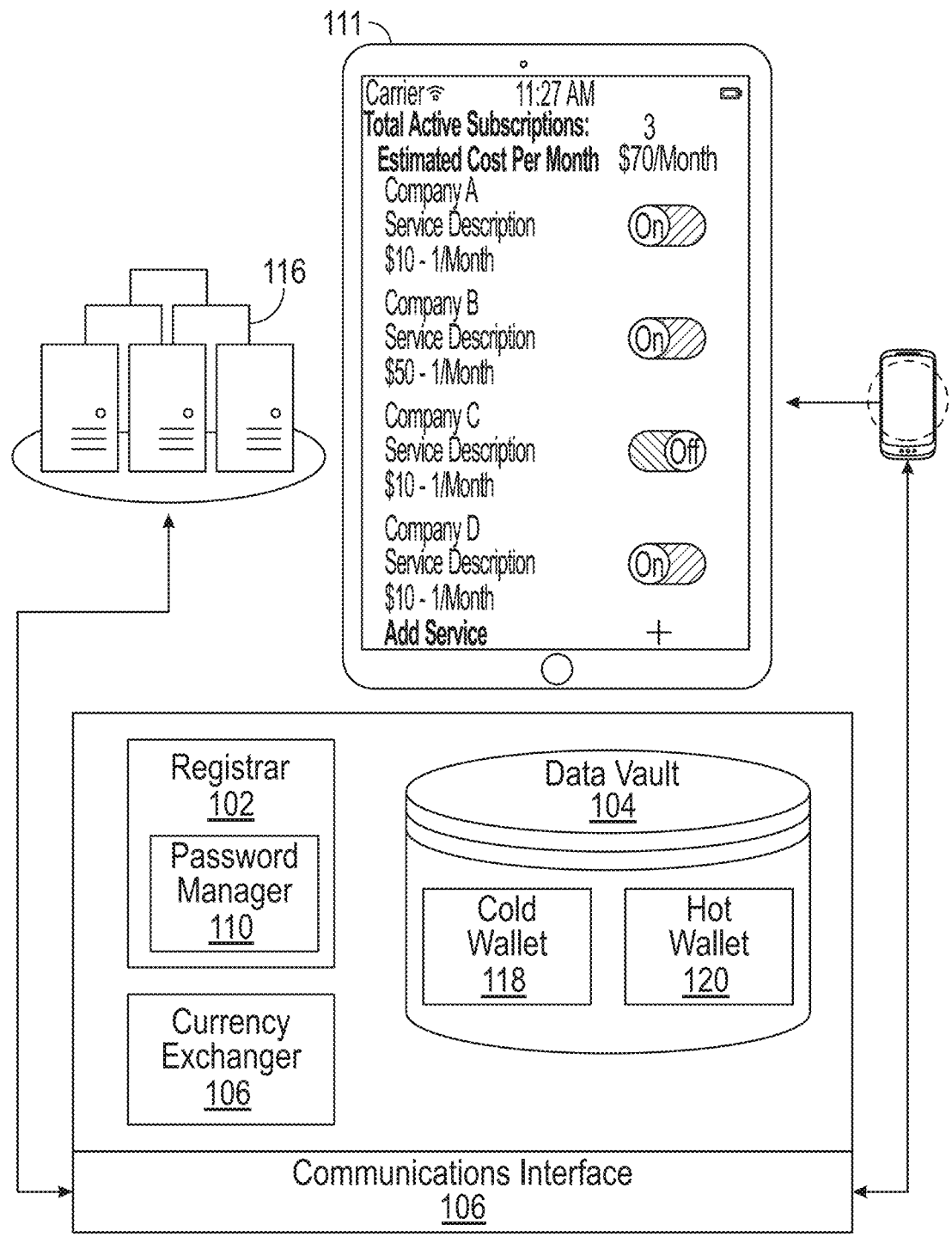
FIG. 2 is a schematic diagram of an example system that can be used to practice aspects of the present disclosure according to some embodiments.

System 100 can include cold storage 120 and hot storage 118 of BTC, ETC and all ERC-20 Tokens for example. In some embodiments, an application is configured to track news and events to enable the application user to keep up to date on the news and events and access the portfolios status In order to explain some other aspects of the system reference will now be made to some more embodiments of the present disclosure. FIG. 2 illustrates an example system (e.g., platform) of the present disclosure according to some embodiments. The system 100 generally comprises a registrar 102, a data vault 104, a currency exchanger 106, and a communications interface 108. For the sake of clarity, other management components, such as those additionally shown in system 10 of FIG. 1 are not shown but it will be understood that one or more of those components may be incorporated in the system in some embodiments, where appropriate. The components of system 100 can be embodied as a distributed computing architecture in some embodiments. The system 100 enables the use of a client-side application 111. In other embodiments, users can access the system 100 directly through the use of web forms or a website rather than a client-side application 111. The GUIs generated for the client-side application 111 would in some embodiments be configured for Smartphone or mobile device usage. Thus, the client-side application 111 can be adapted for iOS™ or Android™ deployment. The client-side application 111 can comprise both an end-user facing version for end users (e.g., payors) and a merchant-facing application for merchants or other entities (e.g., payees).

The registrar 102 is configured to mediate registration of services for a single user. For context, registration of multiple services is repetitive and time consuming. Additionally, centrally storing this information poses a huge security threat. During 2017, one of the largest security breaches in history exposed over 140 million Americans, compromising their social security cards, birth dates, addresses, and credit card numbers. Many services ask for the same basic information that can be used to register for future accounts. Additionally, the cost of data acquisition for some accounts such as financial institutions is quite high. In 2017, firms deployed an average of 307 employees to process KYC information.

In some embodiments, during registration of a new service/merchant, a user will permit certain pieces of data to be obtained by the merchant through their secret APK key, such as email address, password, first name, last name, and address—just to name a few.

The registrar 102 is a centralized solution for registration processes. Similar to logging in with a social networking application such as Facebook™, the registrar 102 implements a registration process that allows a user to sign up for new services, permitting only data points the requesting servicer requires. Some embodiments contemplate decentralizing sensitive information related to identity with respect to the registrar 102. Registration processes such as these saves time for the consumer, money for the service providers, and security advantages for all involved parties.

In one or more embodiments, the registrar 102 is configured to register transacting parties (e.g., merchants/second peers) and generate a secret application programming interface (API) key for each registered transacting party. To be sure the secret API key is unique for each of the registered transacting parties and linked to a single user. In more detail, when a service is added to the platform, the registrar 102 generates a new subscription address and a secret API key that creates a one-to-one unique, discrete, or dedicated relationship between the end user (e.g., single user or first peer) and the subscription service (e.g., a transacting party of a second peer). In one example, a first secret API key AAA is used between a single user and a first merchant for a first subscription. A second secret API key BBB is used between the same single user and a second merchant for a second subscription.

That is, each subscription service for a single user will be provided with a unique and/or secret API key. This ensures that there is no single point of vulnerability that jeopardizes the entire platform. For example, in systems that implement a single public or private API, if this single API is compromised all parties using the API are potentially vulnerable. Thus, if a secret API key of the present disclosure is compromised for one subscription, the API key can be retired and a new one generated. This retire and replace operation does not affect the other subscriptions who continue to operate using their own unique and dedicated API keys. For example, if API key AAA is compromised, API key AAA can be replaced with API key CCC, but the API key BBB is unaffected by this operation.

The use of secret API keys of the present disclosure also allows users to assert more control over their subscriptions. For example, users can turn subscriptions on and off or limit subscription charge parameters through the API key issued to a specific merchant (e.g., transacting party and/or second peer). These API keys can be controlled through GUI mechanisms as disclosed herein.

In combination with providing these unique subscription-based secret API keys, the registrar 102 can also implement password management functionalities through use of a password manager 110.

Currently, managing multiple services requires a unique login and password combination for each service. Thus, subscription management is unduly cumbersome and complex. Moreover, information technology security experts recommend having a unique password for each and every account created. Additionally, having a password manager or vault is further recommended. Also, in most instances service providers (e.g., merchants) may save your payment information further increasing potential security risk exposure.

The use of blockchain technology and cryptographic encryption in the embodiments disclosed herein provide unique technical solutions to these problems. An all-inclusive subscription-based processor platform as disclosed herein functions to enhance security, improve management of services, speed up the process of KYC (know your customer)/registration, provide merchants additional payment options, and enable customers greater flexibility; all in a decentralized high-performance open network.

Specific technical problems addressed by the present disclosure include, but are not limited to: difficulties in managing unique/common logins; complexities in password management; service/payment management of multiple services; security of funds/payment; registration and management of multiple services through a single interface; and merchants who are unable to accept multiple currencies/customers unable to pay in multiple currencies—just to name a few.

In more detail, password management has been an issue since the conception of online databasing and active directories. The sheer number of logins the average Internet user has to remember is quite staggering. A poll in 2016 by Intel Security determined the average adult has 27 unique logins. Unfortunately, many users utilize the same password for many of these unique services. Having the same password for multiple services can create a huge security risk for any consumer. Even if you have variants of a password (example: khaleesi1, khaleesi!, khaleesi$ . . . ) among several platforms it may open the doors for potential hackers. If given a good enough starting point, modern computing and algorithms can compromise these passwords.

Security breaches can lead to catastrophic events, like the reveal of classified information, trade secrets, and identity theft. In the 2017, a security breach on a credit reporting agency exposed 145.5 Million people to potential identity theft.

In one embodiment, a scenario is contemplated where a user forgets different passwords for subscription services and cryptocurrency exchanges. The user must go through a lengthy tedious password recovery process. To remedy these scenarios, the password manager 110 is provided with a password vault. The use can now recover stored passwords for subscriptions and services by logging into the system 100. The password vault is protected by two-factor authentication in some embodiments. For example, when the user is accessing the platform or system 100 in a mobile device format on their mobile application, the user will login in with a platform-specific password and provide a bio-signature such as a fingerprint or facial recognition (other biometric input can also be utilized). This creates multiple layers of authentication and thus security. The password manager 110 implements a random password generator for storage of all new services and subscriptions.

In another example embodiment, multiple subscription services are linked to a single payment point such as a credit card. Assuming the credit card becomes compromised and the user notices a fraudulent transaction, the user must now go through a lengthy process of changing their credit card on each service subscribed.

These and similar technical problems can be mitigated through the platforms/systems/applications of the present disclosure which implement secret/dedicated API key and password strategies, along with selectable means for turning API keys on and off by a user.

As noted above, the present disclosure provides a technical solution for automatic transactions and subscription management. In some instances, consumers are billed for renewals due to conditions buried in fine print that can be extremely difficult to identify for the average user/consumer. Consequently, consumers may spend money for years on a service before realizing that it is no longer utilized. In some instances, customers who are incapacitated can continue to be billed for subscription services which can lead to a huge financial detriment. Finally, if a consumer wants to discontinue a service they may be unable to do so if they cannot remember the password and/or username associated with the account in question.

Figure 3:
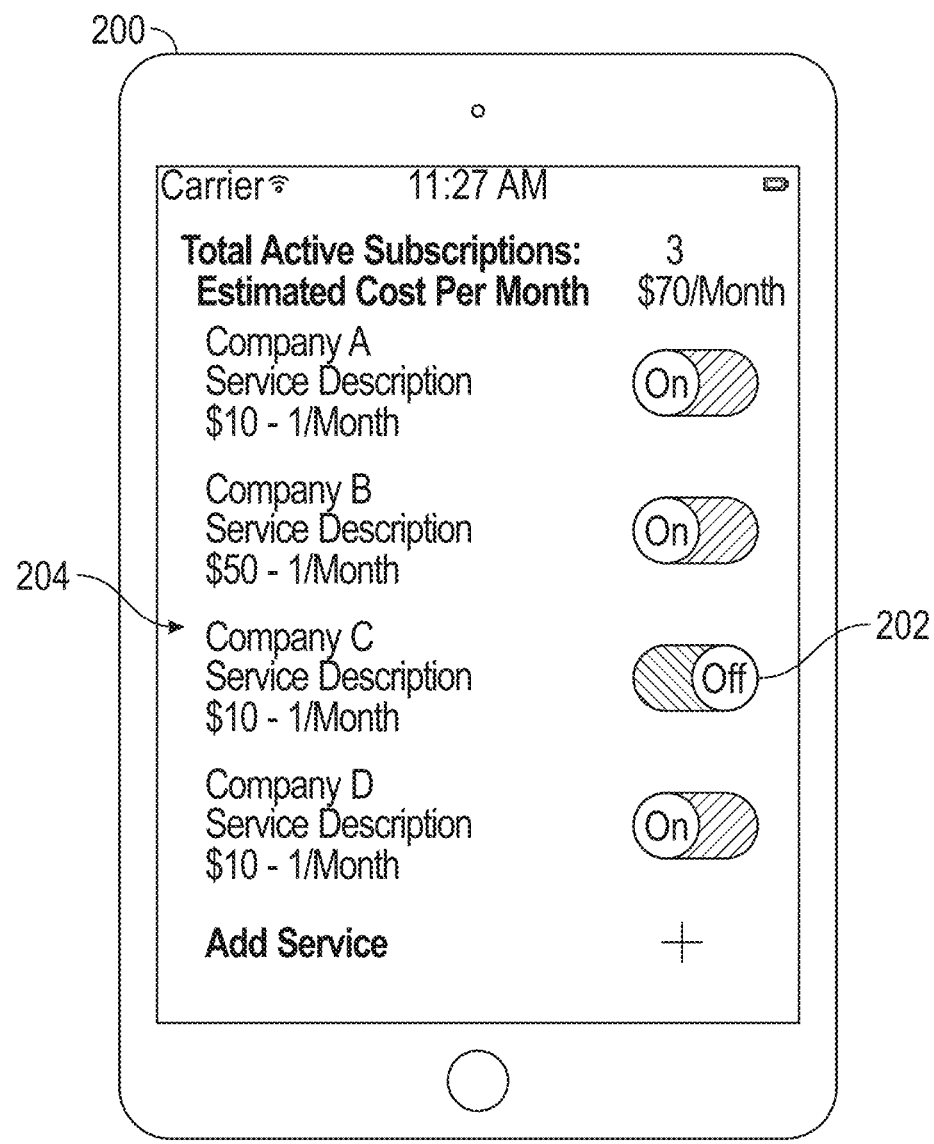
FIG. 3 illustrates an example graphical user interface (GUI) that comprises toggles for selectively activating and deactivating API keys.

Using the client-side application 111, management of subscription-based services is now mediated through a single user interface. As noted above, users register for services through the registrar 102, which generates a secret API key that allows subscription-based merchants use for access and/or payment. The client-side application 111 provides an interactive graphical user interface (GUI) that provides easy on/off switch management of services. An example GUI 200 of the present disclosure is illustrated in FIG. 3. Users can immediately activate/deactivate authorization for access and/or payment to any service by activating a toggle 202 on the GUI 200. Logically, each of the toggles on the GUI is linked to a specific secret API key for a single subscription. Moving the toggle 202 to the deactivated position (as illustrated for Company C subscription 204), deactivates the API key for Company C that is stored in the system and linked to the user's account. This disables the ability for Company C to be granted access to the data vault or wallet of the user that stores payment options such as cryptocurrencies or fiat currencies. In this GUI 200, the user has three active and one inactive subscription for a total of four subscriptions.

With respect to password management, upon initial download of the client-side application 111, the client-side application 111 generates and provides the user with a unique seed which will allow the user to recover their platform password vault on a new device. In some embodiments, the seed can comprise a series of plaintext characters, and in one embodiment a string of twelve randomly generated characters.

When registering for new services, the password manager 110 generates a random password for the user using a maximum number of available characters specific to the service being registered. This process occurs when a user signs up (e.g., registration) for a new service through the client-side application 111. Additionally, the password manager 110 stores the password in a password vault 112 cryptographically in a blockchain in some embodiments. Passwords are always editable and recoverable through provision to the password manager 110 of the seed. In some embodiments, the seed can be stored locally on the user's device (e.g., the device on which the client-side application 111 is executed). The password vault 112 also stores the two-factor authentication keys established by the user as described above.

In some embodiments, the user is generated a platform password that gives the user access to their data vault. In some embodiments, the password manager 110 also generates unique passwords for the user that are used to log into individual services. Thus, each subscription service can be accessed through a unique password and communication of data between the client-side application 111 and the merchant's system(s) can occur over any communications channel using the secret API key established for that particular registered merchant. In one embodiment, the system 100 implements the communications interface 108 which can include any connection allowing access to a public and/or private network connection.

Secure storage of both passwords and two-factor authenticator keys are important to the security of every cryptocurrency investor. The password vault 112 facilitates the secure local storage of all sensitive information for an end user/party.

With respect to subscription payments, some merchants provide the ability to pay for goods and/or services in cryptocurrency, however, it is usually a one-time payment. The good or service is typically priced in a pegged fiat currency amount and the appropriate amount of cryptocurrency is sent from a buyer to the merchant at the time of transaction. The cryptocurrency received by the merchant is then susceptible to volatility as it was based on the current market value at the time of payment. For example, a merchant can receive $20 for a good or service today and tomorrow it can be worth $10 if the market value of the currency used declines by 50%.

The platforms disclosed herein provide an ability to send and request payments on a scheduled basis using cryptocurrency using the client-side application 111. The client-side application 111 allows a user to initiate a new "stream" to another party using, for example, a username or e-mail address (may include the e-mail address used to register a user with the client-side application 111). Using this information, the user can then select the frequency for which they will be requesting payment (e.g. daily, weekly, monthly). After the request is sent, the receiving user (e.g., merchant/second peer) finds the request in their merchant version of the client-side application 111. The user then must authorize the scheduled payment. Until funds are exhausted from the user's data vault (e.g., a hot wallet as described in greater detail infra), payments will be sent until the selected service is shut off in the list of services menu (see FIG. 3).

The system 100 and client-side application 111 also provide for multi-currency support of both many cryptocurrencies and/or fiat currencies. To be sure, multi-currency support for both merchants and customers is rising in popularity as merchants have decided to support the adoption of cryptocurrencies. The advent of cryptocurrencies has required many parties to constantly shift between different currencies (fiat and cryptocurrencies included) in order to pay for services. Additionally, merchants have limited themselves in not giving customers the flexibility to pay in various currencies. Also, the volatility of cryptocurrencies has held merchants back from accepting these alternative forms of payment.

The present disclosure mitigates aspects of volatility of cryptocurrency by allowing merchants to accept multiple currencies while receiving payments in whichever currency they desire (fiat included). Simultaneously, customers are able to pay for their favorite services using any currency supported by the system 100.

As noted above, example currencies include, but are not limited to: Bitcoin, Ethereum, Monarch, and all ERC-20 tokens—just to name a few. The system 100 leverages external exchanges to provide liquidity internally. In some embodiments, the system 100 implements an internal exchange to better manage liquidity and remove the need for third party providers. In general, the currency exchanger 106 is configured to prepare one or more cryptocurrencies in the user's blockchain into a currency format requested by a registered transacting party. In one embodiment, a merchant that is registered to the system 100 and for which a unique API key is generated and active can accept payment for a subscription from the user in any format desired. The currency exchanger 106 will convert a user's cryptocurrency available in their data vault (e.g., either cold or hot wallet) into an acceptable format for the merchant (if the merchant does not accept the currency types stored in the user's data value).

In one embodiment, a use case includes a customer paying for a video service using Bitcoin but the video service does not accept Bitcoin (BTC). Using the client-side application 111, the video service could choose to accept this customer's payment, and receive it in fiat, such as USD, instead of BTC. This is accomplished by the currency exchanger 106 exchanging BTC the user's wallet with fiat currency. This can be accomplished by the currency exchanger 106 performing a sale of BTC with a BTC trading platform such as Coinbase™. Thus, the currency exchanger 106 can automatically perform the transaction with an external cryptocurrency exchange platform 114 as a part of the currency exchange process.

The video service could also choose to keep the payment in BTC but would be susceptible to the volatility of cryptocurrency and would have to make this decision internally. Some embodiments contemplate using a peg to limit volatility, which could include a platform-specific token backed by a commodity such as silver which would keep volatility lower. Thus, the system 100 can implement and allow users to utilize a cryptocurrency token that is specific to the system 100 (e.g., platform). A platform-specific cryptocurrency controlled by the currency exchanger 106 allows for the volatility moderating combination of a cryptocurrency backed with a commodity.

The system 100 is also configured to provide specific reporting functions allowing users to comply with various legal and reporting requirements. Indeed, financial analytics and tax forms can be difficult to reconcile, especially for cryptocurrency. With the adoption of cryptocurrencies, more and more people are making payments in alternatives to fiat currencies. Blockchain technology has allowed for better transparency by making all transactions public on a shared ledger. However, with payments being processed from so many different places and no possibility of managing subscriptions via cryptocurrency, there remain very little options for ensuring compliance and reporting.

The system 100 allows users to effortlessly manage their finances and taxes in one place. Users will be able to easily create budgets, analyze spending habits, as well as track and pay bills such as subscriptions. Users can also choose to receive alerts when payments are due, eliminating avoiding late fees. The system can also provide for categorizations of expenses that will also allow users to strategically track their investments strategically from one platform.

In addition to providing advanced financial analytics to better understand spending habits, the system 100 enables accounting as an automatic process for the end user (payor) using features of the Blockchain in an automated and real-time manner. Additionally, immutability of the public ledger also creates the ability to conduct flawless transparent/accessible audits.

As noted above, the system 100 implements a communications interface 108 that allow the system 100 to interact with one or more merchant subscription systems 116. The communications interface 108 allows for bilateral communication over an communication channel between the system 100 and the one or more merchant subscription systems 116, where each of the one or more merchant subscription systems 116 is utilizing a secret or dedicated API key as described above. That is, in order for the one or more merchant subscription systems 116 to access payment for subscribed services, messages are exchanged over an API using the communications interface 108. In some embodiments, payment requests are received over the API using a secret API key for the one of the registered transacting parties (e.g., one or more merchant subscription systems 116). Payments to the one of the registered transacting parties in a requested currency format can also be made through the communications interface 108.

Referring back to FIG. 2, according to some embodiments, the data vault 104 of the present disclosure can be used to cryptographically store information for a user such as a platform password, a seed used to generate passwords, unique passwords for merchant subscription systems, cryptocurrency exchange account information, secret API keys, and also blockchain addresses corresponding to cryptocurrencies owned by the end user. In various embodiments, the data vault 104 can comprise both a cold wallet 118 (offline storage) and a hot wallet 120 (online storage). In some embodiments, cold wallet is configured to store at least one or more cryptocurrencies for a user (or cryptocurrency address(es)) and the secret API keys for the user. In some embodiments, these data are stored in a blockchain. In other embodiments the data in the data vault 104 can be stored in an encrypted format such as AES 256.

The hot storage wallet comprises at least one currency that is available for immediate payment. In some embodiments, the at least one currency is based on the one or more cryptocurrencies stored in the cold storage vault that have been converted into a format that is acceptable to a merchant and is used to pay a subscription. In some embodiments, a payment request is performed ad hoc for each transaction. In another example, the payment request is a pre-established payment operation authorized by a user such as when a user authorizes daily, monthly or other similar scheduled payments for a subscription.

Figure 4:
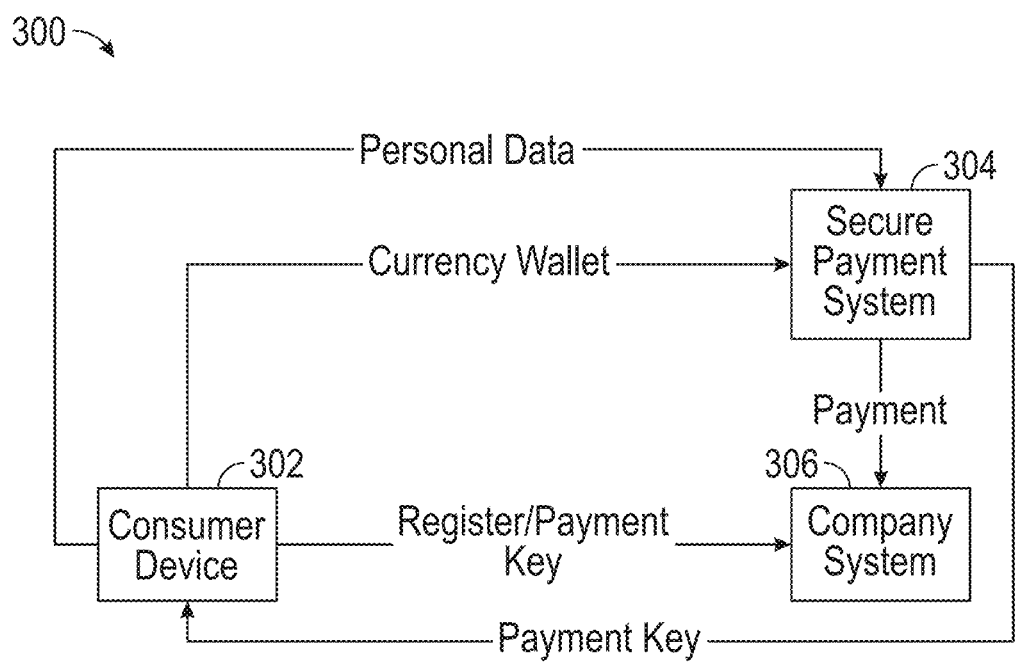
FIG. 4 is a schematic diagram of an example system and data flow of an embodiment of the present disclosure.

FIG. 4 is schematic diagram of an example architecture 300 performing method. A consumer device 302 such a Smartphone is provided with a client-facing application as in the system of FIG. 2. The consumer device 302 can transmit personal data to a secure payment system 304 (such as the system 100 of FIG. 2). The consumer device 302 can also establish a currency wallet (either hot or cold as described above) on the secure payment system 304. In order to perform a transaction with the Company A system 306, the Company A system 306 registers with the secure payment system 304. The secure payment system 304 links Company A system 306 with the consumer device 302 (or an account of the consumer device 302) using a secret API key (e.g., payment key in FIG. 3). The consumer device 302 can exchange the secret API key with the Company A system 306 directly or indirectly through the secure payment system 304. To complete a transaction or pay a subscription, the consumer device 302 will authorize payment from the currency wallet managed by the secure payment system 304, thereby allowing the secure payment system 304 to complete payment to the Company A system 306.

Figure 5:
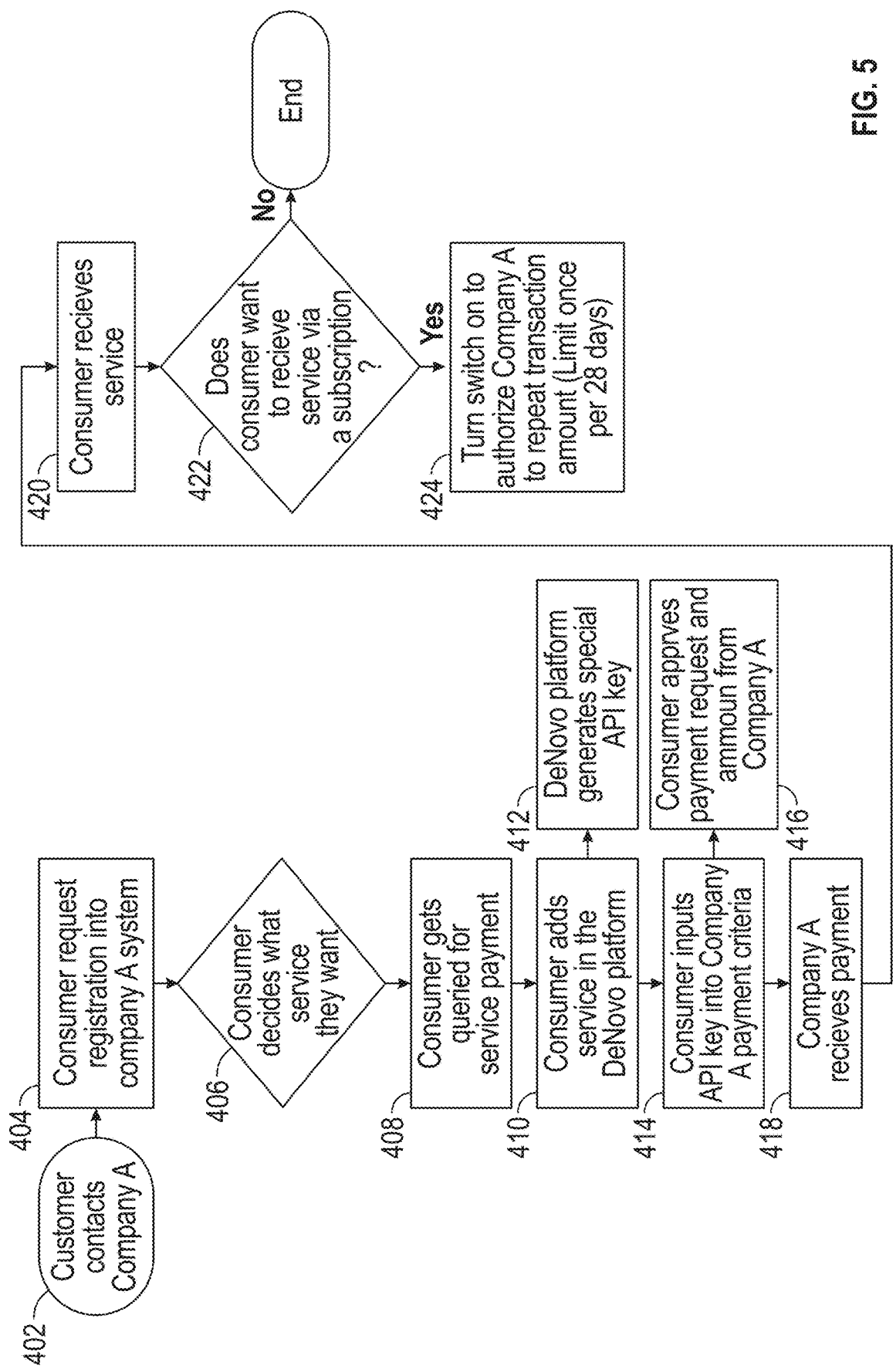
FIG. 5 is a schematic diagram of an example system and data flow of an embodiment of the present disclosure.

FIG. 5 is a flowchart of an example method performed in accordance with the present disclosure. The method begins with a consumer engaging with a merchant (Company A) in step 402. The consumer then can request registration of the company into the client-side application in step 404. This also includes a step 406 of determining what services the consumer wants. The customer is then queried for service payment information in step 408.

In step 410, the consumer adds the service merchant through the client-side application. In step 412 the secret API key generated for the merchant in step 414 is added to the client-side application in, for example, a blockchain or cold wallet in a data vault. If a request for payment of the service is provided in step 416, the company can receive payment in step 418. The service is illustrated for delivery in step 420. As noted above, the consumer can select to subscribe to a recurrently charged service in step 422. This can be effectuated by the activation of a toggle triggering the API key (see FIG. 3) represented in step 424 or the deactivation of the toggle in step 424. If no subscription is requested, the method terminates after the ad hoc or one-time payment to the merchant.

Figure 6:
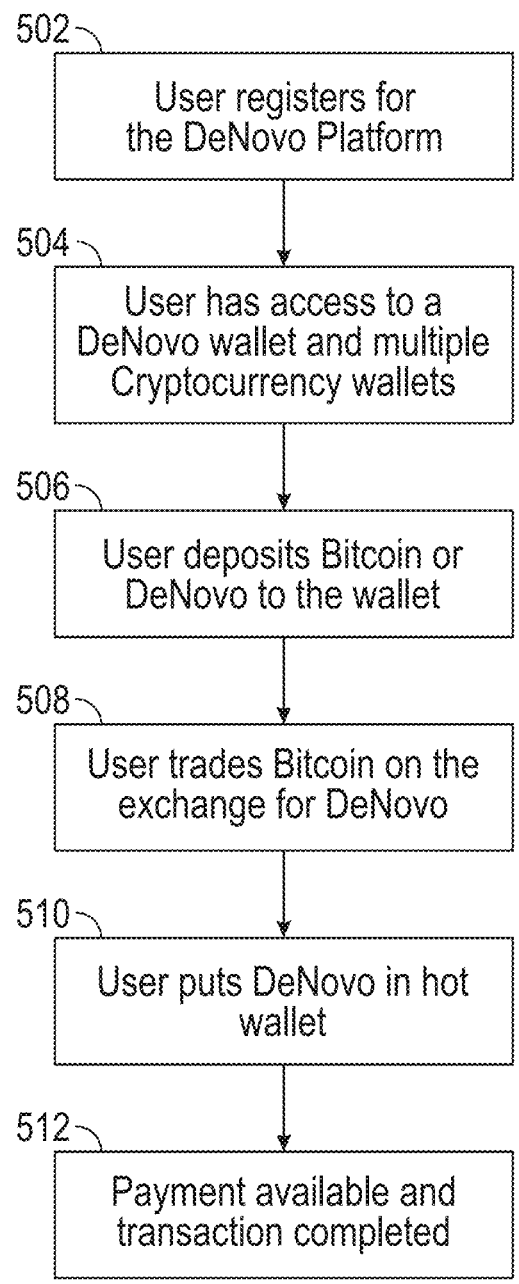
FIG. 6 is a flow diagram of an embodiment of the present disclosure.

FIG. 6 is another example flowchart of a method of the present disclosure. The method includes a step 502 of a user registering an account on a platform of the present disclosure (for example the system 100 of FIG. 2). This can include the system generating a data vault (including any of a cold and/or hot wallet) for the user, issuing a seed to the user, generating a platform password, and so forth as described above. Once created, the user is granted access to their cold and/or hot wallets in step 504. In some embodiments, the user can request to deposit a cryptocurrency and/or fiat currency in their wallet in step 506. In an alternate embodiment, the user can provide an address to cryptocurrency held in an address by a third party crypto exchange. In step 508 the user can use the platform to trade cryptocurrencies with other third party crypto exchanges using a platform specific crypto currency. In this example, the cryptocurrency is referred to as a Monarch™ token. Thus, the platform can utilize its own cryptocurrency in step 510, which can be backed with a commodity as disclosed herein. In step 512, a currency (cryptocurrency or fiat) is ready for use. Generally, this step is indicative of currency being available in a hot wallet as disclosed herein.

Figure 7:
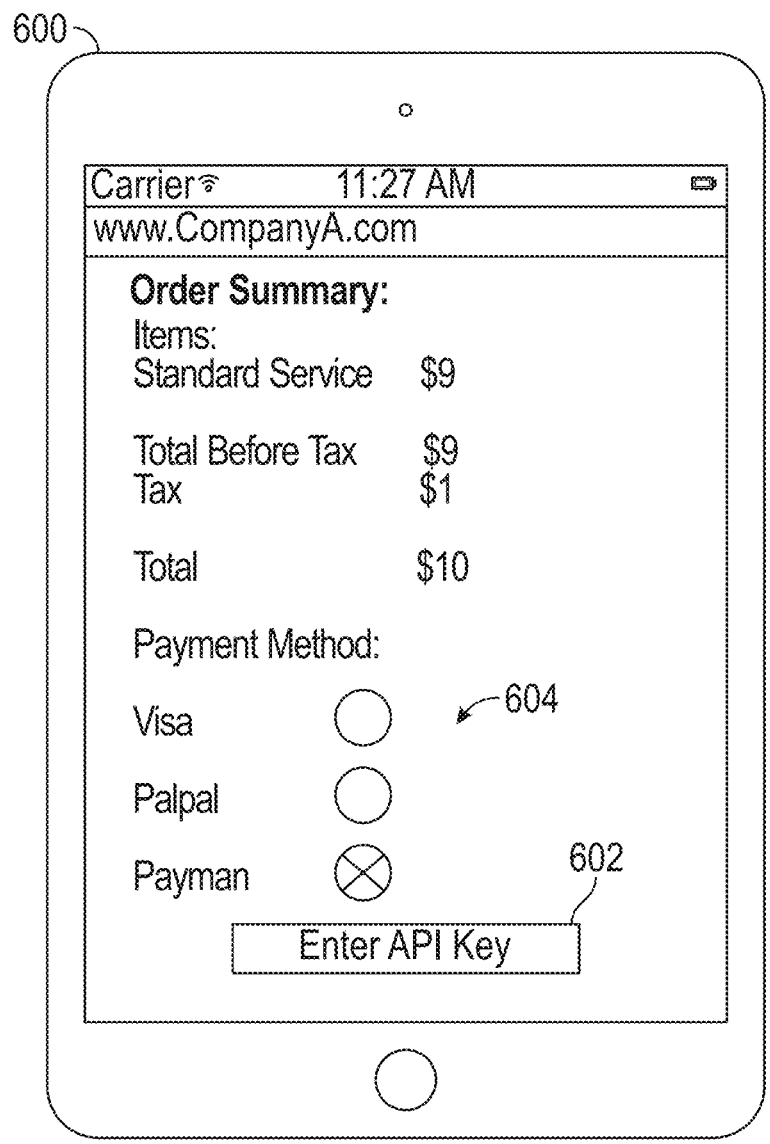
FIG. 7 illustrates an example graphical user interface (GUI) that allows a user to enter an API key and select payment terms.
Figure 8:
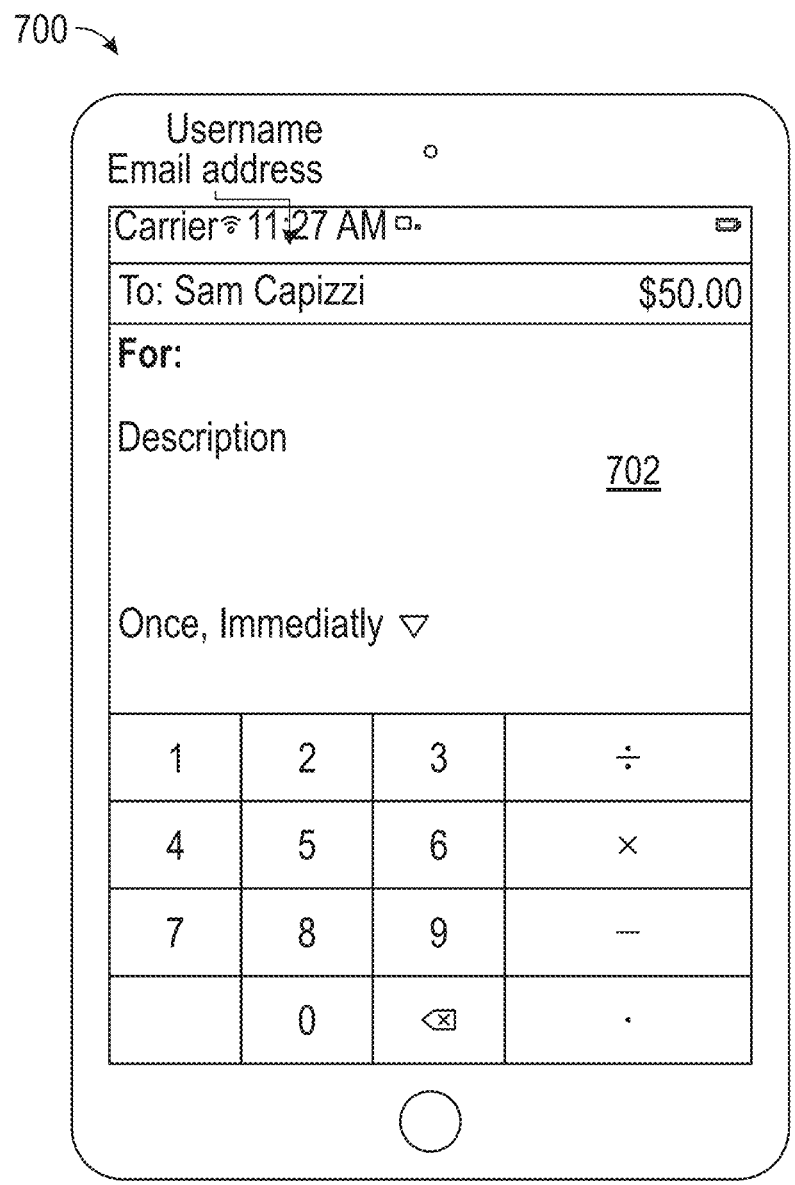
FIG. 8 illustrates an example graphical user interface (GUI) that allows a user (either consumer or merchant) to create a payment request for either an ad hoc or subscription payment.

Example GUIs allowing for users to enter secret API keys and perform single transactions are illustrated in FIGS. 7 and 8, respectively. In FIG. 7, a GUI 600 is illustrated as having a payment summary for an order from a merchant, as well as a selectable mechanism 602 that allows the user to enter an API key. The GUI 600 can also include selectable radio buttons 604 that allow the user to select a desired currency.

FIG. 8 illustrates an example GUI 700 that allows for creation of a payment request message 702. This payment message 702 can be used for single peer-to-peer transactions between individuals or between individuals and businesses.

According to some embodiments, and as described generally above, the merchant or service provider (e.g., second peer/transacting party/payee) can utilize a merchant-facing version of the client-facing applications disclosed herein. For purposes of the merchant-facing application a plug-in can be utilized. This plug-in can have any acceptable format which includes but is not limited to code or a script or other application extension that allows merchants to accept payments from the platforms of the present disclosure.

For context, accepting cryptocurrency as a small business can be a time consuming process with existing platforms unable to meet consumers' requirements for ease of use and front end user experience. On top of lackluster features with pre-existing payment platforms, existing platforms are unable to handle existing merchant needs with respect to inventory, customer list management, and subscriber tier management.

A merchant plug-in allows merchants to accept cryptocurrency and will facilitate customer response and subscriber tier management. Users have a seamless user experience to drive sales for the merchant, whether that is for a one-time purchase, payment plans, or subscriptions. The plug-in handle all user payment options using supported cryptocurrency or fiat. Merchants registered with platform gain access to new potential customers that can join their platform with the swipe of a few buttons.

In some embodiments, the platforms of the present disclosure cooperate with other third party exchanges to buy or exchange cryptocurrencies or fiat currencies on user's behalf to attempt to obtain these at the best price without requiring the user to establish accounts with other exchanges. The platforms herein also allow for use of scanning public Ethereum address via quick response codes for sending/receiving of funds.

In various embodiments, these systems and methods herein allow for payments in multiple industries. Notably these unique subscription plan structures impact a variety of industries, not only for peer to peer transactions but also business to consumer payments. Some example industries that implement a recurring payment include but are not limited to: payroll; rent/mortgage; utilities; video services (HBO, Netflix, YouTube Red, CBS all Access); music services (Apple Music, Spotify); newsletter (Forbes, Bloomberg, CNBC); donation (Patreon) and so forth.

Additional advantages of the present disclosure include, but are not limited to: recurring payments where example platforms of the present disclosure are able to handle recurring payments for both fiat and cryptocurrency payments. These example platforms of the present disclosure utilize off-chain solutions to allow users to schedule payments between two or more parties.

The example platforms of the present disclosure also implement instant transactions. Unlike traditional and legacy type payment systems, example platforms of the present disclosure are able to process transactions instantaneously.

Example platforms of the present disclosure also support a number of cryptocurrencies including Bitcoin, Ethereum, and other ERC20 tokens but support for all currencies is contemplated. To offer both buyers and sellers the best exchange rates, example platforms of the present disclosure connect to multiple cryptocurrency exchange providers. Example platforms of the present disclosure take advantage of the arbitrage phenomenon combined with an analytics engine to ensure the best possible exchange rates.

Example platforms of the present disclosure support fiat currencies by leveraging and connecting to external exchanges. Also, to promote competitiveness, example platforms of the present disclosure charge merchants 1% on received payments. As volume of the network increases, example platforms of the present disclosure decrease this fee over time to remain competitive. Interacting on a global scale that processes billions of dollars a day allow example platforms of the present disclosure to decrease this fee with no effect. Users manage all of their subscriptions and recurring payments from one place; starting or canceling a service should be simple as a flick of a switch.

Each user has a cold wallet to which they own the private API keys for engaging with merchants. Cold wallets will enable users to also set recurring payments and pay for subscription based products or services. Users can utilize example platforms of the present disclosure to trade for other cryptocurrencies and fiat all from the same platform utilizing the same hot wallets used for management of payments.

Users can advantage of the easy registration process of the example platforms of the present disclosure to sign up for new services. Registration for multiple services is repetitive and time consuming. Example platforms of the present disclosure allow users to quickly register for new services by only requesting permission to the data points required by the new service.

Example platforms of the present disclosure provide a plugin for easy integration to existing websites and platforms. This allows users the ability to pay with example platforms of the present disclosure instead of traditional payment options. It allows merchants to accept alternative types of currency.

User interfaces are built to allow users to keep track of their finances and analyze their spending habits. Users create budgets, receive alerts, track their investments, and keep track of their bills all in one place. Also, immutable ledgers used by the example platforms of the present disclosure make it incredibly easy to keep track of accounting. Example platforms of the present disclosure create exportable reports to automate the process of documenting taxes and performing real time audits.

Difficulties for the average consumer to transfer funds to each other using traditional random alphanumeric wallet address are not to be understated. The irreversibility of the blockchain transactions and the intricacies of generating a transaction require specific and specialized knowledge. The platforms of the present disclosure have an optional username feature so that users can quickly search and identify each other using a screen name/user handle. A simple username allows users to easily search for each other and add each other to your friends list. Example platforms of the present disclosure implement a social feature that allows users to add each other for quick remediation or payment to each other. In various embodiments, 10% of the funds from the raised from any initial coin offering are allocated to the direct purchasing of silver assets. Additionally, 10% of every transaction fee from a hot wallet transaction is apportioned to silver assets to continuously increase the funding for additional silver backing. Silver backing of a cryptocurrency combats volatility of standard digital asset insuring that the digital asset is backed by a tangible asset such as silver. In some embodiments, 50% of all transaction fees from a hot wallet transaction are distributed proportionally to all token holders. Users can also track their portfolio whether in the hot or cold wallet (e.g., digital vault) or a third party exchanges via API connection.

Figure 9:
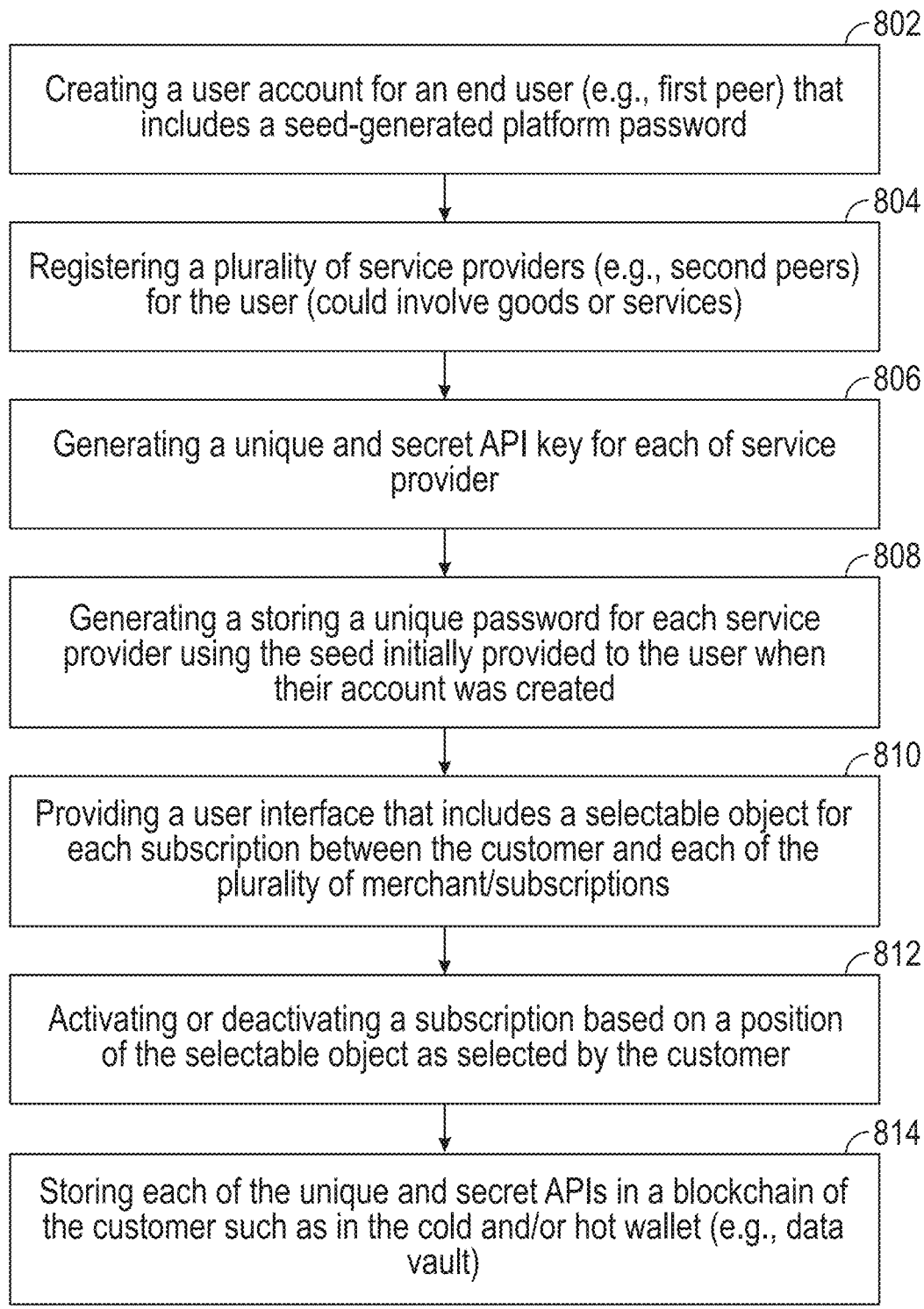
FIG. 9 is a flow diagram of another embodiment of the present disclosure.

FIG. 9 is a flowchart of an example method of the present disclosure. Generally, the method includes a step 802 of creating a user account for an end user (e.g., first peer) that includes a seed-generated platform password. This can also include establishing a data vault for the user that includes a cold and/or hot wallet. In one embodiment, after an account has been created the method includes a step 804 of registering a plurality of service providers (e.g., second peers) for the user (could involve goods or services). The user can provide individual payments on a per transaction basis or on can authorize a subscription (e.g., scheduled and repeating) payment. As noted the end user has a subscription with each of the plurality of second peers in some embodiments.

Part of the registration process includes a step 806 of generating a unique and secret API key for each of service provider. Also, the method can include a step 808 of generating a storing a unique password for each service provider using the seed initially provided to the user when their account was created.

To be sure, the unique and secret API key links service provider with the end user. Also, the API key is associated with the unique password generated for the service provider. In combination the secret API key and unique password provide a secure and discrete representation of a relationship between a user and a merchant. When combined with the toggle/UI features described above, a the secret API key and unique password provide a secure and selectable means for activating and deactivation payment authorization between consumers and merchants, putting consumers in charge of activating and deactivating subscriptions, along with a means for paying with these subscriptions using cryptocurrency, even with merchants who only accept fiat currency when the platform automatically exchanges customer cryptocurrency with fiat currency in a transparent manner to the customer.

In some embodiments, the method also includes a step 810 of providing a user interface that includes a selectable object for each subscription between the customer and each of the plurality of merchant/subscriptions. Indeed, the selectable object comprises a position that is either an activated position or a deactivated position.

The method also includes a step 812 of activating or deactivating a subscription based on a position of the selectable object as selected by the customer. In various embodiments, the method includes a step 814 of storing each of the unique and secret APIs in a blockchain of the customer such as in the cold and/or hot wallet (e.g., data vault).

FIGS. 10-11 collectively illustrate graphs corresponding to an example platform-based cryptocurrency (e.g., token) strategy, referred to generally as an I.C.O. (initial coin offering).

The total token supply will be fixed at 500,000,000. 50% of tokens will be sold through a crowdsale, Insert Date. The token sale will take place in 3 stages. First, a private round will take place 1 Apr. 2018, with an allocation of 5% of overall tokens (25,000,000 Monarch Tokens) and bonus of 25%. The pre-sale round will begin 1 May 2018, with an allocation of 5% of overall tokens (25,000,000 Monarch Tokens) and a bonus of 15%. The public crowdsale will take place 5 Jun. 2018, with an allocation of 40% of overall tokens (200,000,000). The values and percentages are further detailed in Table 1 below:

|  | Percent | Unit Price per Token | Total Tokens Issued | Total Amount |
| --- | --- | --- | --- | --- |
| Private Round | 5% | $0.20 | 25,000,000 | $ 5,000,000 |
| Pre-sale Round | 5% | $0.22 | 25,000,000 | $ 5,500,000 |
| Public Sale | 40% | $0.25 | 200,000,000 | $60,500,000 |

The other 50% of tokens are used to incentivize the development of the platform and company. In some embodiments 5% is allocated for advisors, 15% will be allocated to the development team, and 30% is allocated to the core team. A two year vesting schedule can be used. The team will receive one quarter of their allocated tokens six months after the end of the public crowdsale. Every month thereafter, the team will receive ¹⁄₂₄ of their allocation until all the tokens are distributed. In some embodiments no one is exempt from this vesting schedule. This includes all co-founders, advisors, and developers.

Development of the platform occurs after raising funds and includes developers, technical resources, and implementation of the platforms. Developing partnerships with merchants to increase adoption of the platform is also contemplated, as well as creating marketing campaigns to reach larger audience. These funds are used to cover operational expenses of building the platform, such as renting office space, paying salaries, and other business related expenses. The platforms can also implement Lightning Network, sharding, and rootstock as options that help scale existing blockchains.

As noted, 10% of proceeds raised during a token generation event go towards the direct purchase ofsSilver. This silver will be stored in a vault and audited by a thirrd party using block chain technology or other system so that the backing of the token is independently verified.

In some embodiments 5% of funds raised are stored as a reserve fund and can be split evenly between FIAT, BTC, ETH, & LTC. The platform will charge a 2% transaction fee on all transactions in the network. Transaction fees in the system are carefully allocated to allow the platforms to function as a company even after ICO funds are exhausted.

Example transaction fees allow the platform to function as a company post-ICO by dedicating 50% of each transaction fee to admin and development. This money is used to further development the platform. To further adoption and increase usage in the platform, the platform has a dividend payout system for platform token holders. In some embodiments 40% of each transaction is allocated to this dividend. Users will receive this dividend at 0:00 (UTC+8) each day for the previous day's traded cryptocurrencies and will be directly proportional to the amount of platform token being held on the platform that day.

In one embodiment, a user holds 1,000 of the 100,000 platform tokens or 1%. Assuming 30,000 Bitcoin are traded on the platform, if a 2% fee is applied to each transaction, 600 BTC will be collected that day. 50% of this value or 300 BTC will be allocated to the daily dividend. Since the user owns 1% of the platform tokens they would receive a payout of three BTC.

Each quarter, the platform uses 10% of transaction fees to buy back platform tokens from the open exchange and destroy them. This process is repeated each quarter until 100 Million tokens are destroyed, bringing the total coin supply to 400 Million. All buy-back transactions are visible and publicly announced to see on the blockchain once per quarter.

Platforms of the present disclosure handle fee structuring four different ways, depending on the type of interaction taking place in the ecosystem. To be sure, these transaction fees are only for the hot wallet. Platforms of the present disclosure also have a cold storage wallet which does not charge any additional transaction fees other than what miners charge to record a transaction. All transactions between consumers and merchants besides those paid in platform tokens are assessed a 2% transaction fee. This fee is assigned to the merchant. The consumer pays no additional charge for his/her transaction. All transactions between consumers and merchants that are paid for in platform tokens, are assessed a 2% transaction fee. However, 1% is given back to the consumer as a "cash back" reward. This will incentivize people to hold onto their platform tokens, helping to reduce the volatility of the price. This fee is also assigned to the merchant. The consumer pays no additional charge for his/her transaction. All transactions between two consumers besides those paid in platform token are assessed a 0.5% transaction fee. This transaction fee is assigned to the sender of funds. All transactions between two consumers that are paid for in platform token are not assessed a transaction fee. This will again incentivize people to use and hold platform tokens for transactional purposes.

In some embodiments, the present disclosure provides for a two token structure. A security platform token is purchased through a token generation event. Security platform tokens that are held in a hot wallet will give users a proportional amount of dividend per security platform token held. For example, every Monday at 12:00 PM PST a snapshot is taken of accounts that hold security platform token and a proportional amount of dividends will be distributed. Additionally, users holding security platform tokens after a token sale has been completed will be airdropped two platform utility tokens per security platform token held.

Security platform token will be backed by silver bought by the proceeds made in the token sale and will continuous be bought using 10 percent of the transaction fees in the ecosystem. In some embodiments, security utility tokens are only be used in the platform system to be used as a transactional medium.

One of the features that make the platform tokens all-encompassing is the ability to connect to third party exchange APIs. These API keys are generated by exchanges and help connect applications like a platform portfolio tracker. The imported APIs will be able to read balances and trade from exchanges like Binance, Bittrex and Coinbase. The portfolio tracker is constantly updated based on any additional trades without any need for users to input additional redundant information.

Figure 12:
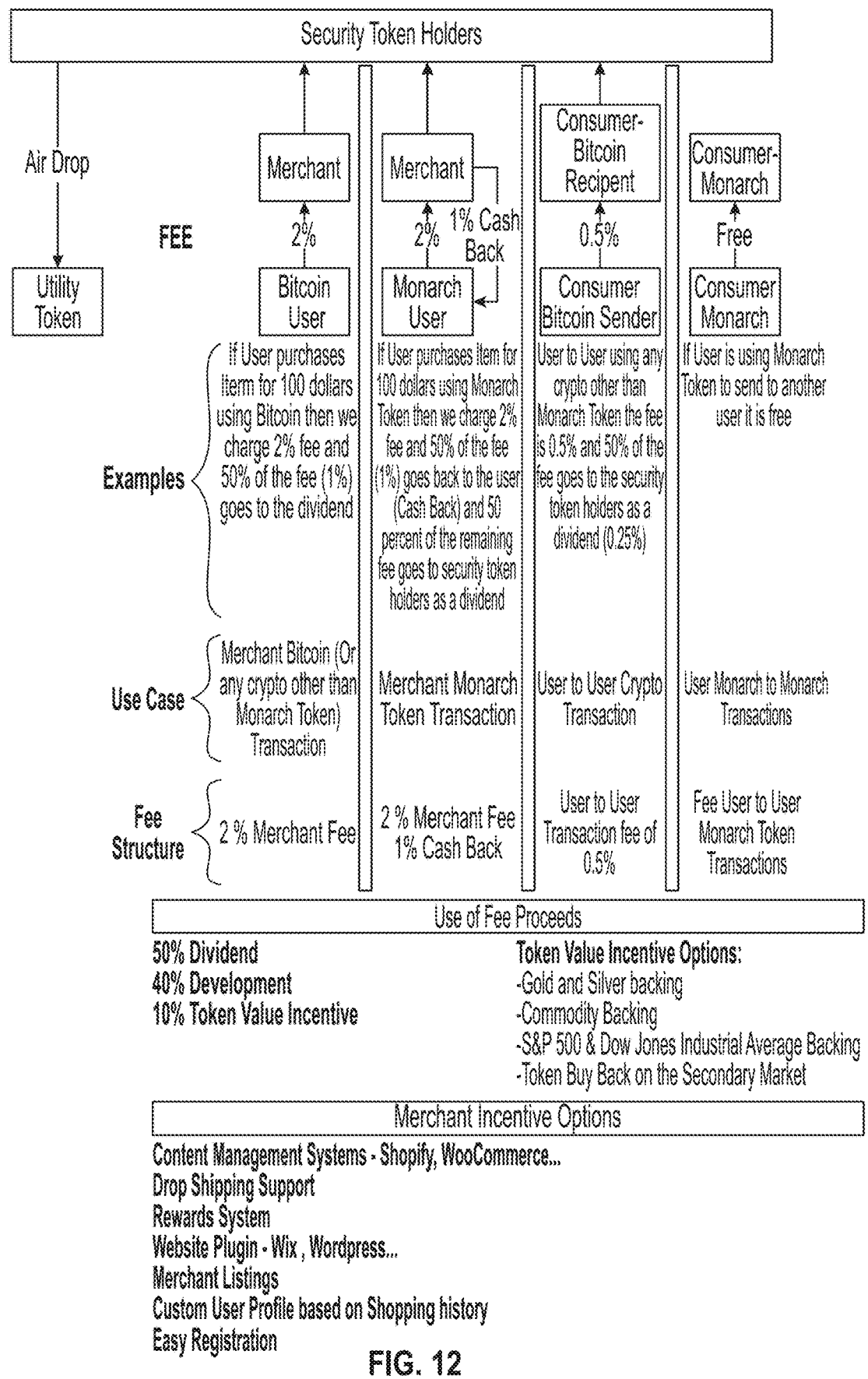
FIG. 12 is a diagrammatic representation of an example platform and deployment process.

FIG. 12 illustrates an example diagrammatic representation of the example platform token structuring and implementation methodology described above.

In some embodiments, the system 10, 100 is configured to perform cryptocurrency transactions including recurring and scheduled crypto currency transactions based on multi signature private key leasing-lending. Leasing of Multi Signature wallets, (Private Keys). MultiSignature Wallets require two signatures (Two Private Keys) in-order to generate a transaction. In some embodiments, system 10.100 wallets includes multisignature wallets and users have the option to lease their (Signature) Private Key to the cryptocurrency application provider or owner, such as the Monarch Token database. In some embodiments, the user and/or cryptocurrency application provider can prepare and execute the lease via the client-side applications 111 running on the system 10, 100 and this can be based on block chain technology. This allows the cryptocurrency system application to make transactions on behalf of the users.

Figure 14:
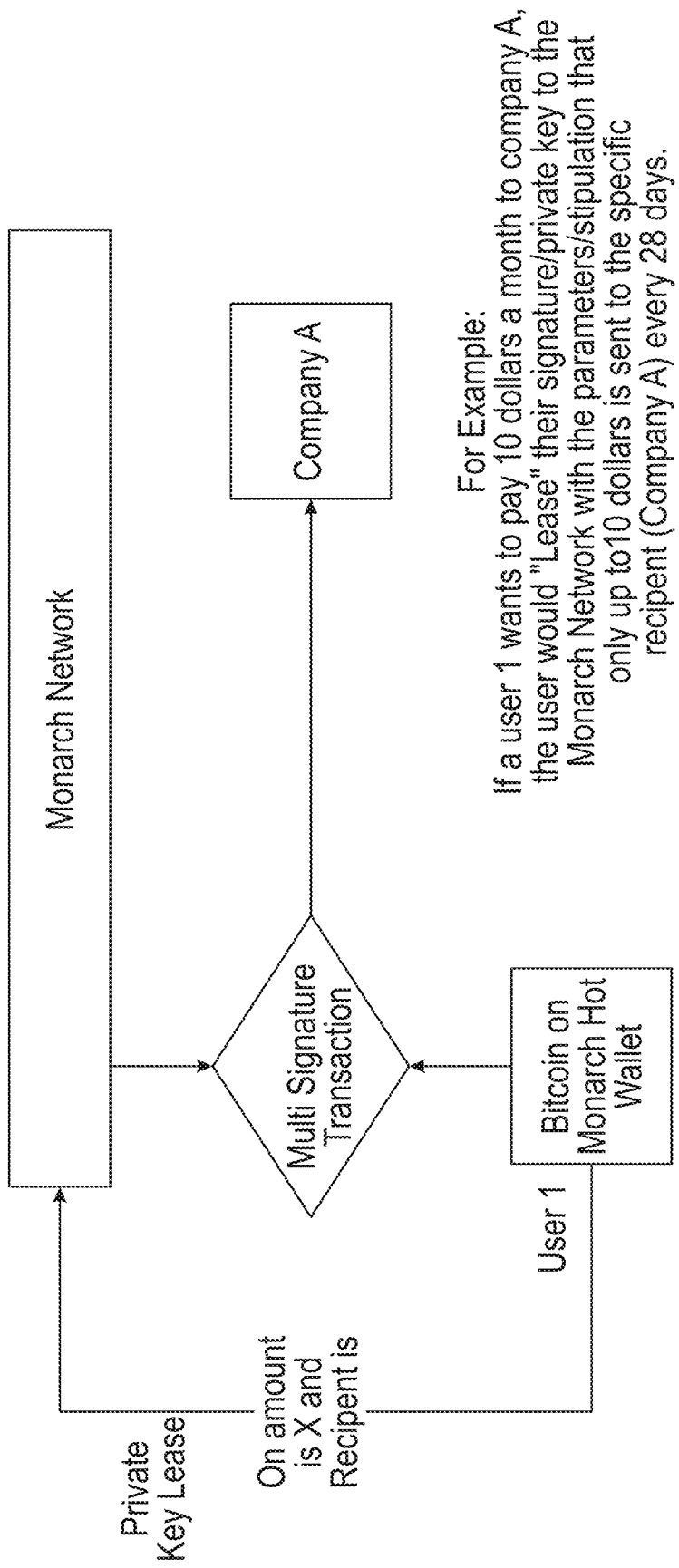
FIG. 14 illustrates a diagrammatic representation of an example recurring or scheduled system transaction in which the system uses multi signature private key leasing-lending according to some embodiments.

FIG. 14 illustrates a diagrammatic representation of an example recurring or scheduled system transaction in which the system uses multi signature private key leasing-lending according to some embodiments. Monarch Corporation owns a private key, and individual users own private key. In order to generate a transaction (Send Cryptocurrency) both Monarch Corporation and the Individual User must input their private keys to send cryptocurrency. In order for Monarch Corporation to send cryptocurrency on the individual users behalf, the individual user must give their private key to Monarch Corporation. For Example if an Individual user wants to give Company A 0.25 BTC every month, they will lease Monarch Corporation their half of the private key with the stipulation that Monarch token can only withdraw 0.25 BTC once a month with the recipient being Company A.

In some embodiments, the cryptographic private key mentioned herein can comprise a multi signature private key. The mulita signature private crypto key comprise a multiple private keys, one or more of the multiple private keys being own or leased by different legal entity or user from a legal entity or user owning one of the other one of the multiple privates keys of the multi signature key. In some embodiments, a first one of the private keys is associated and owned by the user of the user account 29 registered with the cryptocurrency application and a second one of the multiple private keys of the multi signature key is leased or owned by the cryptocurrency application provider or other company.

In some embodiments, system 10, 100 performs the crypto currency transaction automatically using the first private key stored in the password vault 104 and by using the second private key leased or owned by the cryptocurrency application provider which is entered via a graphical user interface manually or provided automatically from a separate storage. In some embodiments, the second private key is also stored in the same password vault as that of the user or stored in a separate vault. In some embodiments, system 10, 100 automatically retrieves both first and second private keys of the multi signature key from password vaults using different password/keys for accessing the first private key and the second private key and then uses the retrieved first and second keys in performing the transaction. In some embodiments, spending limit or other transaction condition is associated in the system 10,100 with the second private key and this spending limit or transaction condition is verified by system 10, 100 automatically when performing the scheduled or recurring transactions mentioned herein according to the spending limit or other transactions associated with the multi-signature key. In some embodiments, the spending limit or other transaction condition is configurable via the client-side application 111 by the user of the user account 29.

According to some other approaches of the present technology, aspects of blockchain subscription payment management systems and methods are provided. As will be explained in more detail, the blockchain subscription payment management systems provide centralized management of decentralized subscription recurring payment procedures between user accounts and merchant accounts. In some approaches, the systems are implemented with an authorization-based smart contract structure that enables payments of the same amount of cryptocurrency to a particular wallet address on a recurring basis, such as daily, weekly, monthly, weekly or periodically. By the system using a decentralized cryptocurrency recurring payment solution by way of a decentralized application (Dapp), users and merchants are able to hold their private keys and seed so that cryptocurrency subscription transactions are performed in decentralized manner directly between user cryptocurrency wallets and merchant cryptocurrency wallets rather than requiring crypto transfers via any intermediary third party centralized platform. Despite the decentralized nature of the cryptocurrency recurring subscription payments, the system allows both users and merchants to main full control of their subscriptions. This is achieved using a decentralized blockchain subscription application which is made up of a blockchain subscription pay manager application and subscription smart contract(s).

The blockchain subscription pay manager application enables the user and merchant devices to interact with the blockchain subscription payment smart contract(s) via an appropriate user interface, such as a browser, and effectively manage the subscription processes including subscription payment plan creation, subscription payment plan invoicing, subscription payment plan set up and subscription accounting.

The blockchain subscription pay manager application manages authorization by the users and merchants via their cryptocurrency wallets for the system to process user and merchant data (both private and public) associated with their subscriptions and recurring payments and enable both merchants and users to interface and manage the decentralized cryptocurrency recurring payment system via graphical user interfaces. The system allows merchants to have full control over the creation of subscription payment plan agreements that they need and in a format that can been easily accepted by a user of the system wishing to subscribe to the subscription payment plan.

Reference will now be made to the accompany drawings 15 to 29 to illustrate some embodiments of aspects of the present technology relating to the blockchain subscription payment management systems and methods. Those skilled in the art will understand that the FIGS. 15-29 showing system and/or method embodiments of the present technology are for illustrative purposes only to provide an overview of the system components and functionality. One or more of the individual modules or components shown or described herein with reference to one or more embodiments of the blockchain subscription payment management systems and/or methods, can be combined, integrated with one another and/or omitted as would be understood by a person of ordinary skill in the art.

Furthermore, it will be understood that in some aspects, some embodiments of the blockchain subscription payment management systems and methods relating to FIGS. 15 to 29 are in no way limited by the systems and/or methods of the embodiments relating to FIGS. 1-14. However, in some other aspects or embodiments, one or more components of the blockchain subscription payment management systems and methods of the embodiments described herein with reference to FIGS. 15-29 can be implemented in conjunction with other systems and/or methods described herein, that is, one or more elements of the blockchain subscription payment management systems and methods relating to FIGS. 15-29 can be combined with any one or more elements of the systems and/or methods of the embodiments described herein with reference to FIGS. 1-14.

As used herein with reference to aspects of the blockchain subscription payment management system of FIGS. 15 to 29 the following terms have the meanings given below:

Blockchain subscription payment management system, or payment system—as used herein a Blockchain subscription payment management system is a system that is configured to implement and manage recurring subscription payments/transactions between blockchain wallets of users and merchants.

Decentralized blockchain subscription payment application—the Decentralized blockchain subscription payment application is made up of a blockchain subscription manager pay application and the subscription smart contract(s).

Blockchain subscription pay manager application, or app—is a Blockchain subscription pay manager application is an application configurable to be accessible on the client end, which, based on authorization by the users and merchants via their cryptocurrency wallets, is permitted to process user and merchant data (both private and public) associated with subscriptions and recurring payments and enable both merchants and users to interface with and to manage, via user interfaces on the merchant and user devices, decentralized recurring subscription payments/transactions between blockchain wallets of users and merchants.

Subscription Smart Contract(s)—the subscription smart contract is software that contains the subscription rules for negotiating the terms of the subscription contracts. The software automatically verifies the contract and then executes the agreed upon subscription payment plans. When the smart contract software is deployed over the blockchain or other p2p network, it becomes a decentralized smart contract.

User device—a personal computer (PC), mobile device, or other electronic device to access and use across an electronic network the services provided by the Blockchain subscription payment system for an individual user to use. "User" refers to such an individual.

A user is a user of the blockchain subscription pay manager application for viewing, managing their subscriptions and/or performing financial transactions using graphical user interfaces provided via the blockchain subscription pay manager application.

Merchant device—refers to a personal computer (PC), mobile device, or other electronic device to access and use across an electronic network the services provided by the Blockchain subscription payment system for a Merchant to use.

"Merchant" refers to such an individual or organization that offers items of merchandise and/or services for electronic purchase by users of the blockchain subscription payment system using the payment system. The merchant uses the blockchain subscription pay manager application to view, manage subscriptions and/or perform financial transactions using the graphical user interfaces provided via the blockchain subscription pay manager application.

The subscription payment system can be implemented using a smart contract supported blockchain technology. Whilst some of the examples provided herein are constrained to a payment system in the context of a Ethereum blockchain based subscription payment system, and in particular based on the blockchain technology ERC-20 which is a technical standard used for smart contracts on the Ethereum blockchain for implementing tokens, the payment system may be implemented in other smart contracted supported blockchain technologies instead of Ethereum. The methods, processes, and systems described herein can be applied to technologies in which users and merchants perform financial recurring transactions such as, but not limited to subscriptions with utility companies, online entertainment service providers, online gaming service providers, virtual shopping malls and websites, e-commerce systems, and virtual communities.

As a general overview, the blockchain subscription payment management system has a subscription recurring pay manager application configured on one or more processors to interface devices (one or more user devices, one or more merchant devices, and any centralized server databases that may be operating over a centralized computer network/device) with smart contract(s), including smart contract subscription wallets, that operate over a decentralized network (smart contract supported blockchain). The system includes one or more centralized databases for storing users subscription account data and merchant subscription account data associated with the subscription being managed by the subscription recurring pay manager application. As will be explained in more detail below, blockchain subscription pay manager application is configured to provide both the application user and merchant with centralized user interfaces for management of decentralized subscription recurring payment services over the blockchain thereby allowing both users and merchants to seamlessly interact and manage subscription recurring payments via the same online application. As already indicated hereinbefore, the blockchain subscription pay manager application is one part of a decentralized application. The decentralize application comprises the blockchain subscription pay manager application and the smart contract(s). The blockchain subscription pay manager application is configured to render a graphical user interface on the user/device, such as browser (in this case a web browser), and interface with one or more cryptocurrency wallets. In some embodiments, the blockchain subscription pay manager application is a client-server application. In some other embodiments, the blockchain subscription pay manager is a client side application that can run entirely on the user devices and/or merchant devices and acts as the interface between the users/merchants and the blockchain (see but not limited to for example FIG. 18B). The crypotocurrency wallet software is configurable to communicate over the blockchain with the subscription smart contract(s).

Figure 15:
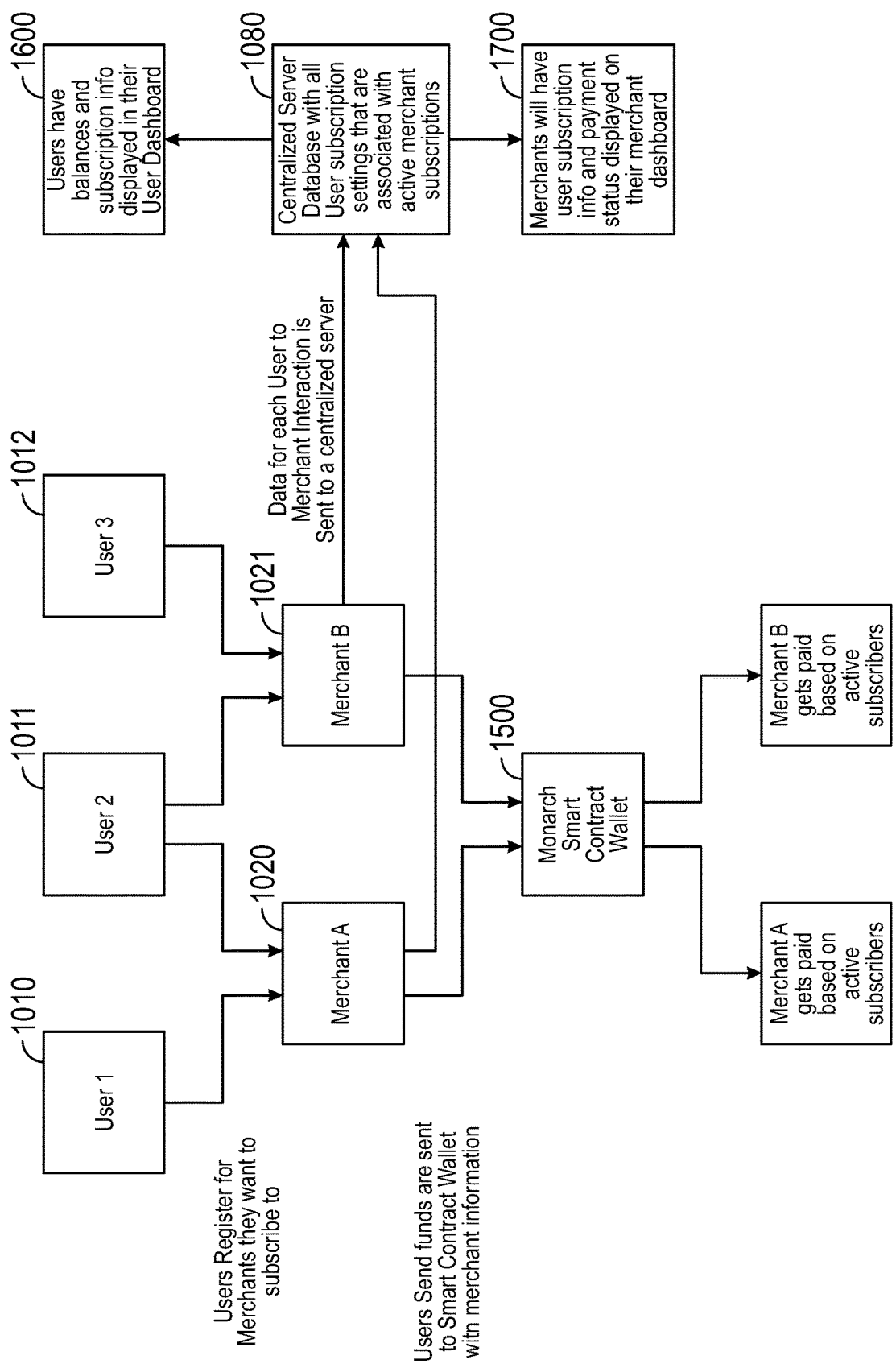
FIG. 15 illustrates a block diagram outlining interactions between user devices, merchant devices and a smart contract subscription pay system for implementing subscription services according to aspects of the present technology.

FIG. 15 is a block diagram outlining the general approach for implementing blockchain enabled subscription services according to some aspects of the present technology. Users via user devices 1010-112 are configured to interact with merchant devices 1020,1021 over a computer network. Users can register for, or otherwise select, merchants they want to subscribe to. Merchant devices 1020,121 and a centralized server 1080 are configured to communicate with one another. Data for each User to Merchant interaction is sent to the centralized server database 1080. Such data may comprise private and/or confidential data associated with the user, merchant and/or merchant-user interactions. As will be explained in more detail below, the system determines which users are associated with which merchants and which subscription plans by way of a subscription plan invoicing process which enables collection of user and merchant information and subscription plan information. Centralized server database 1080 is configured to store user subscription settings that are associated with active merchant subscriptions. The system is configured to send user funds to a blockchain smart contract wallet 1500 together with merchant information. Smart contract wallet 1500 is configured to pay merchants based on active subscribers.

The system is configured to render on the user device 1010, 1011, 1012, a User dashboard 1600 associated with the system user account being accessed on the user device by the user (See but not to limited for example FIG. 16). The User dashboard is configured to display balances and subscription info associated with a plurality of subscriptions with one or a plurality of different merchants. The system is further configured to render on the merchant device 1020, 1021 a Merchant Dashboard 1700 associated with the system merchant account being accessed on the merchant device by the merchant (See but not limited to for example FIG. 17). The Merchant dashboard displays user subscription info and payment status for a plurality of different users for one or a plurality of different subscription services provided by the merchant. The system provides all inclusive tools in the sense that both users and merchants are able to seamlessly interact via their user and merchant devices via a centralized platform to set up subscription plans, send subscription plan invoices, set up subscription plan payments and perform and manage subscription transactions between the users and merchants despite the subscription recurring payments being performed over a blockchain decentralized network.

FIG. 16 illustrates a user dashboard graphical user interface provided by the blockchain subscription pay manager application according to an embodiment. User dashboard 1600 has a current subscriptions portion 1601, subscription wallet balances portion 1602, recent payments portion 1603 and next payment due portion 1604.

User dashboard 1601 includes unsubscribe buttons 1605 and 1606, associated with respective different current subscriptions that are configured to allow a user to easily selectively unsubscribe from one of the plurality of current subscriptions simply by clicking or activating the unsubscribe button associated with the current subscription that the user wishes to unsubscribe from.

User dashboard 1602 includes withdraw buttons 1607, 1609 and 1611, associated with respective different crypto currency balances and that are configured to allow a user to easily selectively withdraw from one of plurality of the different crypto currency balances simply by clicking or activating the withdraw button associated with the cryptocurrency balance that the user wishes to withdraw from.

Current subscriptions portion 1601 lists a plurality of different subscription plans and associated information for the user. User dashboard 1600 includes deposit buttons 1608, 1610, 1612, associated with respective different crypto currency balances and that are configured to allow a user to easily selectively deposit to one of plurality of the different crypto currency balances simply by clicking or activating the deposit button associated with the cryptocurrency balance that the user wishes to deposit to.

User dashboard 1600 can include a next payment due summary screen portion listing next payment info associated with respective different subscription plans for the same and/or different merchants.

User dashboard 1600 is not limited to the layout, portions, or buttons shown. In some other embodiments, user dashboard 1600 may show more or less elements and different subscription payment information.

FIG. 17 illustrates a merchant dashboard graphical user interface provided by the blockchain subscription pay manager application according to an embodiment. Merchant dash board Merchant Dashboard 1700 includes subscription plan payment information portions 1701, 1710 for respective different subscription plans. Each subscription plan payment information portion 1701 and 1702 summarizes, for each one of a plurality of different users, user payment information such as user name, email, blockchain address, in this example Ethereum address, and payment status such as "paid" and "overdue". The status info can also serve as a button or link to a specific subscription information 1702 pop up or screen for the user associated with the subscription plan payment information button or link. Specific subscription information that is rendered in response to clicking or activating the button or link may be payment price, date of payment for each one of a plurality of different plan types to which the particular user associated with the link or button is associated.

Merchant Dashboard 1710 may also include a blockchain withdraw address field 1720.

Merchant dashboard 1700 is not limited to the layout, portions, or buttons shown. In some other embodiments, merchant dashboard 1700 may show more or less elements and different subscription payment information.

Figure 18A:
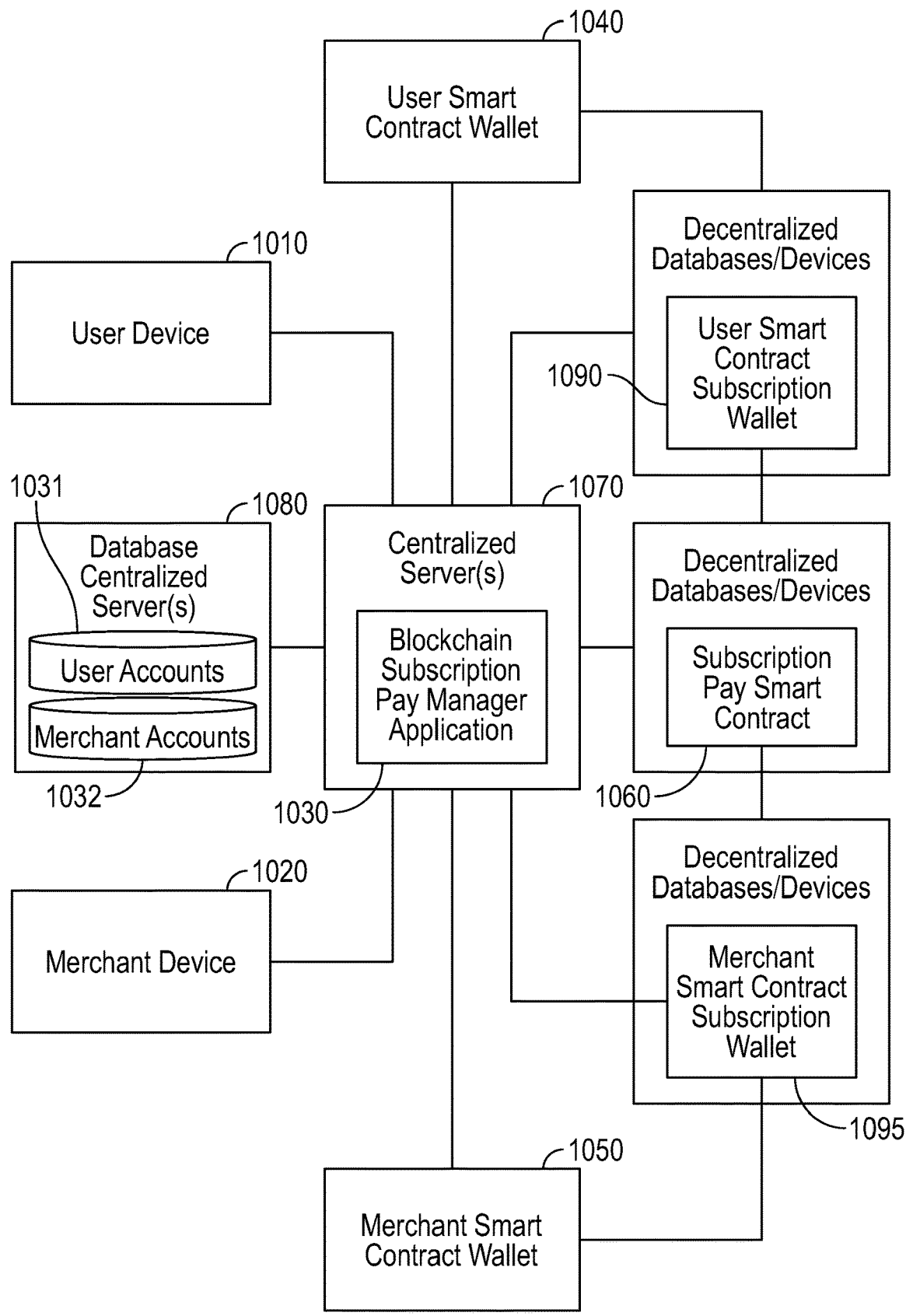
FIG. 18A illustrates a generalized schematic diagram of a hybrid centralized and decentralized network system that can be used to practice aspects of blockchain subscription pay manager according to some embodiments.

FIG. 18A illustrates a schematic diagram showing in more detail a blockchain subscription payment management system for handling subscription payment transactions between a user device and a merchant device according to some embodiments. FIG. 18A is a generalized block diagram illustrating the blockchain subscription payment management system according to one embodiment in which a blockchain subscription pay manager application 1030 is configured to interact over a centralized internet network with one or more of the user devices 1010 and one or more of the merchant devices 1020 and to interact over or with a decentralized internet network (smart contract supported blockchain) with one or more smart contracts 1060. In this embodiment, the block chain subscription pay manager application 1030 is implemented on one or more web servers 1070 or other centralized server(s) and accessible on user and merchant devices via a web browser (for PC etc.) or other type or browser depending on the type of user/merchant device (e.g. mobile phone browser for a mobile phone etc.). However, in some other embodiments, the blockchain subscription pay manager application may be run entirely on the user and/or merchant devices as a client application. Users and merchants can access the blockchain subscription pay manager application 1030 via their user devices 1010-1012 and merchant devices 1020,1021, respectively, directly through the use of web forms or a website. However, in some other embodiments, some or all of the blockchain subscription pay manager application can be implemented and/or accessed on the client end in the form of one or more client-side applications implemented on the user device and/or merchant device. The GUIs generated for the client-side application would in some embodiments be configured for Smartphone or mobile device usage. Thus, the client-side application can be adapted for iOS™ or Android™ deployment. The client-side application can comprise both an end-user facing version for end users (e.g., payors) and a merchant-facing application for merchants or other entities (e.g., payees).

Blockchain subscription pay manager application may be configured to generate and maintain application user accounts 1031 in response to receiving registration instructions from user devices and/or by way of receiving authorization to connect to users cryptocurrency wallet(s) by way of wallet handling software. User registration or authorization instructions may include private user information and public user information. Private user information included in application user accounts may include private information such as personal contact information (e.g. Email address, telephone number, home address etc.). In some alternative embodiments, user information provided in user accounts 1031 may also include blockchain addresses and/or private/public passwords/keys of blockchain accounts/wallets which may include third party block chain smart contract wallets 1040. In some other embodiments, user personal smart contract wallets 1040 may be part of the blockchain subscription pay manager application itself, handled and/or provided by the blockchain subscription pay manager application service provider rather than a wallet third party software. The blockchain subscription pay manager application user accounts are maintained in a centralized database operably connectable to the blockchain subscription pay manager application 1030. Private user information is kept confidential by the system using a centralized database arrangement and is not publicly disseminated on the blockchain by the blockchain subscription pay manager application. Blockchain subscription pay manager application 1030 may be configured to generate login credentials for each particular user as part of the user account and/or configured to allow access in response to the user authorizing access to their wallets. The blockchain subscription pay manager app 1030 is further configured to render a user dashboard graphical user interface, such as by for example but not limited to user dashboard 1600, n the user device which a user can access by way of account login. The user dashboard displays on the user device blockchain wallet balances and subscription info associated with plurality of different subscription plans. In particular, the user dashboard displays balances of the user smart contract subscription wallet 1090 associated with different subscriptions with the same and/or different merchants.

Blockchain subscription pay manager application is configured to generate and maintain application merchant accounts 1032 in response to receiving registration instructions from merchant devices and/or in response to receiving authorization by the merchant to access their merchant wallet(s). Merchant registration instructions may include private merchant information and public merchant information. Private merchant information included in application merchant account may include private information such as personal or confidential merchant contact information (e.g. Email address, telephone number, office address etc.). In some alternative embodiments, Merchant information provided in merchant accounts 1032 may also include blockchain addresses and/or passwords of third party block chain smart contract wallets 150. Merchant accounts are maintained in a centralized database operably connectable to the blockchain subscription pay manager application. Private merchant information is kept confidential by the system using a centralized database arrangement and is not publicly disseminated on the blockchain by the blockchain subscription pay manager application. Blockchain subscription pay manager application is configured to generate login credentials for each particular merchant as part of the merchant account generation. The blockchain subscription pay manager app 1030 is further configured to render a merchant dashboard graphical user interface, such as but not limited to for example merchant dashboard 1700, on the merchant device which a merchant can access by way of account login and/or by way of authorization by the merchant to access their merchant wallet(s). As explained in more detail below, the merchant dashboard displays on the merchant device blockchain wallet balances and subscription info associated with a plurality of different subscription plans. In particular, the merchant dashboard displays on the merchant device of the particular merchant balances of the smart contract merchant subscription wallet 1090 associated with different subscription plans provided by the particular merchant together with subscription plan info including payment status and user details for a plurality of different users subscribing to the subscription plans.

Smart contract wallet 1500 for the purposes of illustration may be considered as comprising the following blockchain sub components: subscription pay smart contract 1060, user smart contract subscription wallet 1090, and a merchant smart contract subscription wallet 1095. These blockchain smart contract sub components in practice may form part of the same general purpose computation that takes place on the blockchain but are illustrated here separately for the sake of illustration and explanation. The blockchain subscription pay manager application 1030 is generally operably configured to generate and deploy the blockchain subscription pay smart contract 1060, user smart contract subscription wallet 1090, and the merchant smart contract subscription wallet 1095 over the decentralized internet. In this embodiment, the decentralized internet network is a blockchain Ethereum network but in other embodiments the decentralized internet network may be another type of smart contract supported blockchain network. Furthermore, Blockchain subscription pay manager application 1030 is configured to interact with blockchain smart contract 1060 and subscription wallets 1090,1095 and interface the blockchain smart contract/wallets with centralized operations, like subscription plan setup, invoicing and subscription plan payment accounting via user interfaces on the user devices and merchant devices.

Each user has a predefined user subscription smart contract wallet 1090 or is provided one by the Blockchain subscription pay manager application 1030 and/or smart contract. The user subscription smart contract wallet 1090 is exclusive to the user account holder. A smart contract enabled wallet allows a user personal funds to have contract data. As will be explained in more detail below, the blockchain subscription pay manager application and/or smart contract is configured to associate the user subscription wallet with each specific subscription payment plan offered to the user using for examplethe particular subscription ID assigned to the respective subscription payment plan. The user subscription wallet 1090 is accessible and viewable via the blockchain subscription pay manager application by the blockchain subscription pay manager application requesting and allowing the particular user to log into the their wallet on the user device. The merchant subscription smart contract wallet 1095 is predefined or provided by the Blockchain subscription pay manager application 1030 and/or smart contract and exclusive to the merchant account holder. The merchant subscription wallet is accessible and controllable via the blockchain subscription pay manager application by the application being authorized by the merchant account holder to have access to their merchant wallet(s).

As shown in FIG. 18A, the blockchain subscription pay manager application 1030 is also operably connected to smart contract crypto accounts/wallets of the individual users and/or the merchants. These "personal" smart contract crypto accounts/wallets are separate from the subscription wallets 1090,1095 or may be associated therewith. As indicated previously, such personal smart contract wallets may be operated or hosted by a third party service provider. However, in other embodiments one or more of these smart contract crypto accounts/wallets of the individual users and/or the merchants may be hosted or operated by the blockchain subscription pay manager application or blockchain subscription pay manager application service provider.

As already indicated, the blockchain subscription pay manager application is configured to enable both users and merchants to operate the blockchain subscription pay manager app and interface with their assigned personal smart contract wallets and their assigned subscription wallets using the same centralized platform.

Blockchain subscription pay manager app 1030 is configured to determine which users are associated with which merchants and which subscription plans by way of a blockchain subscription plan invoicing and payment processing capability which enables collection of user and merchant information and subscription plan set up and payment information and gives the user and merchant a "look and feel" of a universal centralized payment system despite interactions with the subscription smart contracts/wallets over the blockchain decentralized network. For this reason, integration of the blockchain subscription plan invoicing and payment management process is highly advantageous to both the user and merchant.

Figure 19A:
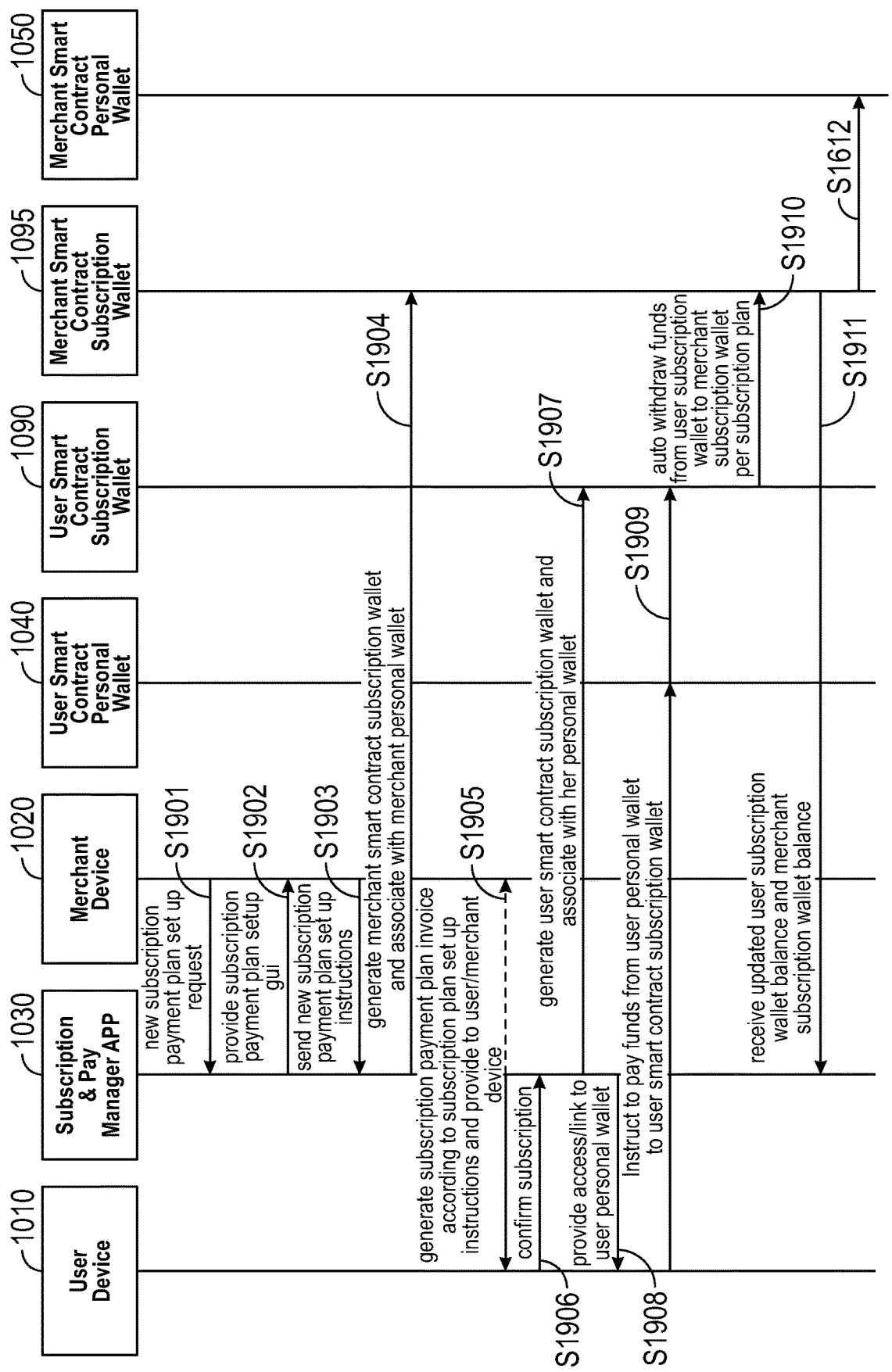
FIG. 19A is a diagram that depicts the steps performed by user device, blockchain subscription payment app, merchant device and the user and merchant blockchain smart contract/wallets according to one embodiment to enable subscription invoicing and payment processing management via a centralized interface according to one embodiment.

Some embodiments of the integrated subscription plan generation, invoicing and payment set up will now be described with reference to FIG. 19A. The cryptocurrency subscription wallet/account may be a pre existing merchant personal wallet that has been imported into blockchain subscription pay manager app or a wallet handling platform to enable the merchant subscription wallet functionality within the smart contract. In response to receiving via the merchant device merchant entered sign in/confirmation of sign in to the merchant subscription wallet, the subscription pay manager app provides a merchant dashboard on the merchant device including buttons or other widgets to initiate setting up a new subscription pay new subscription plan. In other embodiments, the set up request may be triggered automatically in response (S1901) to interaction by a user device with a website, such as by way of a user registering with a merchant website or service.

In response to the merchant device triggering a new subscription set up request, for example by the merchant manually entering instructions via the merchant dashboard, subscription pay manager app 1030 renders a new subscription payment plan set up instructions gui on the merchant user interface on the merchant device 1020 (S1902). Such set up instructions may be for example in the form of a subscription plan set up GUI form. By way of non-limiting example, FIG. 22 is an exemplary New Subscription Plan GUI configured to receive set up instructions from a merchant setting up a new subscription plan according to an embodiment;

The new subscription plan instructions entered by the Merchant are received by the subscription pay manager app (S1903). The new subscription plan instructions comprise information provided by the merchant interacting with the subscription plan set up GUI form. The new subscription plan information includes information defining subscription plan payment terms.

The subscription pay manager app receives confirmation to create the new subscription payment plan, for example in response to a merchant entered instruction in the subscription plan set up form or other part of the merchant dashboard. In order for the plan to be configured in the smart contract, the merchant confirms payment of a gas fee from their merchant wallet to complete the plan confirmation. The gas fee reflects the cost for deploying the smart contract subscription plan and executing the constructor code on the blockchain. Based on the provided new subscription plan information, subscription pay manager app 1030 identifies the smart contract parameters or template corresponding to the new subscription plan and the associated subscription ID and interacts with the smart contract accordingly. The merchant smart contract subscription wallet is associated with the new subscription plan smart contract set up. The app and/or smart contract may optionally generate a smart contract merchant subscription wallet for the merchant and associate the merchant personal wallet with the merchant subscription wallet if this has not yet been done already (S1904). The merchant personal wallet address is either pre-defined during set up of the merchant subscription pay manager app or provided to the subscription pay manager app with the new subscription plan information or provided when approving transactions between wallets. The subscription pay manager app interacts with or sends instructions to the blockchain smart contract to select the smart contract subscription template for execution according to the new subscription plan set up. This interaction with the smart contract may be implemented now or later during the subscription user confirmation process.

The invoice payment destination in the new subscription payment plan set up form, such as shown in FIG. 22, is generated automatically and is the merchant personal smart contract wallet address but this address may be changed manually, if needed. In some embodiments, the created subscription plan can never be changed by the merchant but may be saved as template and accessed is via the blockchain subscription pay manager merchant interface for generating and sending the invoice to multiple different users that may wish to subscribe to the same type of subscription plan offered by the merchant.

Subscription pay manager app 1030 automatically generates a subscription plan invoice according to the new subscription plan information provided from the merchant user device (S1905). By way of non-limiting example, FIG. 23 is such an invoice GUI configured to receive user contact information instructions from a user subscribing to the new subscription plan according to an embodiment.

The merchant may have access to the generated invoice to verify generated information and/or assist in the merchant using the merchant device to instruct the subscription pay manager app to send the invoice to the user device/user account. User access to this invoice is provided by the merchant device forwarding the invoice, or a link thereto, to the user device either directly via the subscription pay manager app or indirectly via some other means such as by means of email, text message, social media links, etc. Alternatively or additionally, the subscription pay manger app may send the invoice directly to the user device and/or user account without the need for any interaction by the merchant on the merchant device. In some embodiments, after creating the new subscription plan, an automated URL and/or QR code is generated for accessing the invoice. The automated URL, QR code or other link can be put anywhere on the merchant website or other website to enable the merchant to accept the crypto subscription payments from users.

The user can view the invoice on the user device and confirm the subscription by authorizing access to their user personal/subscription wallet that is set up to work with the blockchain subscription manager pay app. The user personal and subscription wallets are either pre-defined during a previous set up by the user with the subscription pay manager app (by for example importing an existing wallet into bridge/proxy software to enable login to the user subscription pay manger app) or provided to the subscription pay manager app during the confirm subscription process and/or approval of funding transactions. The blockchain subscription pay manager app user interface provides a requests that the user provide approval by signing into the personal wallet and/or subscription wallet using their Private key. The generated invoice includes a payment set up button or subscribe button for activation by the user to cause the subscription pay manager app 1030 to initiate the smart contract subscription confirmation process with the user. Once confirmed by the user (S1906), the app and/or smart contract associates the user subscription wallet 1090 with the new subscription plan offered by the merchant via the invoice The user personal wallet address is either entered into the invoice by the user or pre-defined during set up of the user subscription pay manager app account or provided to the subscription pay manager app during the confirm subscription process and/or approval of funding transactions. The app may optionally generate a smart contract user subscription wallet for the user and associate the user personal wallet with the user subscription wallet if this has not been done already (S1907).

Figure 24:
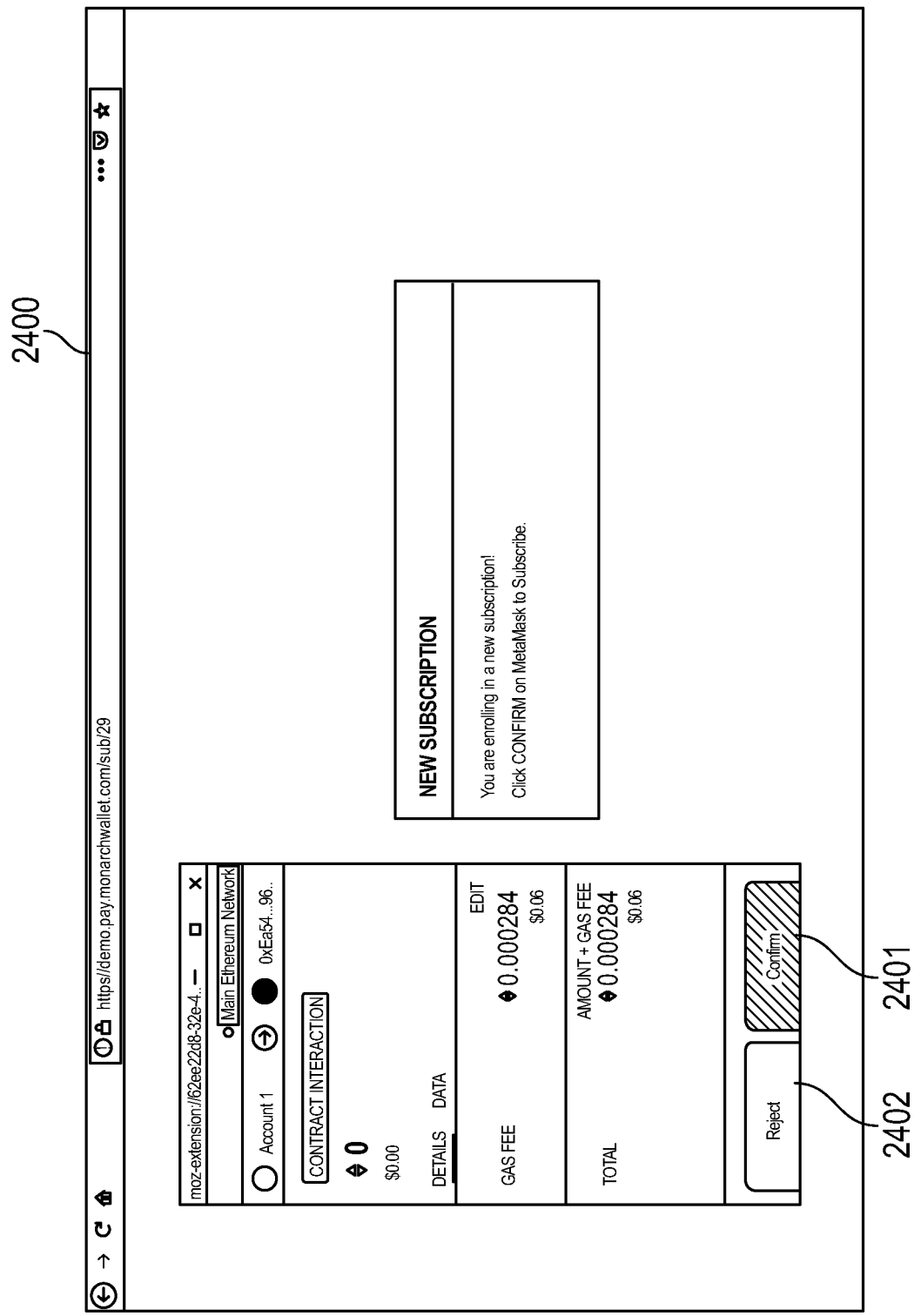
FIG. 24 is a new subscription confirmation GUI rendered on the user device in response to the user activating the subscribe link or button on the invoice GUI provided by the blockchain subscription pay manager app thereby allowing the user to access their user personal smart contract wallet application and approve the interaction of the user personal smart contract wallet with the subscription smart contract per the new subscription according to an embodiment.

The blockchain subscription payment manager app 1030 provides on the user device 1010 a link or accesses directly (e.g. using an API) to the user smart contract wallet platform interface or renders a GUI (S1908) for the purpose of receiving user instructions and user interaction in approving fund transfers between the user personal smart contract wallet 1040 and the user subscription smart contract wallet 1090 and/or confirming the subscription. By way of non-limiting example, FIG. 24 is a new subscription confirmation GUI configured to allow interaction between the user personal smart contract wallet and the subscription payment system for allowing the user to approve contract interaction between the user personal smart contract wallet and/or user subscription wallet and the subscription smart contract according to the new subscription.

User smart contract wallet 1040 receives instructions from user device 1010, or indirectly via blockchain subscription pay manager app 1030, to approve fund transfers from the user smart contract personal wallet 1040 to the user smart contract subscription wallet 1090 and/or the merchant subscription wallet 1095 and/or from their user subscription wallet to the merchant subscription wallet 1095 (S1909). Then, blockchain subscription pay manager app user interface provides a requests that the user provide approval by signing into the personal wallet and/or subscription wallet using their Private key. To this end, the subscription payment process is fulfilled by the subscription smart contract automatically withdrawing funds from the user smart contract subscription wallet 1090 to the merchant smart contract subscription wallet 1095 according to the subscription plan terms (S1910). The smart contract may interact with the user smart contract personal wallet 1040 and/or cause the subscription pay manager app 1030 to prompt the user device to approve deposit of funds from the user smart contract personal wallet to the user subscription smart contract wallet if there is an insufficient balance in the user subscription smart contract wallet for the purpose of fulfilling subscription payments or for the purpose of making a first time payment to the subscription. The user provides approval by signing into the personal wallet using their Private key. One non-limiting example of this process of enrolling in and fulfilling subscription payments according to the smart contract is explained in more detail with reference to FIG. 21. It will be understood that in some other embodiments, the order of processes set forth in FIG. 19A may be different and that one or more of the processes may be omitted.

Figure 18B:
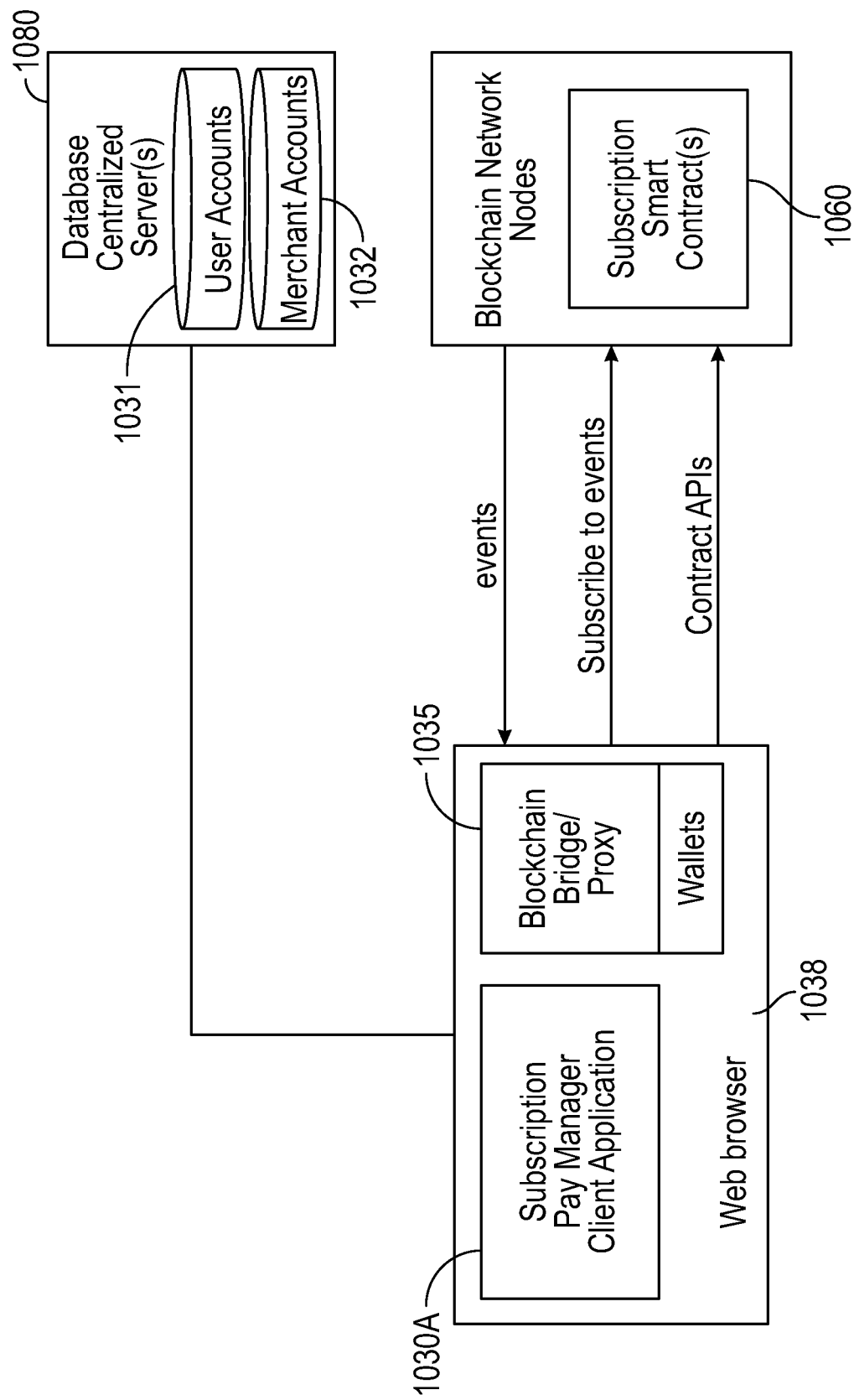
FIG. 18B illustrates a generalized schematic diagram of a decentralized application comprising the blockchain subscription pay manager application as a client application operably coupled to the smart contract according to some embodiments.

Blockchain subscription pay manager application 1030 may be operably interfaced with the user/merchant wallets and the blockchain including the subscription smart contract in various ways. Reference will now be made by way of example to some embodiments in which the blockchain subscription pay manager application is a client side application and a blockchain network node is run via a bridge/proxy for connecting the blockchain subscription pay manager application (the blockchain pay manager application configured as a client side only application) to the blockchain network. By way of non-limiting example, FIG. 18B illustrates the app running as the blockchain subscription pay manager client application 1030A and a bridge/proxy 1035 allowing the user and/or merchant to select different networks and blockchain wallets/accounts. The bridge/proxy 1035 enables the block chain subscription pay manager client app to propose blockchain transactions, ask for a user/merchant signature, query the blockchain and so on. The blockchain may be a Ethereum blockchain ECR-20

By way of example, in some embodiments, the bridge/proxy 1035 is a web browser plug in which may be provided by the blockchain subscription pay manager application service provider or a third party such as for example ConsenSys AG's MetaMask (see https://metamask.io/). In some other embodiments in which the user/merchant device is a mobile smart device rather than a PC, a different browser or interface may be used.

In order for the blockchain subscription pay manger client application to operate and connect with the blockchain via the bridge/proxy, the client application allows the user to login to their blockchain Ethereum wallet/accounts and confirm that the client application is allowed to view the Ethereum account address(es).

For an Ethereum blockchain network, in some embodiments in which the bridge/proxy is a web browser plug in, the browser is configured to inject a Web3 instance into a window object making it available for JavaScript code.

In some embodiments the blockchain network is an Ethereum network based on the blockchain technology ERC-20 and the smart contract may be a collection code and data that is written at a specific location or address in the blockchain. By way of non-limiting example, or the case of Ethereum network, the smart contract may be written using a suitable computer language known in the art and then deployed to the blockchain. The blockchain miners run virtual machines, in this non-limiting example, Ethereum virtual machines, and implement contract API calls using for example client libraries (See FIG. 29 for example of contract API calls and client libraries). Since the blockchain subscription pay manager client application is running in the web browser or other browser, interface with the blockchain may be achieved in some embodiments by using the appropriate web-blockchain API libraries and a connection to a blockchain network node. The web-blockchain API libraries are a collection of libraries which allow the server or device to interact with a local or remote blockchain node using HTTP or IPC connections or other future but not yet devised types of network connections. In the embodiments of FIG. 18A and/or FIG. 18B, the web-blockchain API libraries may take the form of Ethereum Javascript API libraries if the blockchain is an Ethereum network.

It is envisaged that interaction between the blockchain subscription pay manager application and one or more blockchain network node(s) can be provided by other types of browser or software packages/code to enable the decentralized application (the blockchain subscription pay manager application and smart contract(s)) to run on the system and as already explained hereinbefore these may not necessarily be limited to web browser apps. In some other embodiments, the blockchain subscription pay manager client application may connect to one or more blockchain nodes run by the service provider of blockchain subscription pay manager client application rather than connect to an existing third party bridge/proxy. In some embodiments, a full Ethereum node may be run instead of the bridge/proxy to achieve the same overall client side functionality described herein.

In the embodiments described with reference to FIGS. 18A & 18B, the blockchain subscription pay manager application is configured to allow users/merchants to access and view their cryptocurrency wallet(s) and account(s) via the user/merchant dashboards of the client application but the decentralized application does not hold the private keys of the crypto currency accounts. Private keys are held by the users and merchants (locally on the user and merchant devices for example). The blockchain subscription pay manager client application is configured to request that Users and Merchants login to their crypto currency wallets and confirm the application has access to their cryptocurrency account address(es) to enable the application to view and manage their subscription payment processes. Consequently, the user and/or merchant wallets use the private keys stored by the users/merchants on their user/merchant devices to gain access to the blockchain subscription pay manager application to perform such tasks as view their subscriptions, set up new subscription plans, invoice new subscriptions plans, set up new payments.

Figure 19B:
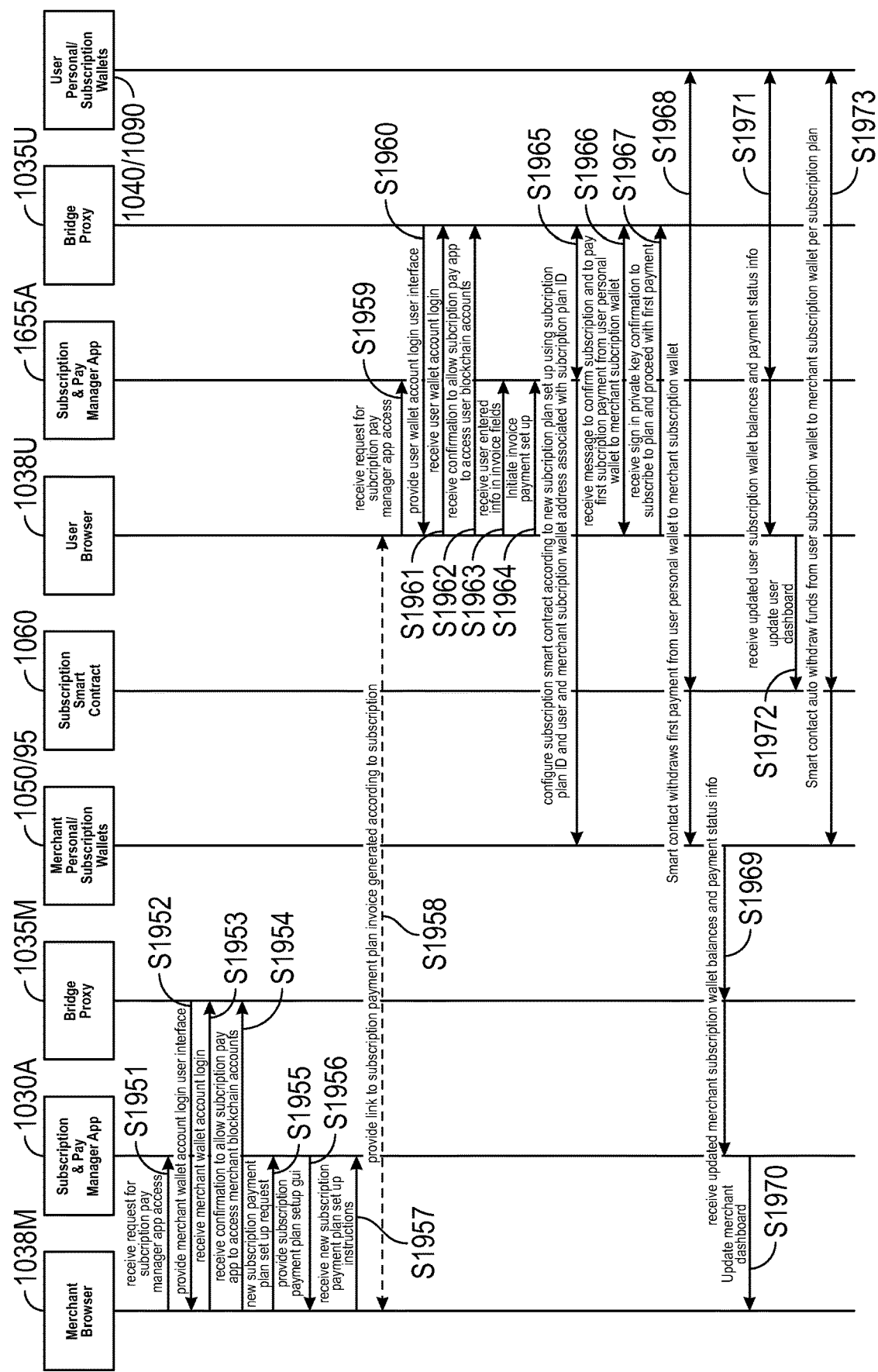
FIG. 19B is a diagram that depicts steps performed by the payment system including the blockchain subscription manager client applications running on a merchant browser and on a user browser according to some embodiments.

FIG. 19B is a diagram that depicts steps performed by the payment system including the decentralized application comprising the blockchain subscription pay manager client application apps 1030A and the smart contract 1060, including smart contract subscription wallets, according to some embodiments. The decentralized app may be configured for example as shown in FIG. 18B in which a blockchain subscription pay manager app 1030A is operable via a merchant browser on a merchant device and in which a blockchain subscription pay manager app 1030A is operable via a user browser on a user device. Blockchain bridge/proxy 1035M is accessible on the merchant browser to enable management of merchant wallets 1050, 1095 and authorization of access by the blockchain subscription pay manager to the merchant blockchain accounts. Blockchain bridge/proxy 1035U is accessible on the merchant browser to enable management of user wallets 1040, 1090 and authorization of access by the blockchain subscription pay manager 1030A to the user blockchain accounts.

Prior to the method shown in FIG. 19B, merchant has imported their personal wallet into the blockchain bridge/proxy platform 1035M (such as meta mask) and selected it so as to allow the app to form and associate their smart contract subscription wallet 1095 with their personal wallet. Similarly, the user has imported their personal wallet into the blockchain bridge/proxy platform 1035U (such as metamask) and selected it so as to allow the app to form and associate their smart contract subscription wallet 1090 with their personal wallet. As already explained above, wallets including subscription wallets may additionally or alternatively be provided by the blockchain subscriptions pay manger app. As indicated in FIG. 19B, the merchant browser 1038M running on the merchant device 1901 requests for access to the blockchain subscription pay manager client app 1030A (see S1951). This may for example be in response to a merchant browsing to the website of the service provider of the blockchain subscription pay manager app and clicking login or as a result of automated trigger from an e-commerce or other process. A user interface to Bridge/proxy 1035M is provided on the merchant browser 1038M to enable the merchant to login to their wallet account (S1952). Bridge proxy 1035M receives the merchant wallet account login details in response to a merchant logging in to the account (S1953). Bridge proxy 1035M receives authorization to interface with the blockchain subscription pay manager client app 1030A and allow the blockchain subscription pay manager client app 1030A to have access to the merchant wallet account (S1954). This may be for example in response to the merchant providing instructions via the merchant browser. Subscription pay manager app receives a request via the merchant browser to set up a new subscription payment plan (S1955). This may be for example in response to the merchant browser being provided with a merchant dashboard by the subscription pay manager app and the merchant clicking on the option to set up a new subscription payment plan. Subscription pay manager app then renders a new subscriptions payment plan set up gui on the merchant browser (S1956). The new subscription payment plan set up gui may be for example be a new subscriptions payment plan set up as described herein with respect to any one of the embodiments. Subscription pay manager app receives new subscription payment set up instructions (S1957). This may be for example in response to the merchant entering details into the new subscription payment set up plan form and submitting it to the app. In some embodiments, in order for the plan to be configured in the smart contract, the merchant confirms payment of a gas fee from their merchant wallet to complete the plan confirmation. The gas fee reflects the cost for deploying the smart contract subscription plan and executing the constructor code on the blockchain. In response to generating a new plan, the smart contract is configured in a similar manner to that described with reference to FIG. 19A. The subscription pay manager app then automatically generates a subscription payment plan invoice for the new subscription payment plan according to the submitted set up instructions and provides a link or code for accessing the invoice via a user/merchant device (S1958). The invoice may be for example be any one of the invoices as described herein with reference to any of the embodiments. The link or code may be provided to a user device as an offer or in response to a request to subscribe. The link or code may be provided to the user and/or merchant device for example, via email, text messaging, clicking on a merchant website widget or some other means either automatically via the app or manually. The merchant may, if necessary, review the invoice via the merchant dashboard on the merchant browser before providing the invoice or link or code to a user or user device.

The user browser 1038U running on the user device requests for access to the blockchain subscription pay manager client app 1030A (see S1959). This may for example be in response to the user browsing to the website of the service provider of the blockchain subscription pay manager app and clicking login or as a result of automated trigger from an e-commerce or other process such as in response to a user accessing the invoice via the invoice link or code. A user interface to Bridge/proxy 1035U is provided on the user browser 1038U to enable the user to login to their wallet account (S1960). Bridge proxy 1035U receives the user wallet account login details in response to a user logging in to the wallet user account (S1961). Bridge proxy 1035U receives authorization to interface with the blockchain subscription pay manager client app 1030A and allow the blockchain subscription pay manager client app 1030A to have access to the user wallet account (S1962). Blockchain subscription pay manager provides the generated new subscription payment plan invoice on the user web browser and receives user entered info in the invoice fields (S1963). Once payment plan set up is initiated via the user browser (for example by the user clicking on the invoice set up payment button) (S1964), the subscription smart contract is configured by the app and bridge/proxy to set up and/or initiate the new subscription payment plan for automatically making recurring payments between the user subscription wallet and the merchant subscription wallet (S1965). The user browser then receives a message to confirm subscription and make first payment from their personal wallet to merchant subscription wallet (S1966). The bridge proxy 1035U receives via the user browser the private key sign in confirmation by the user to subscribe to the new plan and proceed with first payment (S1967). This may be for example in response to the user confirming the private key sign in via the user browser. The bridge/proxy interfaces this confirmation to the subscription smart contract which withdraws the first payment from user personal wallet 1040 to merchant subscription wallet 1095 (S1968). The subscription pay manager app 1030A on the client side accessed via the merchant browser receives updated merchant subscription balance and payment status info (S1969) and renders this on the merchant dashboard on the merchant browser (S1970). The subscription pay manager app 1030A on the client side accessed via the user browser receives updated user subscription balance and payment status info (S1971) and renders this on the user dashboard on the merchant browser (S1972). The smart contract then automatically makes recurring payments from the user subscription wallet to the merchant subscription wallet per the new subscription plan (S1973). It will be understood that in some other embodiments, the order of processes set forth in FIG. 19B may be different and that one or more of the processes may be omitted, that is, the method reflected in FIG. 19B is not limited to the particular sequence of steps shown and certain steps may be omitted or repeated as appropriate. For example, the steps for receiving and rending user and merchant subscription wallet balances and payment status on user and merchant dashboards, respectively, may be performed at other times after subsequent payments or in response to manual requests from the user/merchant dashboards. The processes for making a first payment from the user personal wallet may be omitted. The processes for providing merchant and/or user wallet account login and/or authorization via the bridge/proxy to allow the blockchain subscription pay manager app to access the merchant and/or user wallet accounts may be omitted where the merchant and/or user wallets are imported into and handled directly by the blockchain subscription pay manager app.

Figure 20:
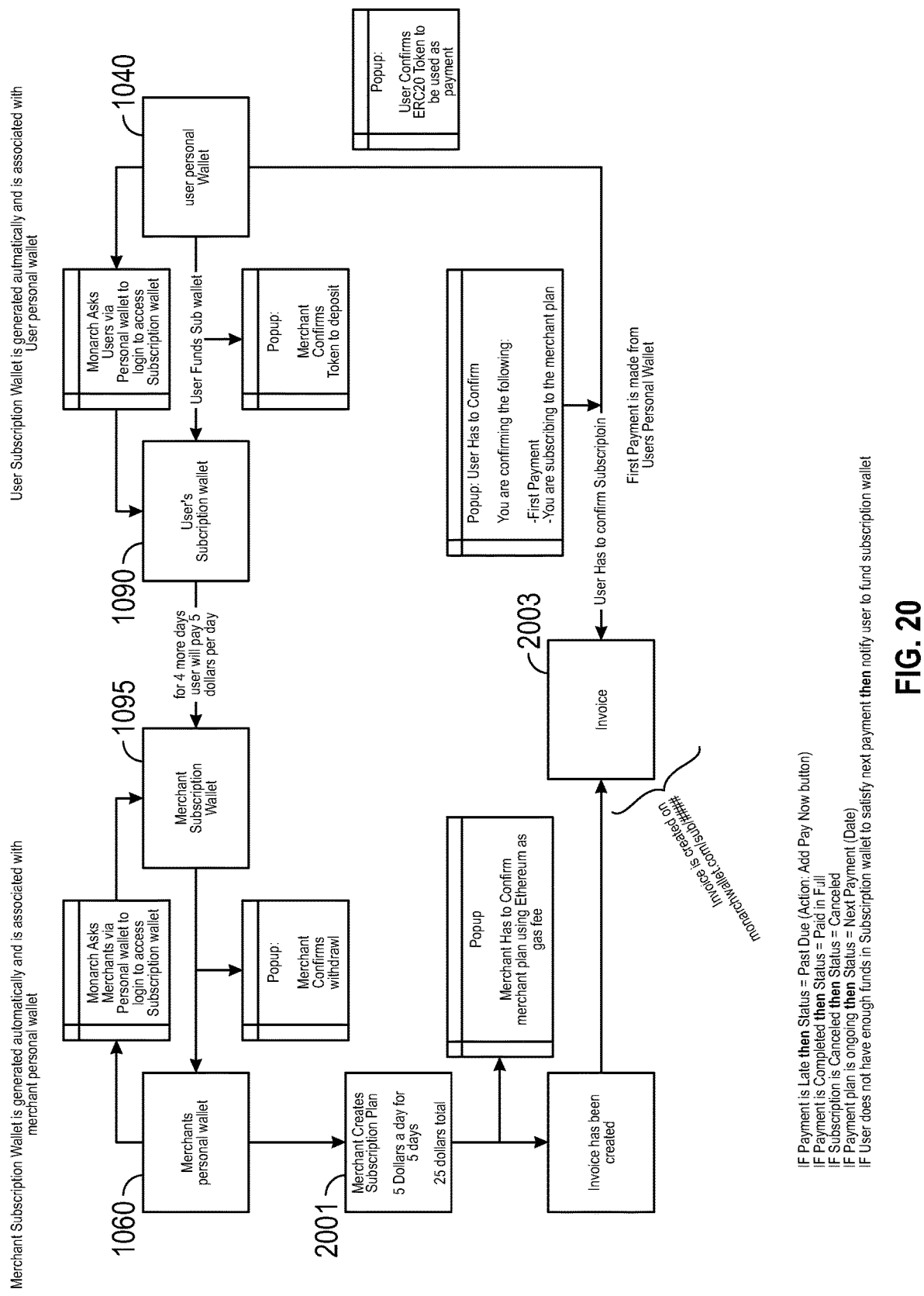
FIG. 20 illustrates a general block diagram illustrating the system implementing set up and payment of a specific non-limiting subscription payment plan using the method of blockchain integrated subscription plan invoicing and payment processing management according to an embodiment.

The method of integrated blockchain subscription payment plan invoicing and payment processing referred to hereinbefore, for example but not limited to FIG. 19A and/or FIG. 19B, will now be described with reference to a specific subscription plan example. FIG. 20 illustrates a block diagram generally representing the system for a non-limiting example in which the subscription payment plan 2001 is 5 dollars a day for 5 days for 25 dollars total (See also FIG. 22 & FIG. 23). FIG. 20 depicts the merchant wallets 1040.1095, plan 2001, invoice 2003 and pop up messages that are rendered on the user interfaces of the merchant device and/or user device. The subscription payment plan is created by the merchant interacting with the subscription plan GUI form 2200 on the merchant device. The merchant enters subscription name, any description of product/service being offered to subscriber and any benefits of the subscription, USD amount per recurring payment, the processing fees to be paid to the blockchain subscription pay manager app service provider, currency in which the processing fees are to be paid which may be blockchain subscription pay manager app tokens or other currency, the frequency and payment day of the recurring payment (in this non-limiting example daily, and each day), the total number of payments (in this non-limiting example being 5). The merchant is able to select/actuate the new subscription payment plan GUI buttons 2202 so that invoice to be generated will request any one or any combination of username/email, phone number and physical address. The merchant is able to select/actuate the buttons 2203 so that the invoice to be generated will specify the payment currency type as any one or combination of monarch token (or other subscription pay manager app service provider token), true USD, DAI, ETH or other crypto currencies). In this specific non-limiting example, the selected payment type is ETH. The merchant also has the option to select/actuate the "pay now" button 2201.

As already explained with reference to some embodiments, in order to configure the new subscription plan in the smart contract, the merchant has to confirm the plan and pay a gas fee using Ethereum via their wallet. In response to the merchant activating the create plan button 2204, the blockchain subscription pay manager generates the subscription plan invoice 2003 according to the form data. In this specific non-limiting example, the generated invoice displays the recurring payment amount of 5 USD, currency as ETH, recurring payment schedule as daily, number of recurring payments as 5 and requests username/email info, phone number an physical address. The user is able to easily set up the blockchain subscription recurring payment by simply clicking on the subscribe button 2005 on the invoice. Since the submitted invoice includes username/email info entered by the user, the block chain subscription pay manager associates the user with their wallet set up with the blockchain subscription pay manger and a user interface prompts to confirm/sign into the user personal wallet to access the user subscription wallet and their user dashboard. If the user is not an existing user of the blockchain subscription manager pay app, the user may be prompted to set up a user personal wallet and user subscription wallet to work with the app. As indicated in FIG. 20, the user is then prompted on the user device to confirm the following info: First payment, you are subscribing to the merchant plan. In response, to the user device receiving user entered instructions to confirm the subscription, the smart contract automatically makes the first payment of 5 USD in ETH from the users personal smart contract wallet to the merchant smart contract subscription wallet and continues to automatically make 5 USD in ETH payments daily until the 25 total payment is made.

In order to explain in more detail the functionality of the smart contract according to some embodiments, reference will now be made to FIG. 21 which is a detailed flow chart that depicts the steps performed by a user device and a blockchain subscription payment system to enable a user to individually subscribe to a subscription provided by a merchant according to one embodiment. The smart contract functionality described with reference to FIG. 12 may be implemented for example in some of the methods of set forth herein such as the methods described with reference to FIG. 19A and FIG. 19B.

The individual subscription process 2100 starts by the blockchain subscription pay manager app generating in the computer system a graphical user interface 2101. Graphical user interface 2101 is rendered on the user device for interaction with a user (such as for example on user device 1010). In some embodiments, graphical user interface 2101 corresponds to an invoice for a new subscription payment plan generated by the blockchain subscription pay manager application, such as for example but not limited to invoice 2003 shown in FIG. 23.

The graphical user interface 2101 includes request fields for user information such as username, user personal smart contract wallet address, user email, physical address and phone number. Also included in graphical user interface 2101 is an activation or submit button 2102 for submitting information entered into the request fields to the blockchain subscription payment system. In response to receiving a user entered activation of the submit button 2102 on the user device, the blockchain subscription pay manger app and/or the smart contract sends a message 2103 to the gui of the user device alerting the user that the user is about to subscribe to a service or product (e.g. SERVICE A) offered by a merchant (e.g. COMPANY A) requiring a recurring payment of an amount per billing cycle (e.g. cost of X per Y). The alert message 2103 can include an indication of the types of crypto currency such as tokens accepted by the blockchain subscription payment system (e.g. tokens accepted DAI and TUSD) and in accordance with the particular merchant blockchain subscription payment plan (in some embodiments these may be specified during subscription payment plan set up by the merchant as explained herein with reference to embodiments). The blockchain subscription smart contract interacts with the user smart contract subscription wallet associated with the user to determine if the user has sufficient funds to initiate the subscription process. The blockchain subscription smart contract views the token balance in the user smart contract subscription wallet to determine if the user has enough tokens on the user smart contract subscription wallet to allow the smart contract to take a payment from the user smart contract subscription wallet in accordance with the subscription payment plan (step 2104).

If the blockchain smart contract determines the user subscription wallet token balance is sufficient, the smart contract function "approve token" is executed by the system which allows the smart contract to take specified tokens from the user smart contract subscription wallet (in this non-limiting example of FIG. 21, the tokens are ERC20 tokens) (step 2106). Step 2016 also includes the system executing the "Deposit" smart contract function which provides the permission for the smart contract to deposit the tokens taken from the user smart contract subscription wallet into the merchant smart contract subscription wallet. To this end, the system renders a gui message on the user device requesting the user confirm that they are depositing tokens of a specified amount from their user subscription wallet to the merchant smart contract subscription wallet (step 2110). The gui may be for example a pop up message that requests the user select via a menu the type of token to deposit, specify the amount to deposit and an activation button to activate the deposit. In response to activation of the deposit button, the system executes the smart contract function "deposit and subscribe to service", which allows the smart contract to deposit the specified amount of tokens from the user smart contract subscription wallet to the merchant smart contract subscription wallet and to subscribe to a template (the template corresponding to the subscription payment plan that may be set up by the merchant via the blockchain subscription payment manager app). The system then sends a confirmation message for rendering on the user device to confirm that the user has successful subscribed to the service at the merchant (e.g. SERVICE A AT COMPANY A) (step 2111)

If the blockchain subscription payment system determines the user subscription wallet token balance is insufficient to make a payment or payments according to the subscription plan (see step 2104), the system proceeds to determine if the user has enough tokens on their user smart contract personal wallet (step 2015). To this end, the smart contract function "check token balance" is executed by the smart contract which allows the smart contract to view the token balance of the user smart contract wallet. The system then determines if the token balance of the user smart contract personal wallet is sufficient to make a payment or payments according to the subscription plan. If the token balance of the user smart contract personal wallet is sufficient, the system proceeds to execute the smart contract function "approve token" which gives permission to the smart contract to use specified tokens to make the first payment (see step 2106). To this end, the the smart contract function "approve token" is executed by the system which allows the smart contract to take specified tokens for the first payment from the user smart contract personal wallet (in this non-limiting example of FIG. 21, the tokens are ERC20 tokens). The process can then continue to step 2110 whereby the first payment is authorized. If the token balance of the user smart contract personal wallet is insufficient, the system proceeds to execute the smart contract function "Get Ethereum Balance" which allows smart contract to determine if the user has enough ETH on their personal wallet to exchange for tokens of the type specified in the merchant subscription payment plan (step 2107). In some embodiments, this smart contract function can instead be a function to determine the balance of another type of crypto currency other than ETH or even fiat (in other words any other type of crypto currency that is not a type of token (crypto currency) specified by the merchant subscription payment plan but which can be exchanged for the correct type of token specified by the merchant subscription plan). The get balance function can be performed to check the balance of the user personal smart contract wallet or any other wallet that is associated with the user. If the user has sufficient balance of a crypto currency or fiat to be exchanged for tokens of the type specified by the merchant subscription payment plan, the system proceeds to execute the smart contract function "exchange" when executes an exchange API call to DEX to exchange ETH or other cryptocurrency/fiat for tokens of the correct type specified by the merchant subscription payment plan (2109). Once the exchange is completed by the system, the tokens of the type specified by the merchant subscription plan are moved to the user smart contact smart wallet and the process can for example revert to step 2104. If the user has insufficient balance of a crypto currency or fiat to be exchanged for tokens of the type specified by the merchant subscription payment plan, the system renders a message on the user device confirming that the user does not have enough money or funds to subscribe (step 2018).

Figure 21:
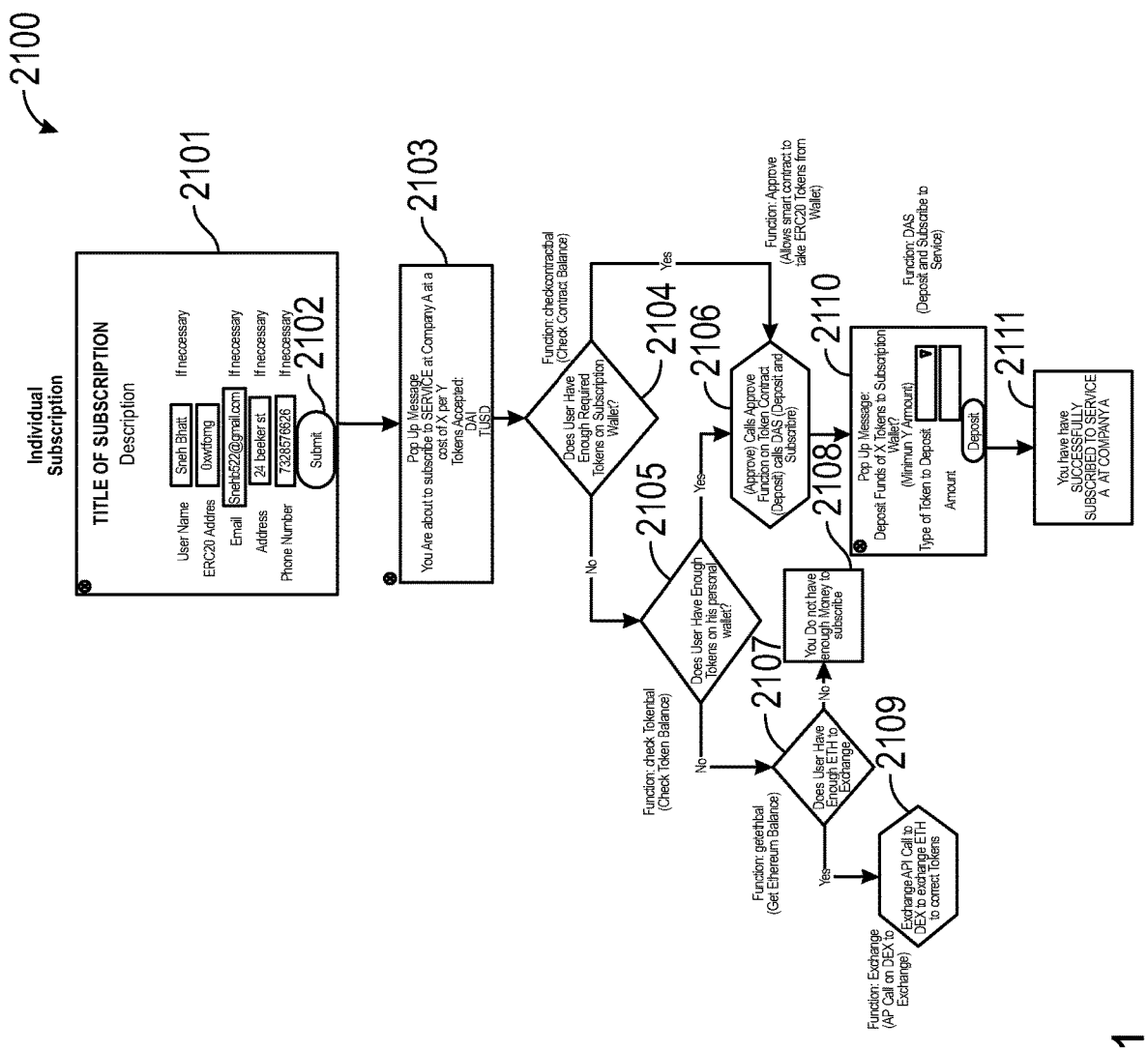
FIG. 21 is a detailed flow chart that depicts the steps performed by a user device and a blockchain subscription payment system to enable a user to individually subscribe to a subscription provided by a merchant according to one embodiment.

It will be understood that the process and/or system to enable a user to individually subscribe to a subscription provided by a merchant according to the embodiments described with reference to FIG. 21, is not limited by FIG. 21 and that process may have more or less of the steps and/or the steps may be performed in a different sequence or order.

Figure 29:
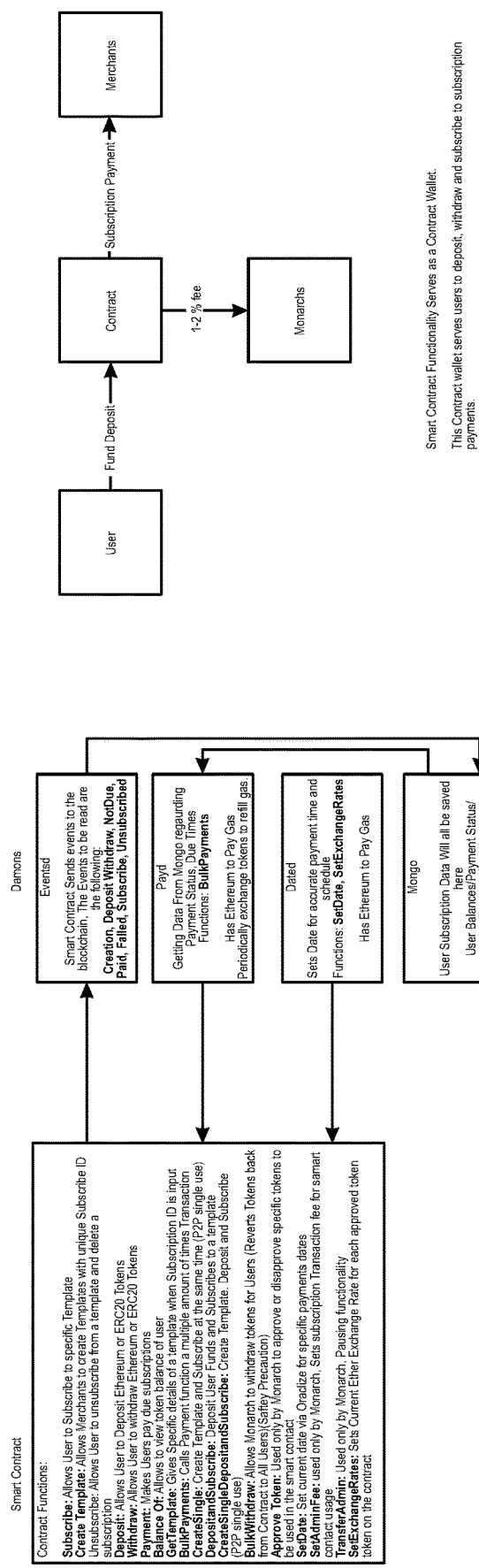
FIG. 29 is a generalized block diagram representing the subscription smart contract functionality and structure including contract functions, send events, events to read and payment status and other data according to one embodiment.

FIG. 29 is a generalized block diagram representing the subscription smart contract functionality and structure including contract functions, send events, events to read and payment status and other data according to some embodiments. As indicated in FIG. 29, the smart contract contains contract functions which can be triggered by events or instructions from the payment system. In some embodiments, the system can be configured to run background or ongoing processes (implemented for example by way of daemons) for the purpose of handling requests from the smart contract or from other services including the blockchain subscription pay manager application (see FIG. 29 for some examples of such processes and configurations). The smart contract functionality and set up shown in FIG. 29 can be used in some embodiments to implement the smart contract functionality described herein with reference to different embodiments of the blockchain subscription payment system and/or blockchain subscription payment manager app. However, other types of smart contracts and specific smart contract functions may be employed that achieve the substantially the same overall general process and methods of the blockchain subscription payment system and blockchain subscription payment manager app.

Figure 25:
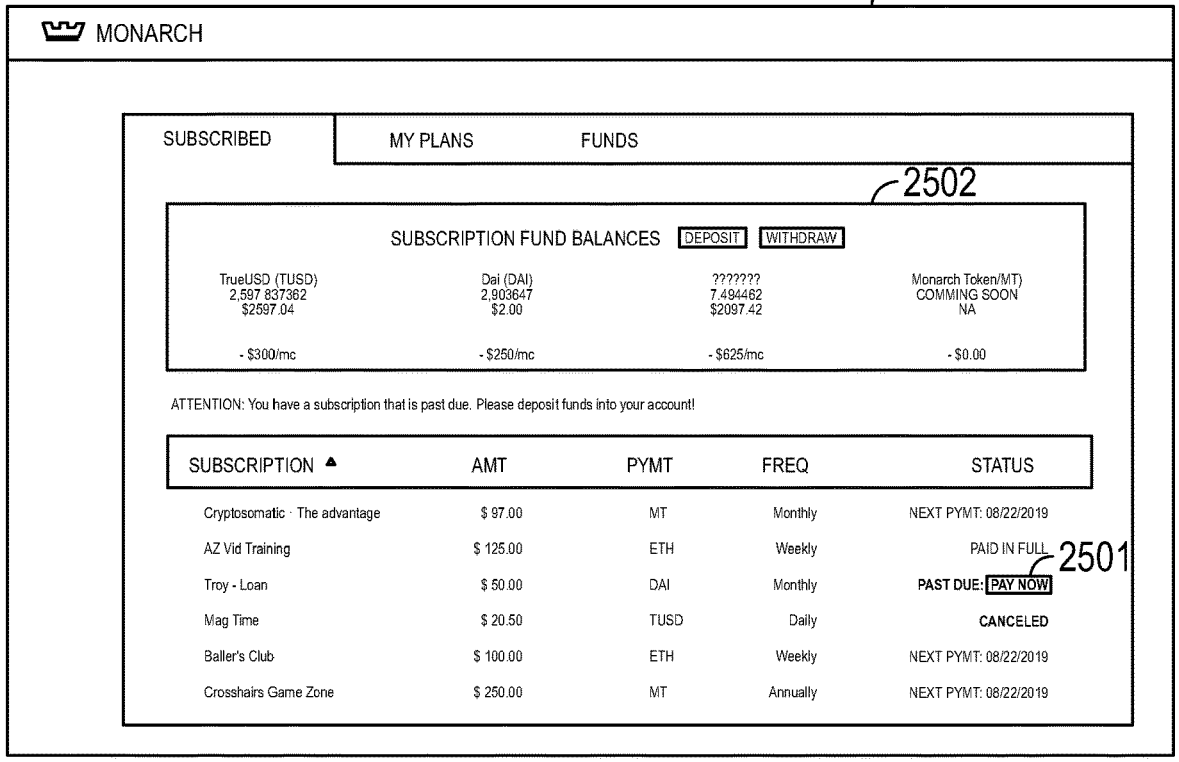
FIG. 25 is a user dashboard GUI configured to present payment and subscription fund information relating to a plurality of different subscriptions and to receive pay now and subscription selection instructions from the user device according to one embodiment.

FIG. 25 is a user dashboard GUI configured to present payment and subscription fund information relating to a plurality of different subscriptions and to receive pay now and subscription selection instructions from the user device according to one embodiment. GUI 2500 includes balances associated with a user subscription wallet in different types of crypto currencies and a "pay now" button 2501 for activation by a user of the user device. The GUI lists the different user subscriptions associated with the users subscription wallet. For each listed subscription, the GUI lists the subscription payment amount, type of payment crypto currency, frequency of payments and status of payments.

Figure 26:
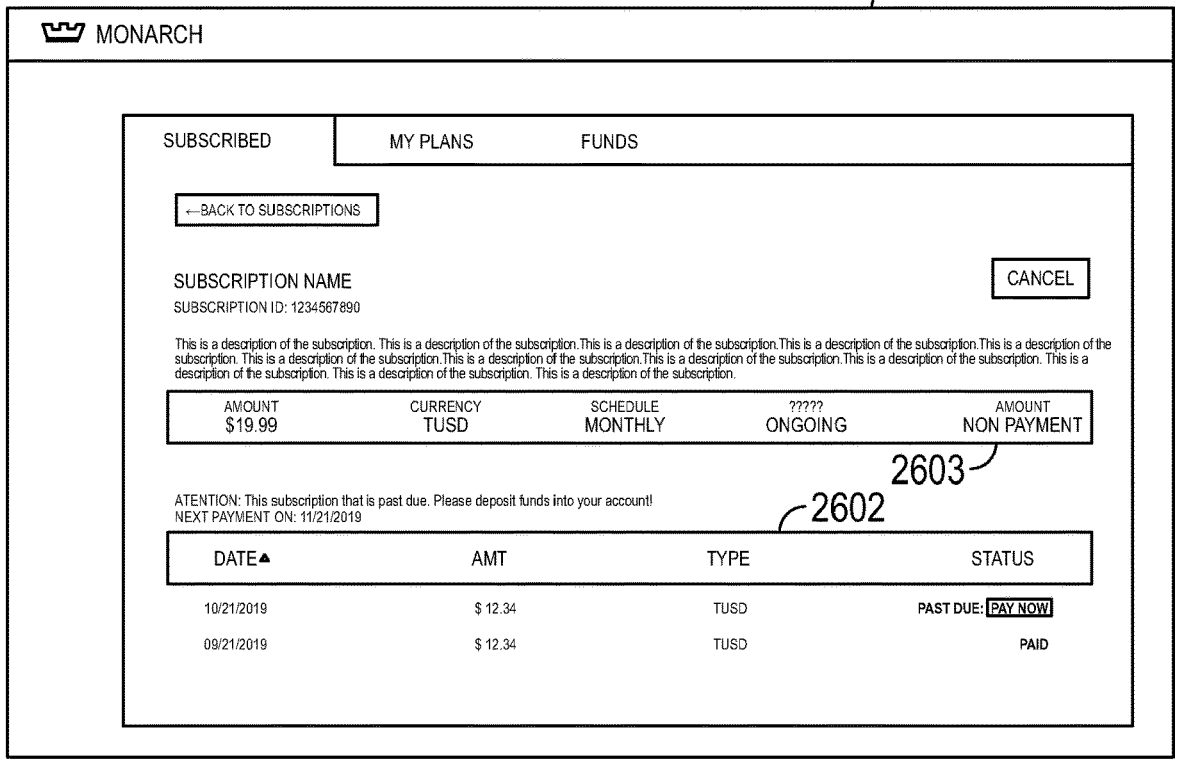
FIG. 26 is a user dashboard GUI configured to present payment and subscription fund information relating to a selected one of a plurality of subscriptions and to receive pay now instructions from the user device according to one embodiment.

FIG. 26 is a user GUI configured to present payment and subscription fund information relating to a selected one of a plurality of subscriptions and to receive pay now instructions from the user device according to one embodiment. GUI 2603 lists the particular subscription name and payment details including payment dates, amounts, type of crypto currency and payment status as well as a "pay now" button for allowing the user to execute a payment from their subscription wallet to the merchant subscription wallet.

Figure 27:
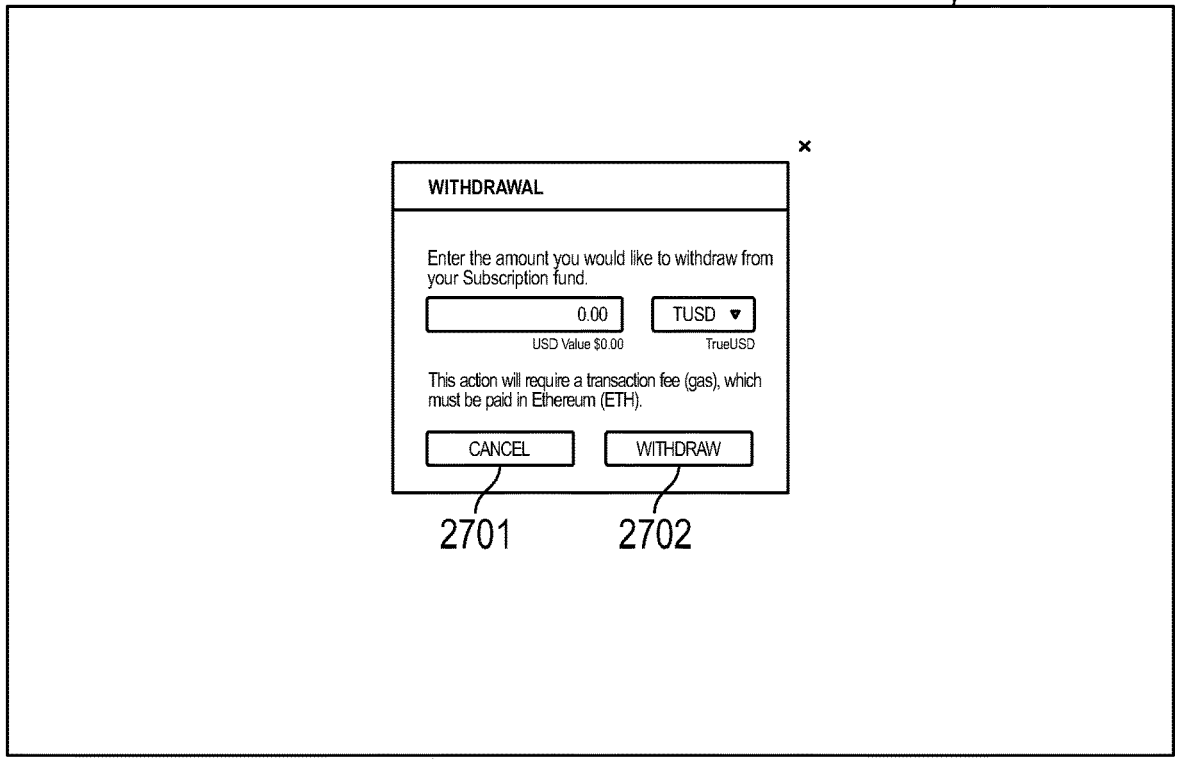
FIG. 27 is a withdraw GUI configured to receive user device or merchant device entered instructions to withdraw a specified amount in a specified currency from the subscription fund (user subscription wallet fund or merchant subscription wallet fund)

FIG. 27 is a withdraw GUI configured to receive user device or merchant device entered instructions to withdraw a specified amount in a specified currency from the subscription fund (user subscription wallet fund or merchant subscription wallet fund). The GUI 2700 includes cancel and withdraw buttons, respectively.

Figure 28:
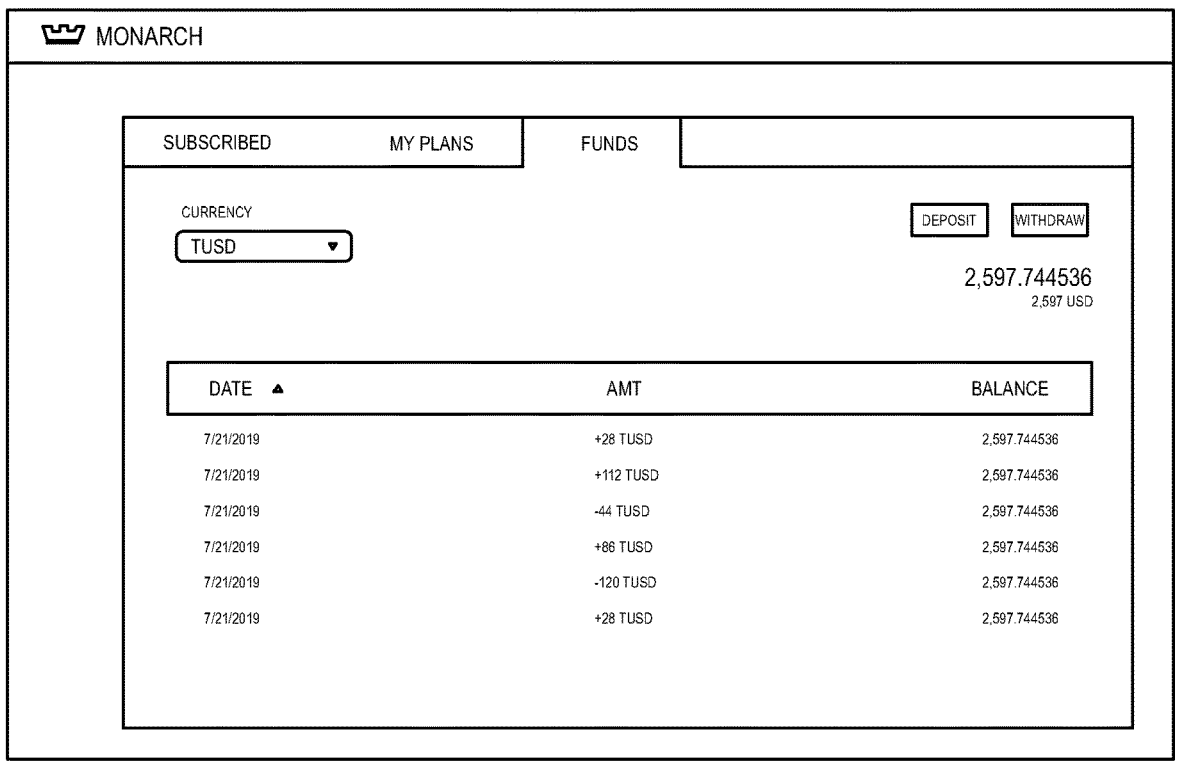
FIG. 28 is a merchant funds or user funds dashboard GUI configured to present subscription wallet funds payment information.

FIG. 28 is a merchant funds or user funds dashboard GUI configured to present subscription wallet funds payment information.

Figure 13:
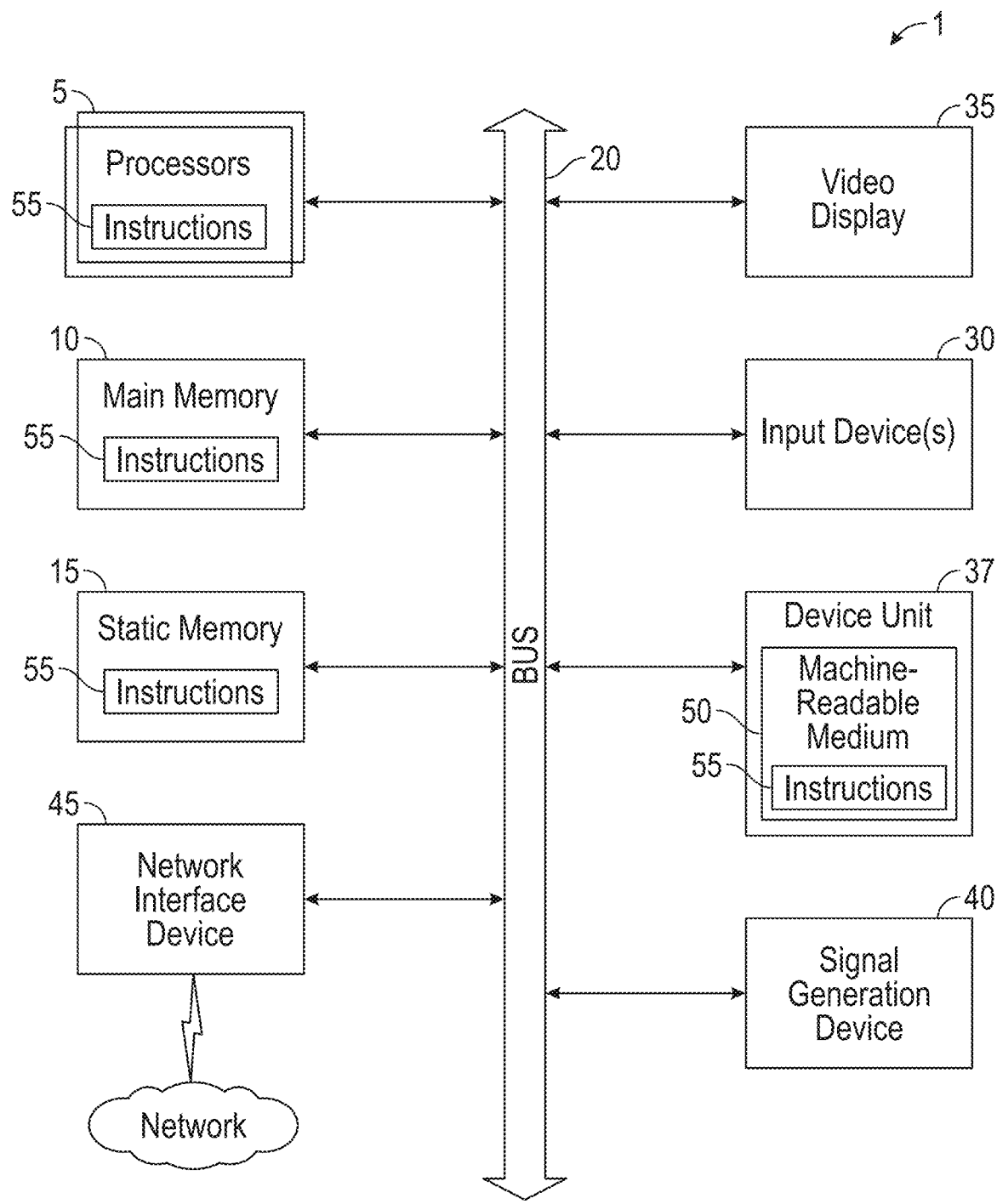
FIG. 13 is a schematic diagram of an example computing machine that can be used to implement aspects of the present disclosure.

FIG. 13 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g. Computer system 1 may be a plurality of the machines interconnected over a network). In a networked deployment, the machine(s) may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a dedicated camera or webcam, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. This drive unit can include any mass data storage unit. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method of managing a blockchain subscription payment, the method comprising:
receiving authorization that a blockchain subscription pay manager application is allowed to access at least one merchant blockchain account of a merchant;
rendering on a graphical user interface of the blockchain subscription pay manager application of a computing system, a new subscription payment plan set up tool for facilitating set up of new subscription payment plan by the merchant;
receiving via said graphical user interface of the blockchain subscription pay manager application new subscription payment set up instructions entered using said new subscription payment plan set up tool for setting up said new subscription payment plan; the new subscription payment plan being implemented in the form of a subscription blockchain smart contract for automatically making recurring payments from a user subscription wallet associated with the user blockchain account of a user to a merchant subscription wallet associated with the merchant blockchain account;
generating a subscription payment plan invoice in said computing system for payment from the user subscription wallet according to said new said subscription plan; the subscription payment plan invoice including details of the new subscription payment plan and a request for the user to set up a payment for the subscription payment plan, the request to set up payment including a request for the user to enter an address for the user subscription wallet; and
generating a link or code for a user device to access said subscription payment plan invoice via a graphical user interface of a blockchain subscription pay manager application of the computing system.

2. The method of claim 1, further comprising
receiving in the computer system authorization that a blockchain subscription pay manager application is allowed to access said user blockchain account of said user;
in response to receiving a request via said link or code to access said subscription payment plan invoice, providing access to said new subscription plan invoice via a graphical user interface of said blockchain subscription pay manager application;
receiving user entered instructions into said graphical user interface confirming user information in subscription payment plan invoice for subscribing to said new subscription payment plan;
receiving user instructions entered via said graphical interface of said blockchain subscription pay manger application to set up payment according to said subscription payment plan invoice; and
sending over said computer system said information about said new subscription plan payment plan for processing by said blockchain subscription smart contract to perform said recurring payments from said user subscription wallet to said merchant subscription wallet.

3. The method of claim 2, further comprising repeating steps of claim 2 for each one of the plurality of different users for the same and/or different subscription payment plan.

4. The method of claim 1, further comprising repeating steps of claim 1 for the same user but for each one of plurality of merchant user accounts of different merchants.

5. The method of claim 1, further comprising:
receiving in the blockchain subscription pay management application of the computing system, transactional information relating to recurring transactions automatically made between the user subscription wallet and the merchant subscription wallet according to the new subscription payment plan.

6. The method of claim 5, further comprising rendering on a graphical user interface of a blockchain subscription pay management application of a computing system, merchant dashboard tool for facilitating viewing by said merchant of at least some of said transaction information.

7. The method of claim 5, further comprising rendering on a graphical user interface of a blockchain subscription pay management application of a computing system, a user dashboard tool for facilitating viewing by said user of at least some of said transaction information.

8. The method of claim 1, wherein said new subscription payment plan set up tool on said graphical user interface comprises a new subscription payment plan set up fillable form including an activatable button for a merchant to activate the new subscription payment plan set up process.

9. The method of claim 8, wherein said new subscription payment plan set up fillable form includes a field for receiving a payment destination address associated with the merchant personal smart contract wallet.

10. The method of claim 8, wherein said new subscription payment plan set up fillable form includes components for selecting any one or any combination of the following: a cryptocurrency payment type from a plurality of different cryptocurrencies, pay now option for requiring the user to pay an amount upon subscribing to the new subscription payment plan, frequency of recurring payment by the user, number of payments by the user, total payments by the user, payment day, details of a user account of the user registered with the blockchain subscription pay manager application, physical contact details of the user, processing fees associated with the subscription payment plan processing by the blockchain subscription pay manager application.

11. The method of claim 1, wherein generating said new subscription payment plan invoice further comprises rendering on the graphical user interface of said blockchain subscription pay manager application an invoice including fields for a user entering a username or email; the username being a username of a user account registered with the blockchain subscription pay management application.

12. The method of claim 1, wherein generating said new subscription payment plan invoice further comprises rendering on the graphical user interface of said blockchain subscription pay manager application an activation button or link for activation by the user to confirm subscription to the new subscription payment plan.

13. A non-transitory, computer-readable medium comprising program code that, when executed by one or more processors of a computer system, causes the one or more processors to perform a method comprising:
receiving authorization that a blockchain subscription manager application is allowed to access a merchant blockchain account of a merchant;
rendering on a graphical user interface of the blockchain subscription pay manager application of a computing system, a new subscription payment plan set up tool for facilitating set up of new subscription payment plan by the merchant;
receiving via said graphical user interface of the blockchain subscription pay manager application new subscription payment set up instructions entered using said new subscription payment plan set up tool for setting up said new subscription payment plan; the new subscription payment plan being implemented in the form of a subscription blockchain smart contract for automatically making recurring payments from a user subscription wallet associated with the user blockchain account of a user to the merchant subscription wallet associated with the merchant blockchain account;

generating a subscription payment plan invoice in said computing system for payment from the user subscription wallet according to said new said subscription plan;

the subscription payment plan invoice including details of the new subscription payment plan and a request for the user to provide confirmation information for subscribing to the subscription payment plan, the request to provide confirmation information including a request for the user to enter an address for the user subscription wallet; and generating a link or code for a user device to access said subscription payment plan invoice via a graphical user interface of a blockchain subscription pay manager application of the computing system.

14. The non-transitory, computer-readable medium comprising program code of claim 13, further comprising receiving in the computer system authorization that a blockchain subscription pay manager application is allowed to access said user blockchain account of said user;

in response to receiving a request via said link or code to access said subscription payment plan invoice, providing access to said new subscription plan invoice via a graphical user interface of said blockchain subscription pay manager application;

receiving user entered instructions into said graphical user interface confirming user information in subscription payment plan invoice for subscribing to said new subscription payment plan;

receiving user instructions entered via said graphical interface of said blockchain subscription pay manger application to set up payment according to said subscription payment plan invoice; and sending over said computer system said information about said new subscription plan payment plan for processing by said blockchain subscription smart contract to perform said recurring payments from said user subscription wallet to said merchant subscription wallet.

15. A non-transitory, computer-readable medium comprising program code that, when executed by one or more processors of a computer system, causes the one or more processors to perform a method of managing a blockchain subscription payment using a decentralized application, the decentralized application comprising a blockchain subscription pay manager application and a blockchain subscription smart contract; the blockchain subscription pay manager application being configurable for sending and/or receive instructions between the blockchain subscription pay manager application and the blockchain subscription smart contract on the blockchain via a proxy/bridge, the method comprising interfacing said blockchain subscription pay manager application with a blockchain account of a merchant via said bridge/proxy;

receiving authorization that the blockchain subscription manager application is allowed to access said merchant blockchain account of a merchant;

rendering on a graphical user interface of the blockchain subscription pay manager application of a computing system, a new subscription payment plan set up tool for facilitating set up of new subscription payment plan by the merchant;

receiving via said graphical user interface of the blockchain subscription pay manager application new subscription payment set up instructions entered using said new subscription payment plan set up tool for setting up said new subscription payment plan; the new subscription payment plan being implemented in the form of a subscription blockchain smart contract for automatically making recurring payments from the user subscription wallet associated with the user blockchain account of a user to the merchant subscription wallet associated with the merchant blockchain account;

generating a subscription payment plan invoice in said computing system for payment from the user subscription wallet according to said new said subscription plan; the subscription payment plan invoice including details of the new subscription payment plan and a request for the user to provide confirmation information for subscribing to the subscription payment plan, the request to provide confirmation information including a request for the user to enter an address for the user subscription wallet; and generating a link or code for a user device to access said subscription payment plan invoice via a graphical user interface of a blockchain subscription pay manager application of the computing system.

16. The non-transitory, computer-readable medium comprising program code of claim 15, further comprising interfacing said blockchain subscription pay manager application with the blockchain account of a user via said bridge/proxy;

receiving in the computer system authorization that a blockchain subscription pay manager application is allowed to access said user blockchain account of said user;

in response to receiving a request via said link or code to access said subscription payment plan invoice, providing access to said new subscription plan invoice via a graphical user interface of said blockchain subscription pay manager application;

receiving user entered instructions into said graphical user interface corresponding to or confirming user information in subscription payment plan invoice for subscribing to said new subscription payment plan;

receiving user instructions entered via said graphical interface of said blockchain subscription pay manger application to set up payment according to said subscription payment plan invoice; and interfacing said blockchain subscription pay manger app with said bridge/proxy for configuring said blockchain subscription payment smart contract to implement recurring payments according to said new subscription payment plan.

17. The method of claim 1, wherein the request to set up payment includes a request for the user to enter a user email.

18. The method of claim 17, wherein the request to set up payment includes a request for the user to enter a username.

19. The method of claim 17, wherein the request to set up payment includes a request for the user to enter a user physical address or a user phone number.

20. The method of claim 1, wherein the request to set up payment includes a request to make a first payment for the subscription plan.

21. The method of claim 20, further comprising:
- determining whether the user has sufficient funds to make the first payment for the subscription plan;
- if the user has sufficient funds, processing the first payment; and
- if the user has insufficient funds, rendering a message on the user device confirming that the user does not have enough funds to subscribe.

* * * * *